BOMBING COMPUTER

Filed Feb. 25, 1955 21 Sheets-Sheet 1

INVENTORS
JEROME R. BERNIER
ROBERT W. MADDEN
BY Dewey J. Cunningham
ATTORNEY

Nov. 29, 1966 J. R. BERNIER ETAL 3,288,984

BOMBING COMPUTER

Filed Feb. 25, 1955 21 Sheets-Sheet 2

INVENTORS
JEROME R. BERNIER
ROBERT W. MADDEN

BY Dewey J. Cunningham
ATTORNEY

INVENTORS
JEROME R. BERNIER
ROBERT W. MADDEN
BY Dewey J. Cunningham
ATTORNEY

INVENTORS
JEROME R. BERNIER
ROBERT W. MADDEN
BY Dewey J. Cunningham
ATTORNEY

INVENTORS
JEROME R. BERNIER
ROBERT W. MADDEN
BY Dewey J. Cunningham
ATTORNEY

BOMBING COMPUTER

Filed Feb. 25, 1955 21 Sheets-Sheet 6

INVENTORS
JEROME R. BERNIER
ROBERT W. MADDEN
BY Dewey J. Cunningham
ATTORNEY

INVENTORS
JEROME R. BERNIER
ROBERT W. MADDEN
BY Dewey J. Cunningham
ATTORNEY

BOMBING COMPUTER

Filed Feb. 25, 1955 21 Sheets-Sheet 8

INVENTORS
JEROME R. BERNIER
ROBERT W. MADDEN

BY Dewey J. Cunningham
ATTORNEY

BOMBING COMPUTER

Filed Feb. 25, 1955 21 Sheets-Sheet 9

INVENTORS
JEROME R. BERNIER
ROBERT W. MADDEN
BY Dewey J. Cunningham
ATTORNEY

BOMBING COMPUTER

Filed Feb. 25, 1955 21 Sheets-Sheet 10

INVENTORS
JEROME R. BERNIER
ROBERT W. MADDEN
BY Dewey J. Cunningham
ATTORNEY

INVENTORS
JEROME R. BERNIER
ROBERT W. MADDEN
BY Dewey J. Cunningham
ATTORNEY

INVENTORS
JEROME R. BERNIER
ROBERT W. MADDEN

BY Dewey J. Cunningham
ATTORNEY

INVENTORS
JEROME R. BERNIER
ROBERT W. MADDEN

BY Dewey J. Cunningham
ATTORNEY

Nov. 29, 1966 J. R. BERNIER ETAL 3,288,984

BOMBING COMPUTER

Filed Feb. 25, 1955 21 Sheets-Sheet 14

INVENTORS
JEROME R. BERNIER
ROBERT W. MADDEN
BY Dewey J. Cunningham
ATTORNEY

INVENTORS
JEROME R. BERNIER
ROBERT W. MADDEN
BY
Dewey J. Cunningham
ATTORNEY

INVENTORS
JEROME R. BERNIER
ROBERT W. MADDEN
BY
Dewey J. Cunningham
ATTORNEY

INVENTORS
JEROME R. BERNIER
ROBERT W. MADDEN
BY Dewey J. Cunningham
ATTORNEY

BOMBING COMPUTER

Filed Feb. 25, 1955 21 Sheets-Sheet 18

INVENTORS
JEROME R. BERNIER
ROBERT W. MADDEN
BY
ATTORNEY

INVENTORS
JEROME R. BERNIER
ROBERT W. MADDEN
BY
Dewey J. Cunningham
ATTORNEY

INVENTORS
JEROME R. BERNIER
ROBERT W. MADDEN
BY
Dewey J. Cunningham
ATTORNEY

BOMBING COMPUTER

Filed Feb. 25, 1955 21 Sheets-Sheet 21

INVENTORS
JEROME R. BERNIER
ROBERT W. MADDEN
BY
Dewey J. Cunningham
ATTORNEY

United States Patent Office 3,288,984
Patented Nov. 29, 1966

3,288,984
BOMBING COMPUTER

Jerome R. Bernier, Dayton, Ohio, and Robert W. Madden, Binghamton, N.Y., assignors to International Business Machines Corporation, New York, N.Y., a corporation of New York Filed Feb. 25, 1955, Ser. No. 490,594
6 Claims. (Cl. 235—61.5)

The present invention relates to computing apparatus and more particularly to an analog computer used in furnishing solutions to problems arising in bombing targets from high speed aircraft.

Briefly, the present invention provides an analog computer which is adapted to be used in the bombing of targets from high speed aircraft. The accuracy obtainable from such a computer is highly dependent on the inputs thereto which affect the solution to the bombing problem. One of these inputs that is not readily determinable is the wind velocity vector in the aircraft environment. This vector includes the magnitude of the wind and its direction. Another input which is difficult to obtain, where moving targets are to be bombed, is the target velocity vector. In the present invention the wind velocity and target velocity vectors are readily obtainable to a high degree of accuracy so that bombs or other objects dropped from the aircraft will strike the target. To accomplish this, there is provided integrator means that is adapted to produce outputs in the form of vectorial components of range to a target. These range quantities are supplied to a display device which receives another input relating to the altitude of the aircraft. The display device includes a reference in the form of crosshairs which are related in a prescribed manner to a target point in a manifestation of the area beneath the aircraft. For example, the crosshairs may be positioned on the aforementioned target point. The components of velocity of the aircraft in air and the assumed components of wind velocity are summed and supplied to the integrator means. If the wind velocity components are accurate, the crosshairs should continue to track the target point. If the crosshairs begin to drift off the target point, it is an indication that the assumed wind velocity components are in error. A hand control device is used to control a variable voltage source to produce voltages which are supplied to the integrator means for repositioning the crosshairs on the target point. However, this does not prevent the crosshairs from again drifting off the target.

In order to correct the wind velocity components, the operator manipulates the hand control device to return the crosshairs to the target point and initiates a wind correction operation known as the memory-point mode. The initiation of this mode switches the hand control voltages from the aforementioned integrator means to a second integrator means that controls the electrical devices which store the wind velocity components. At the same time, the stored wind velocity component voltages are disconnected from the first-mentioned integrator means and supplied to a multiplying apparatus which varies the wind velocity vector voltages as a function of time. The total time of this multiplying operation is equal to the period of the wind correction operation. The output of the multiplying apparatus is summed with the output of the first integrating means. After the crosshairs have drifted off the target point for a prescribed time, the operator manipulates the hand control in a manner to vary the output voltages therefrom so as to vary the input to the second integrating means. This causes the second integrating means to vary the values of stored wind. Since these values are varied, the output of the multiplying apparatus will also vary and modify the summation with the output from the first integrating means so as to return the crosshairs to the target point. When this is accomplished, the operator discontinues the memory point mode and the wind correction is complete. This ability of the computer is utilized in the tracking of moving targets. In this mode of operation, the crosshairs are continuously maintained on the target by use of the hand control and the velocity components of the moving target are summed with the wind velocity components to assure proper inputs to the computer for solution of the bombing problem.

The primary object of the present invention is to provide an improved analog computer.

Another object of this invention is to furnish an improved computer for directing the bombing of targets from high speed aircraft.

Still another object of the invention is to provide improved computing apparatus for tracking a target from a high speed aircraft and furnishing a signal at the correct time to drop bombs from the aircraft to hit the target.

A further object of this invention is to provide improved bombing director means for furnishing accurate information with regard to wind velocity and direction at desired intervals.

Another object of the invention is to provide computing apparatus for determining the true value of an unknown parameter by observing an error introduced by said parameter for a time interval and then modifying a preset value of said parameter to eliminate said error.

Another object of the invention is to furnish computing apparatus as described above which provides the true vectorial components of wind which affect an aircraft in which the apparatus is mounted.

Still another object of the invention is to provide improved bomb director means, for mounting in an aircraft, in which changes in the true vectorial components of wind are computed up until the time the bombs are dropped from the aircraft.

Another object of the invention is to provide improved bomb director apparatus for tracking moving targets and determining the correct time to drop bombs in order to hit said targets.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 1, 2 and 3 illustrates some of the bombing problem geometry involved with the present invention;

FIGS. *4a* and *4b* together form a schematic block diagram of the present invention, the switching apparatus between the blocks being shown in detail;

FIGS. *5a*, *5b*, *5c*, *5d*, *5e*, *5f*, *5g* and *5h*, when combined as shown in FIG. 6, form a detailed schematic diagram of the invention;

Figure 11:
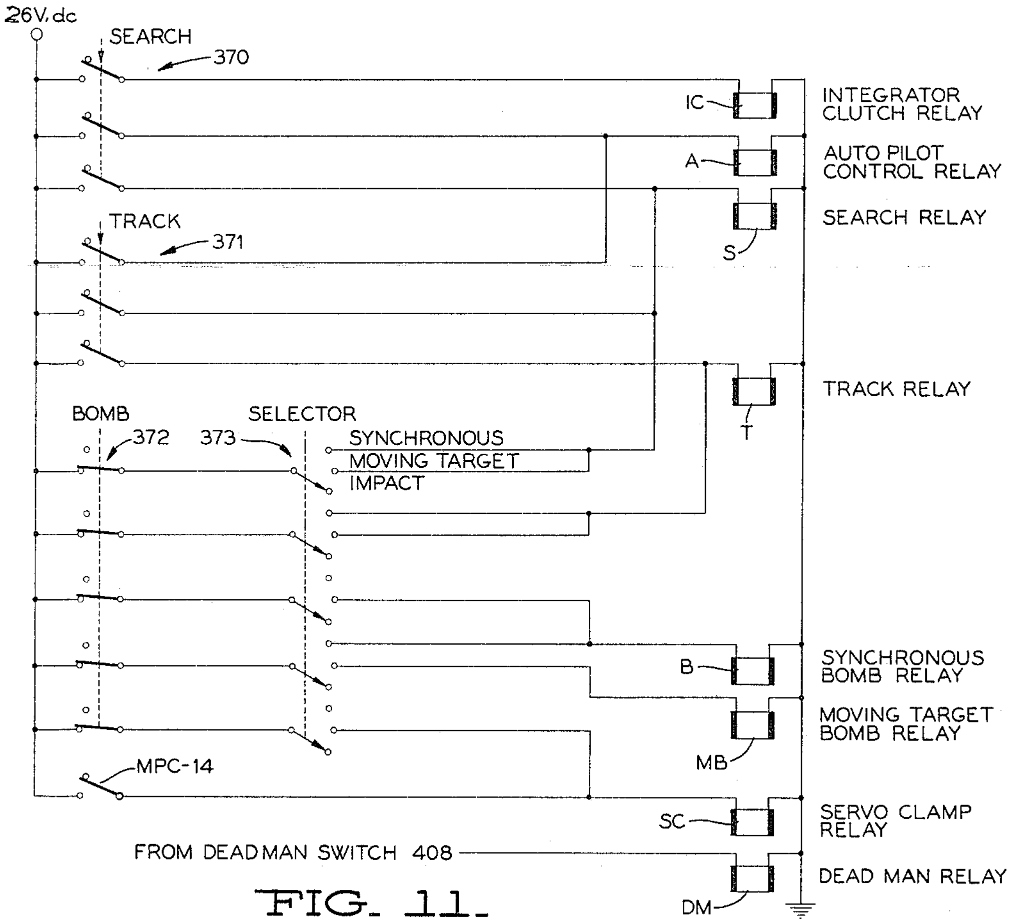
Figure 12:
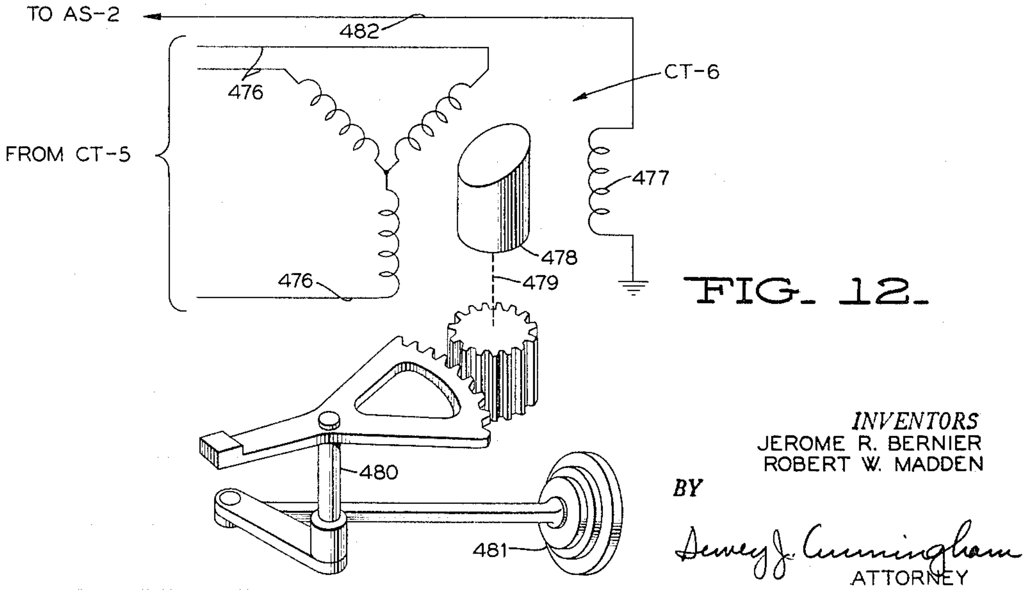
Figures 13, 14, 15:
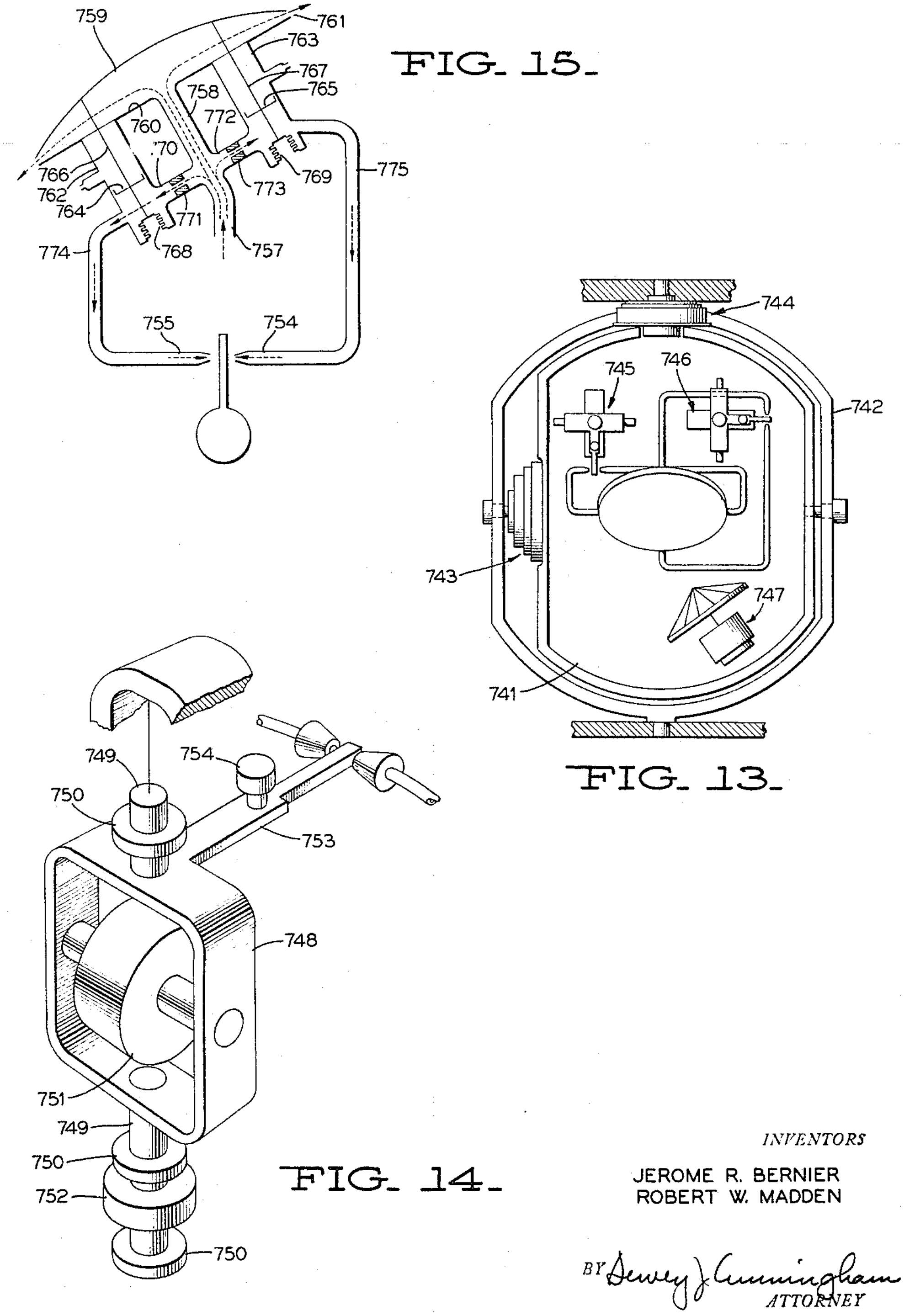
Figure 16:
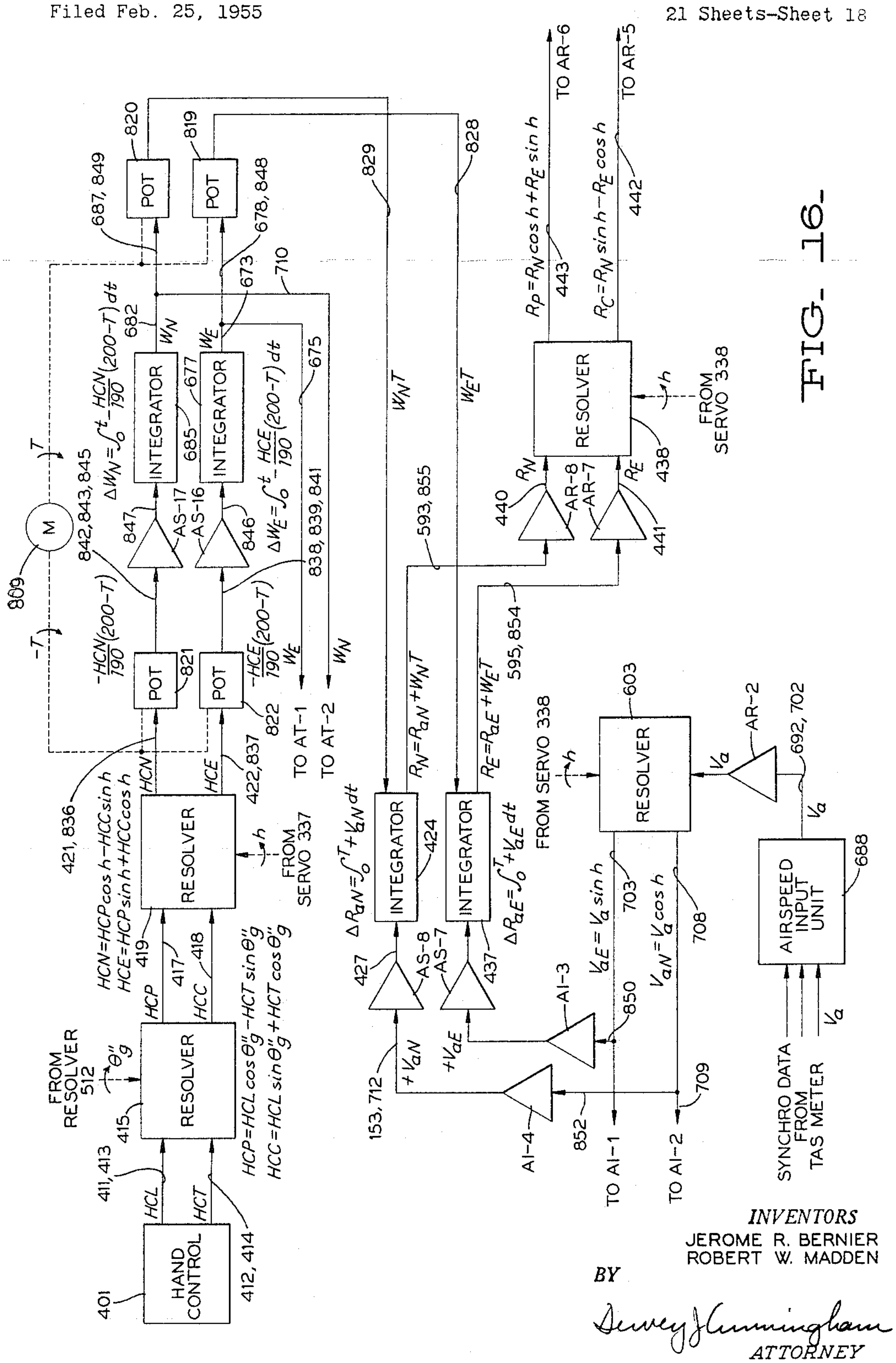
Figure 17A:
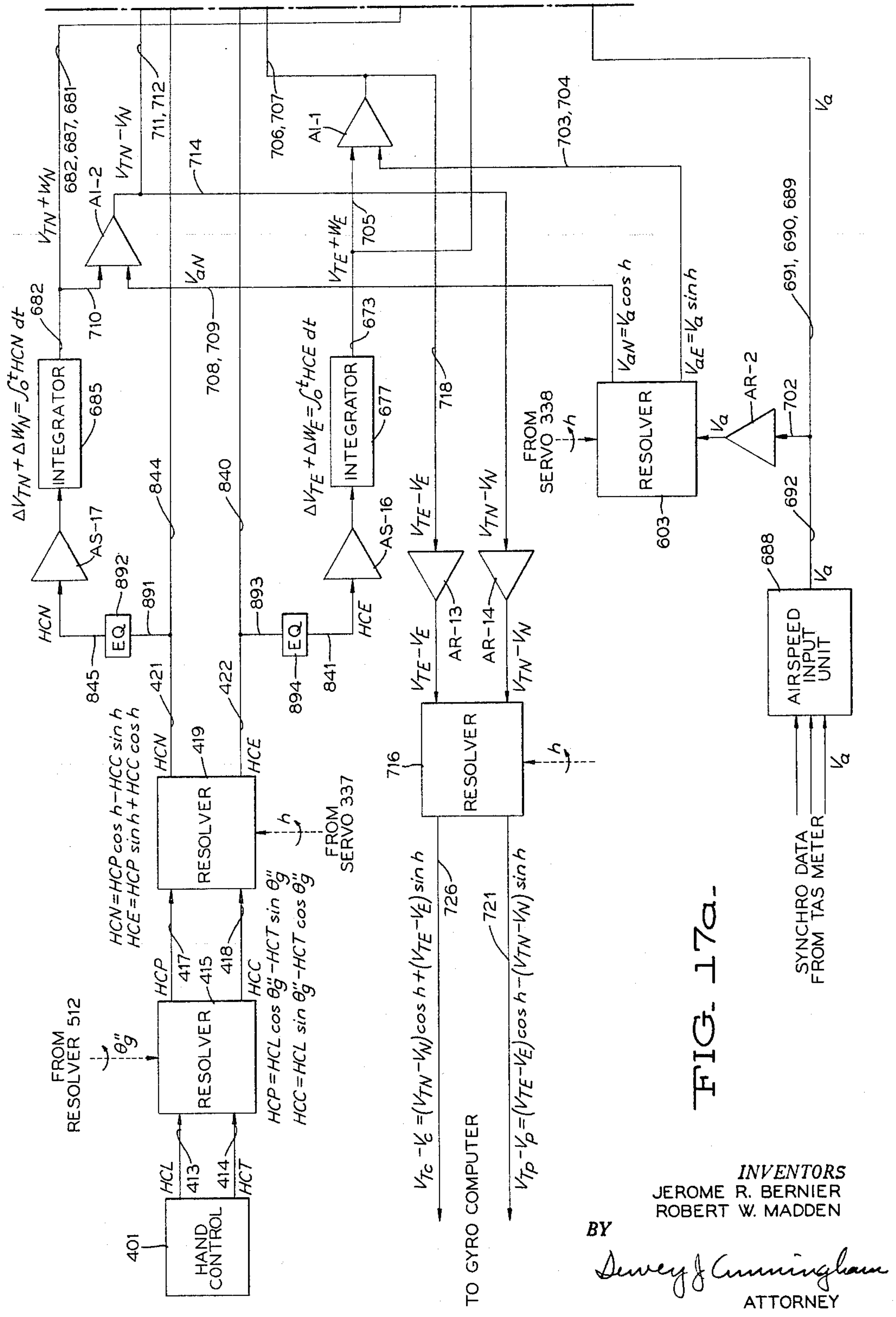
Figure 17B:
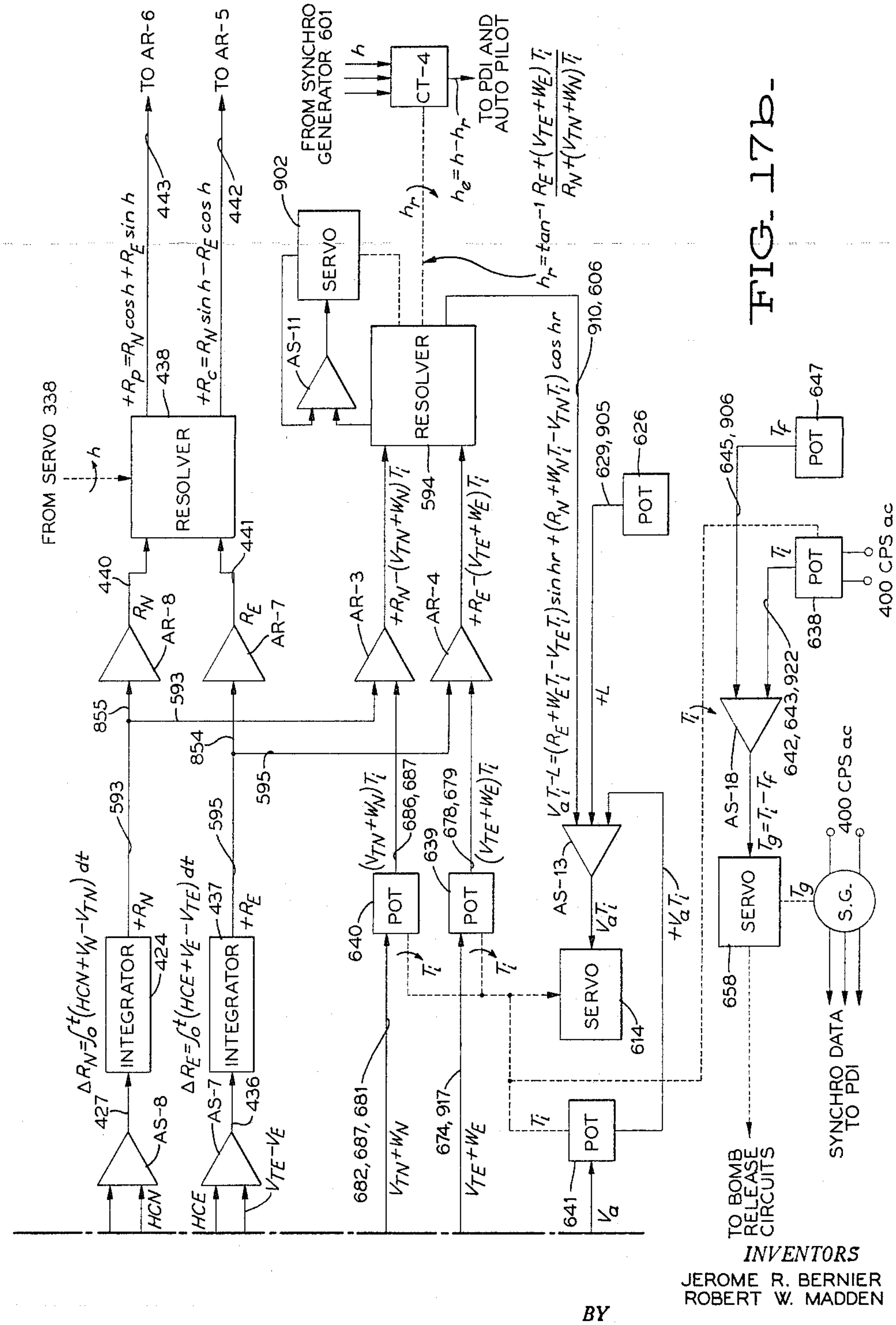
Figure 18:
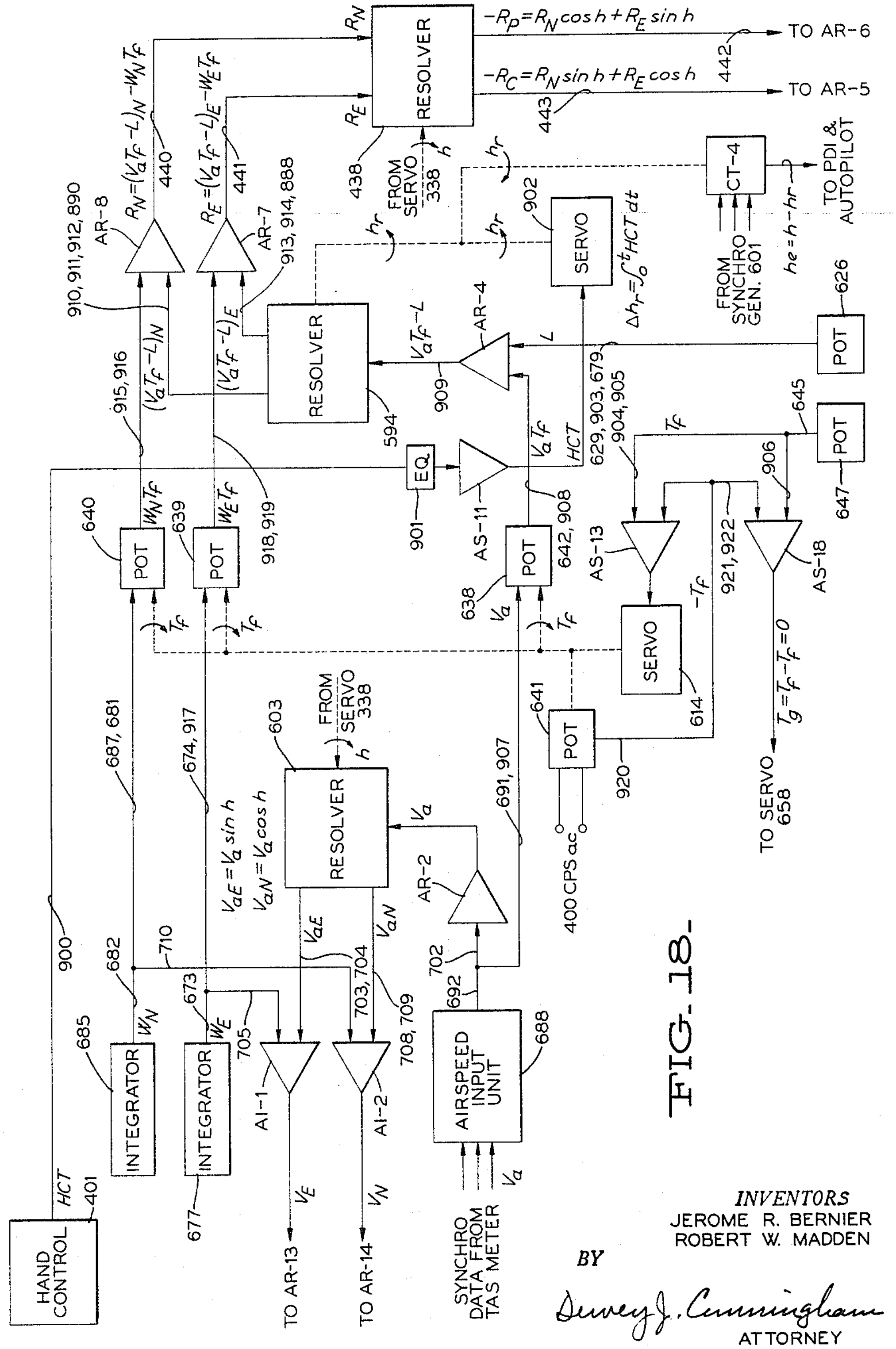

FIGS. *10a* and *10b* together form a data flow diagram for the search mode of operation;

FIG. 11 is a schematic diagram of the mode switches;

FIG. 12 is a schematic diagram of the altimeter unit;

FIG. 13 is a plan view of the gyro platform;

FIG. 14 is a perspective view of one of the platform gyros;

FIG. 15 is a schematic diagram of the platform stabilizing apparatus;

FIG. 16 is a schematic data flow diagram for the memory point mode of operation;

FIGS. 17*a* and 17*b* together form a schematic data flow diagram for the moving target bomb mode of operation; and FIG. 18 is a schematic data flow diagram of the impact bomb mode of operation.

Similar reference numerals represent similar parts throughout the several views.

*Geometric relationships*

Figure 1:
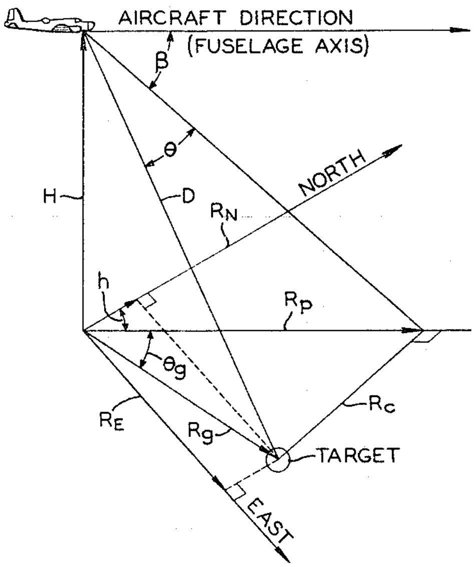
Figure 2:
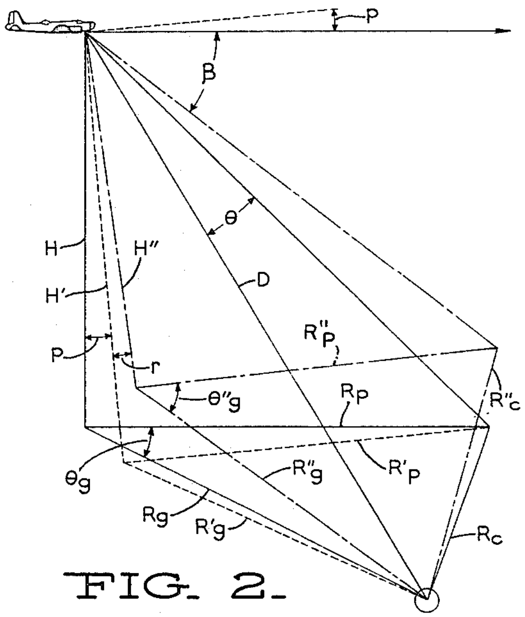
Figure 3:
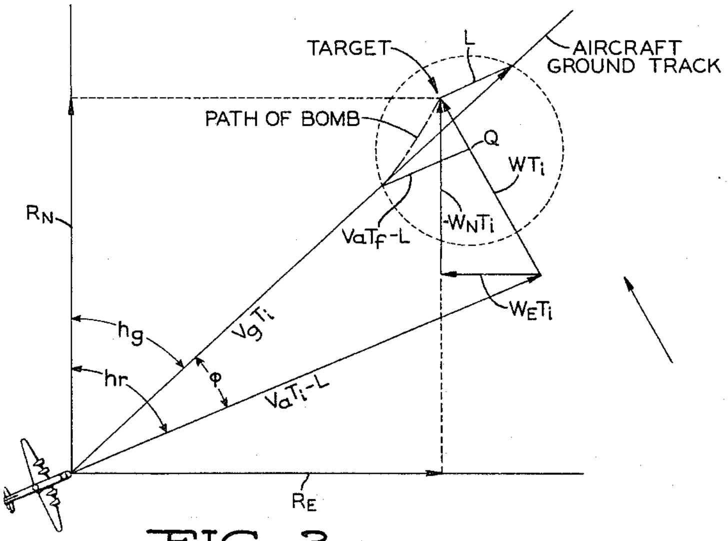
Figure 4A:
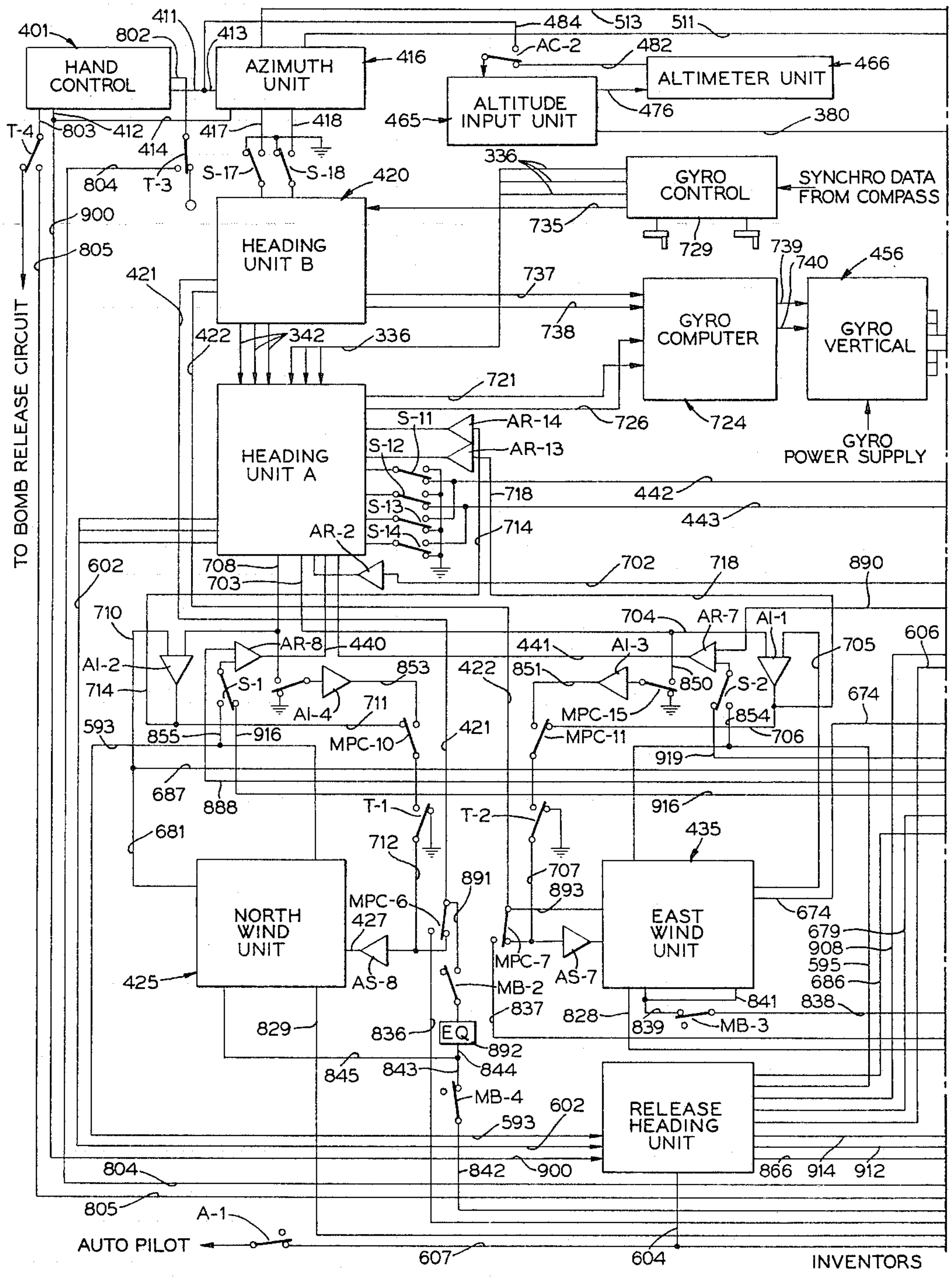
Figure 4B:
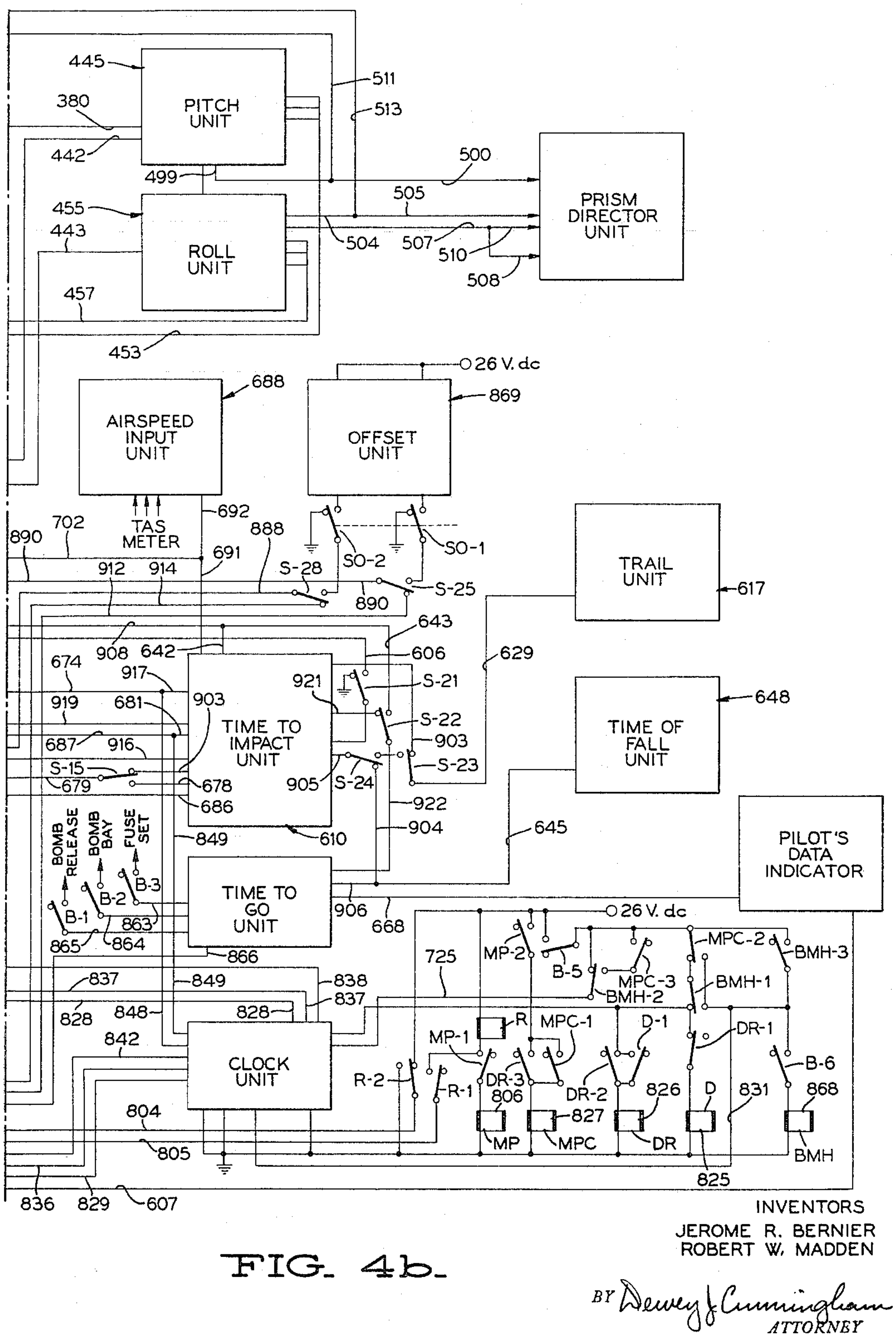

In order to obtain a basic understanding of the geometry encountered in the solution of problems involved in bombing targets from aircraft, reference is made to FIGS. 1, 2 and 3 and the following explanation thereof. FIG. 1 shows the general sighting system for the periscope, wherein H is the altitude of the aircraft above the target, $R_p$ is the component of ground range parallel to the aircraft heading, $R_c$ is the component of the ground range perpendicular to $R_p$, and D is the slant range. The angle $\theta$ is the angle between the slant range and the vertical plane containing the fuselage axis. The angle $\beta$ is the angle between a horizontal plane and the projection of the slant range on the vertical plane containing the fuselage axis. The angle $\theta_g$ is the angle between the ground range, $R_g$, and the parallel range, $R_p$. $R_N$ is the component of ground range in a north direction. $R_E$ is the component of ground range in an east direction and $h$ is the heading of the aircraft with respect to north.

Mechanization of the prism drive is effected by coupling inputs H, $R_p$, and $R_c$, to the prism director. The prism director computes the required $\beta$ and $\theta$ angles.

Some of the more frequently used relations between the above-mentioned geometric quantities are listed below:

$$\beta=\tan^{-1}\frac{H}{R_p}$$

$$\theta_g=\tan^{-1}\frac{R_c}{R_p}$$

$$R_p=R_N \cos h+R_E \sin h$$
$$R_c=R_E \cos h-R_N \sin h$$
$$R_N=R_p \cos h-R_c \sin h$$
$$R_E=R_p \sin h+R_c \cos h$$
$$D \cos \theta=R_p \cos \beta+H \sin \beta$$

The quantities $R_p$, $R_c$ and H are also used for determining the position of the crosshairs, that is, determining the angles $\beta$ and $\theta$. In order to give the angles $\beta$ and $\theta$ the proper values to retain the crosshairs on the target, $R_p$, $R_c$ and H must be corrected for roll and pitch. In FIG. 2, the general diagram of FIG. 1 is shown in different positions as affected by pitch, $p$, and roll, $r$.

In the prism drive mechanism the altitude vector H will be assumed to be in a direction perpendicular to the general plane of the aircraft, that is, a plane containing the longitudinal and transverse axes of the aircraft.

From FIG. 1 it is seen that in level flight the range on the ground parallel to the axis heading of the aircraft, $R_p$, is drawn perpendicular to the altitude vector, H, and $R_c$, the range on the ground cross to the heading of the aircraft is drawn through the target and perpendicular to $R_p$.

Referring to FIG. 2, it is seen that if the aircraft pitches through the angle $p$, the direction of the altitude will be changed by the angle $p$ in the plane defined by the heading of the aircraft and the altitude H.

The change in altitude of the aircraft caused by the pitch and the direction of the altitude vector will change the parallel range to the target $R_p$. The range on the ground parallel to the heading of the aircraft when pitch alone is considered is designated $R_p'$. The altitude vector when pitch alone is considered is designated H'. If a line is drawn through the target and perpendicular to the plane defined by the heading of the aircraft and H or H', the line will intersect $R_p$. $R_p'$ is thus the line drawn through the intersection of $R_p$ and $R_c$ perpendicular to H', since $R_c$ is not affected by pitch.

As also indicated in FIG. 2, roll, which is designated as $r$, is taken into account. Roll of the aircraft is rotation of the aircraft about the axis defined by the heading vector. For the purpose of the geometry, assume that the roll of the aircraft rotates the plane containing the altitude vector and the heading vector or that this plane remains fixed with respect to the aircraft. The altitude, when taking into account both roll and pitch, is designated as H'' and will assume a direction of angle $r$ from H' in a plane drawn through H' and perpendicular to the plane defined by H and the heading vector of the aircraft. The range on the ground cross to the heading of the aircraft, when roll and pitch are taken into account, is designated as $R_c''$ and is defined as the vector from the target perpendicular to the plane defined by H'' and the heading vector of the aircraft to the point where this vector intersects this plane. $R_p''$, the range on the ground parallel to the heading of the aircraft when roll and pitch are taken into account, is defined as the line from the intersection of $R_c''$ and the plane defined by H'' and the heading vector and drawn parallel to the heading vector to the point where it intersects H''. $R_p''$ is perpendicular to H'' since H'' is perpendicular to the heading vector. The length of H'' is determined by the point at which $R_p''$ intersects H''.

$R_g''$, the range on the ground corrected for roll and pitch, is defined as the vector connecting the intersection of $R_p''$ with H'' and the target.

Roll, $r$, and pitch, $p$, of the aircraft must be compensated for in the prism drive mechanism if the crosshairs are to be kept on the target.

The angles $\beta$ and $\theta$ as used hereinafter are considered to be corrected for roll and pitch and are derived from $R_p''$, $R_c''$ and H''. The quantities $R_p''$, $R_c''$ and H'' are derived from $R_p$, $R_c$ and H by a resolution with pitch, $p$, and roll, $r$. The geometry of this resolution and the relations between $\beta$, $\theta$, $R_p''$, $R_c''$, $\theta_g''$, $R_g$, $r$ and $p$ are listed below:

$$\beta''=\tan^{-1}\frac{H''}{R_p''}$$

$$\theta_g''=\tan^{-1}\frac{R_c''}{R_p''}$$

$$R_p''=R_p \cos p-H \sin p$$
$$R_c''=R_c \cos r+H' \sin r$$
$$H'=H \cos p+R_p \sin p$$
$$H''=H' \cos r-R_c \sin r$$
$$R_g=R_c'' \sin \theta_g''+R_p'' \cos \theta_g''$$

In the bombing problem there are a number of considerations to be dealt with. In FIGS. 1 and 2 only ranges and the various angles were considered. There must be determined in addition the velocity of the aircraft through the air or true air speed $V_a$; the velocity of the aircraft on the ground $V_g$; the velocity of the wind W and its north and east components $W_N$ and $W_E$, respectively; the time-to-go from the aircraft's present position until the bomb is dropped $T_g$; the time-of-fall of the bomb $T_f$; the time remaining from the aircraft's present position to the time-of-impact of the bomb on the target $T_i$; the heading of the aircraft with respect to north at the time the bomb is released $h_r$; the angle between the ground track of the aircraft and north $h_g$; and the drift angle $\varphi$, which is the difference between $h_r$ and $h_g$.

It will be apparent that $V_aT_i$ will be the range in air through which the aircraft will fly from the present aircraft position to the position of the aircraft at the time of bomb impact. Due to the ballistics of the bomb being dropped, the point of impact will lag the distance represented by $V_aT_i$ by an amount of trail L. This distance is represented by the vector $V_aT_i-L$ and is equal to the range in air to the target, $R_a$. This vector differs from north by an angle $h_r$. The wind vector $WT_i$ is the distance through which the bomb will be moved by the wind, in the direction of the wind, from the present aircraft position to the target. The vector $V_gT_i$ represents the distance on the ground covered by the aircraft from its present position to its position at the time of bomb impact. The distance from the aircraft's position at the time of bomb impact to the target is trail L. It will be noted that L is drawn parallel to the vector $V_aT_i-L$ which is on the aircraft heading. The wind vector $WT_i$ is shown broken down into its north and east components, $W_NT_i$ and $W_ET_i$, respectively. The range to the target is also broken down into $R_N$ and $R_E$.

In order for a bomb dropped from the aircraft to hit the target it is necessary that it be dropped at a particular point along the ground track so that its velocity $V_a$ will carry it to the target during the time of fall $T_f$ with its path being modified by whatever wind exists. It will be seen that $T_i=T_g+T_f$. The correct time to drop the bomb is when $T_g=0$. At this time $T_i=T_f$ and $$V_aT_i-L=V_aT_f-L$$

Thus, by drawing in the vector $V_aT_f-L$ parallel to the aircraft heading vector so that it extends from the ground track to the wind vector, a point Q is located on the wind vector and $V_aT_i-L$ is the new value of $R_a$. If a circle were to be drawn using $V_aT_f-L$ as a radius and Q as a center there is provided an imaginary bomb release circle. Thus, if an aircraft maintains the heading $h_r$, and releases the bomb when the ground track crosses the circle, the bomb will hit the target. The aircraft may change to another heading and still hit the target providing the aircraft's heading coincides with a radius of the bomb release circle at the time of crossing said circle.

*General—All modes*

In the design of bomb directors for high speed aircraft the matter of time becomes of utmost importance. In a matter of seconds, or a very few minutes at the most, after the target is sighted it is time to drop the bombs. The present invention is constructed such that a number of modes of operation are available to the operator. When a determination is made that the aircraft is a few minutes away from the target and before the target is actually sighted, the operator may cause the periscope crosshairs to be positioned on the horizon in the general direction of the target. By using a manually controlled "joy stick," the operator can move the crosshairs to various positions on the horizon. This is known as the search mode of operation. The advantage of having this mode of operation is that high speed non-synchronous crosshair positioning is provided plus the solution to the bombing problem, for the point with which the crosshairs are aligned at a particular instant, is continuously obtained. Once the target is sighted the operator can look at the indicated heading error $h_e$ and time-to-go, $T_g$, and determine if time remains for a bombing run. That is, he must determine if $h_e$ can be reduced to zero by the time $T_g$ is equal to zero.

If the operator has plenty of time, he can go into a track mode of operation. That is, he positions the periscope crosshairs on the target and permits the bomb director to maintain the crosshairs on the target. Should the crosshairs begin the drift from the target the joy stick can be used to reposition them on the target. During the track mode the solution to the bombing problem is continuously obtained.

One of the causes for the crosshairs to drift from the target is change in wind velocity. Or, it may be that the value of wind stored in the computer is inaccurate. The operator may then conduct the memory point mode of operation. Briefly, the operator goes into the mode at a time when the crosshairs are positioned on the target. The operator allows the crosshairs to drift off the target and then returns them within a predetermined period of time by hand control of the joy stick. The hand control voltages necessary to return the crosshairs to the target and the time the crosshairs are off the target, T, are used to provide a voltage proportional to the change in wind during time T. This change in wind is added to the former stored wind and this sum is multiplied by T to provide a distance. This distance is the amount the aircraft traveled along the wind vector during time T and is added to the range in air to the target to thus provide a new value of ground range to the target. Now, the director has a correct value of range therein and has stored the correct value of wind.

The operator can then enter into the synchronous bombing mode of operation. The crosshairs track the target and provide the autopilot with heading error signals and the bomb release mechanism with a time-to-go signal. Thus, the aircraft is maintained on the correct release heading and the bombs are dropped at the proper instant to hit the target.

It is possible that the crosshairs may begin to drift off the target during the synchronous bombing mode of operation. Providing time remains, the operator may enter the memory point mode of operation and stay therein until the bombs are dropped.

It is not usual for the actual target to be obscured by weather or by reason of its particular location in an area. For such occasions the operator may enter the synchronous offset bombing mode. In this mode the crosshairs are fixed on some object offset from the target by a predetermined amount. The crosshairs track the offset object but the solution to the bombing problem is made for the actual target. This is accomplished by sending values of $R_N$ and $R_E$ to the prism director which includes $X_N$ and $X_E$, respectively, causing the crosshairs to track the offset aim point. The values $X_N$ and $X_E$ represent the north and east components of the distance from the aim point to the actual target. By subtracting $X_N$ and $X_E$ from $R_N$ and $R_E$, respectively, the director has values of range to the actual target. Thus, these latter values are used in solving the bombing problem, i.e., obtaining values of $h_e$ and $T_g$.

The usual target to be bombed is in a fixed geographic location and is stationary. The operator may wish to drop the bombs on a moving target such as a surface ship or motor vehicle. In this mode the stored wind value has the velocity of the target added thereto and the sum thereof is used along with the velocity of the aircraft in air to provide values of range to the target. If the target changes speed, of course, the crosshairs will not track the target. However, it is but necessary for the operator to use the joy stick to return the crosshairs to the target and the new velocity of the target is stored with the wind automatically. At the proper time, the bombs are dropped and will hit the target providing the target doesn't change course or speed after the bombs leave the aircraft.

In the event some of the relays of the bomb director become inoperative and insufficient time remains for them to be replaced or repaired, provision is made for a bombing mode in which none of the relays in the director are used. This is referred to as the impact bomb mode. In this mode the solution to the bombing problem is complete for whatever target the crosshairs happen to be on. When the operator sees the target ahead of the crosshairs, he uses the hand control to direct the aircraft such that the crosshairs will pass over the target. If the operator releases the bombs at this instant they will hit the target.

Figure 5A:
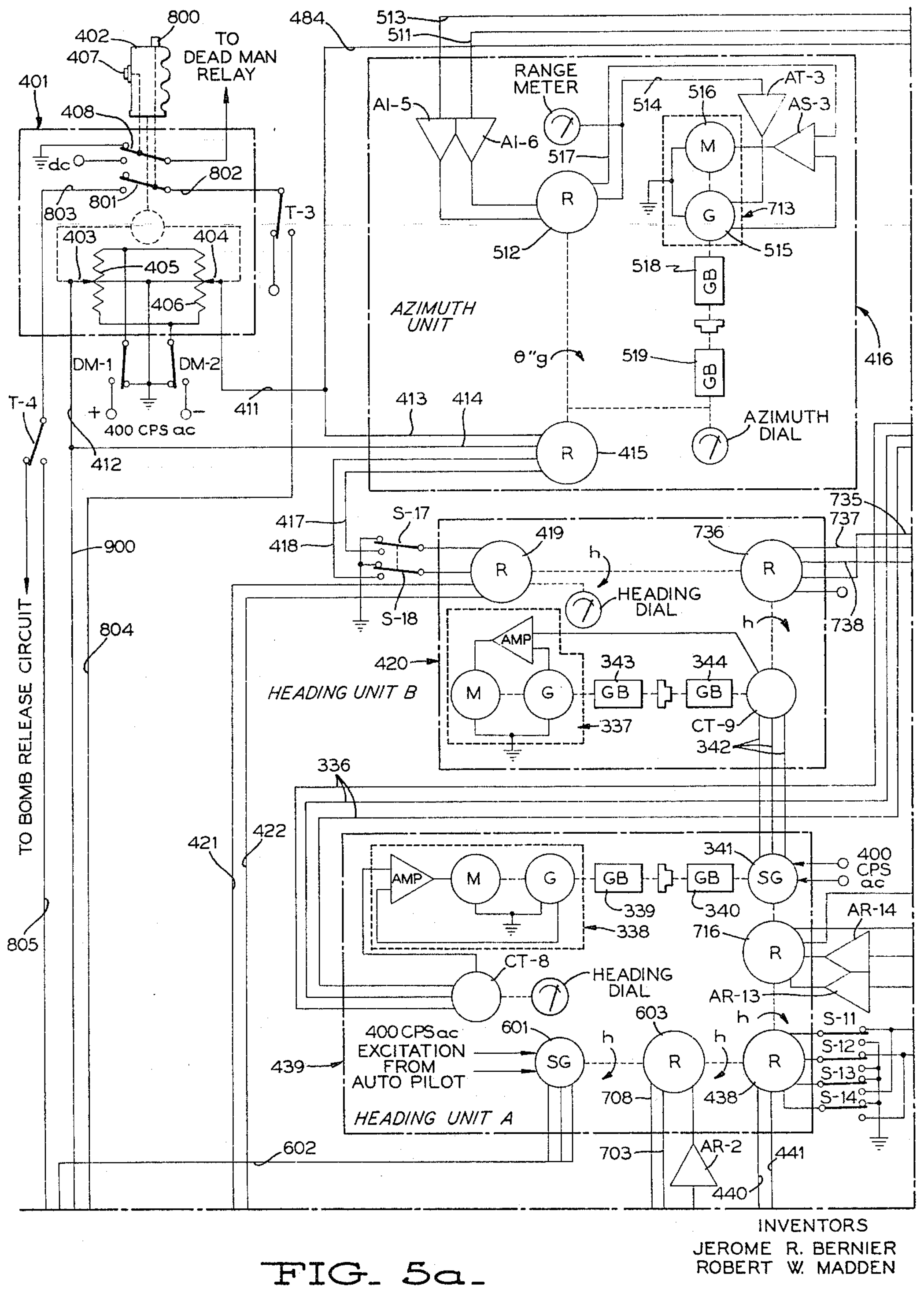
Figure 5B:
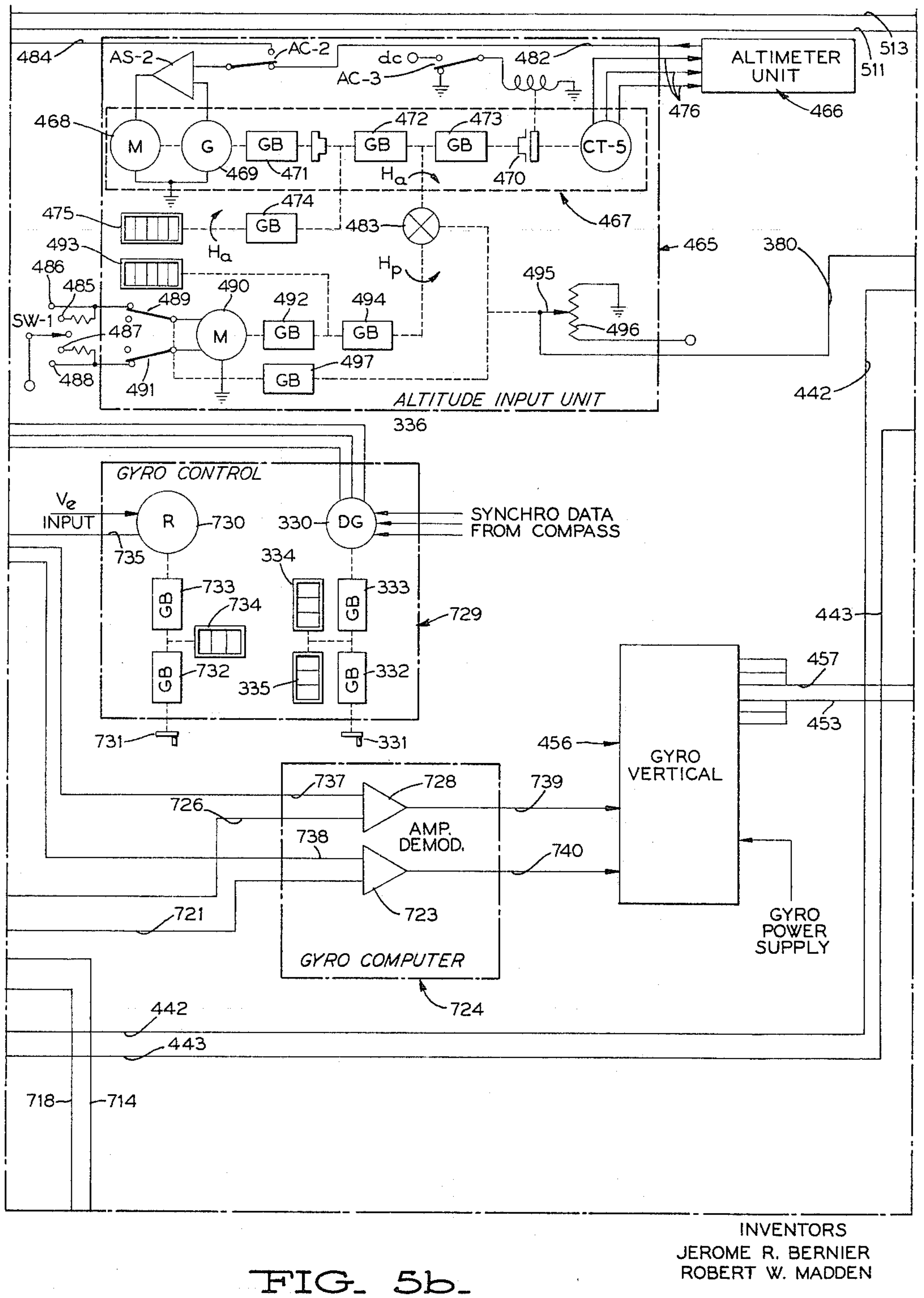
Figure 5C:
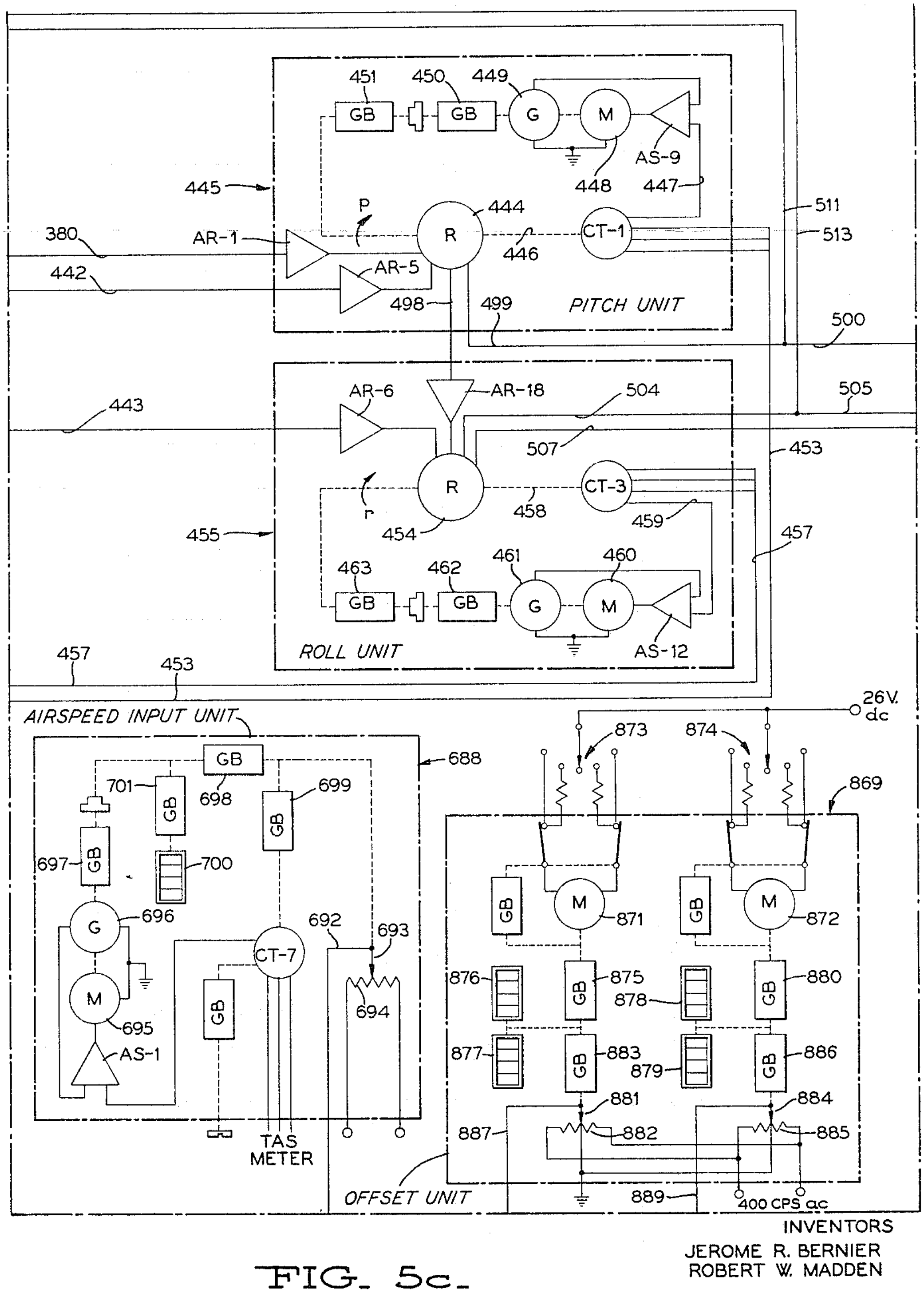

For a comprehension of the details of the present invention, reference is made to the drawings with particular reference being made to FIGS. 4*a* and 4*b*, FIGS. 5*a*, 5*b*, 5*c*, 5*d*, 5*e*, 5*f*, 5*g* and 5*h*. The entire FIG. 4 is a schematic diagram showing the various units of the present invention in block form with lead lines interconnecting said units. Relay switches are provided in said lead lines and are identified by reference characters. All switches are shown in their open positions, the relay control means therefore being unenergized for the positions shown. The mode switches are identified by the following prefixes:

S—Search Mode
T—Track Mode
MP—Memory Point Mode
B—Synchronous Bomb Mode
SO—Synchronous Offset Bomb Mode
MB—Moving Target Bomb Mode
I—Impact Bomb Mode When the operator is in a particular mode of operation, at least all the switches for that mode are transferred from the position shown. The entire FIG. 5 may be combined as shown in FIG. 6 to form a complete schematic of the bombing computer and includes the schematic details inside the various units shown in block form in FIG. 4. FIG. 11 shows the various mode relays and their interrelationship.

*Search mode*

When the bombardier determines that he is in the target area it is time to locate the target. He therefore initiates the search mode of operation by transferring the three contacts of push button switch 370, FIG. 11. This supplies 26 v. D.C. to the integrator clutch coils in the wind units, the autopilot control relay and the search relay, thereby energizing said relays and coils. Further reference is made to the schematic data flow diagram shown in FIG. 10 which shows the flow of data for the search mode of operation.

Before the search mode begins, the line of sight through the periscope crosshairs may be in any angular relationship with respect to the aircraft. The drive mechanism for the periscope is not energized so that the crosshairs move from one object to another along the ground at the ground speed of the aircraft. To begin searching for the target the periscope must be directed in a manner to arrive at the approximate location of the target. Since the computer is to direct the periscope, the operator must place certain inputs into the computer in order to move the periscope crosshairs to a desired position. This is accomplished by the use of hand control unit 401, FIG. *5a*. This units includes a "joy stick" 402 which is used to position slides 403 and 404 on potentiometers 405 and 406, respectively. These potentiometers are center-grounded. The construction is such that movement of the joy stick from left to right, i.e., transversely of the aircraft, causes slider 403 to be moved along potentiometer 405. Also, movement of the joy stick forward and backward, i.e., longitudinally of the aircraft, causes slider 404 to be moved along potentiometer 406. Joy stick 402 has a push button 407 thereon which operates switch 408 to connect the dead man relay DM, shown in the relay circuit diagram in FIG. 11, to a 26 v. D.C. power source. Dead man relay DM, when energized, transfers switches $Dm_1$ and $Dm_2$ so as to connect a 400 c.p.s. A.C. power source to opposite terminals of potentiometers 405 and 407. Plus (+) and minus (−) signs on the input terminals of switches $Dm_1$ and $Dm_2$, respectively, indicate that the voltage inputs thereto are 180° out of phase. It will be seen that movement of sliders 403 and 404 on opposite sides of the grounded center taps results in output voltages having opposite phase relationships. That is, if slider 403 moves up from the center tap, a voltage of the same phase as the power supply is placed on the slider. If the slider moves down from the center tap, a voltage 180° out of phase with the power source is placed on the slider. Thus, the phase of the output voltage is determined by whether the joy stick is moved to the left or right, or forward or backward.

When the operator desires that the periscope crosshairs move in a particular direction, the joy stick is moved in that direction and output voltages of a particular phase and magnitude are placed on slider 403 and/or 404. These output voltages are fed through lines 411, 413 and 412, 414 to azimuth unit 416. The azimuth unit includes an electromagnetic resolver 415 of conventional design which recives the input voltages from the hand control unit. By reference to the data flow diagram shown in FIG. 10, it will be seen that the input voltages to resolver 415 from the hand control unit are HCL, a voltage proportional to the amount of movement of the joy stick along the optical line of sight, and HCT, a voltage proportional to the amount of movement of the joy stick transverse or perpendicular to the optical line of sight. Whether the data is plus or minus is determined by the direction of movement of the joy stick. The shaft position input to resolver 415 is such that an angle $\theta_g''$ is provided between the rotor and stator coils thereof. The manner in which $\theta_g''$ is derived will appear as the description proceeds.

From FIG. 1 it will be apparent that resolving HCL and HCT through the angle $\theta_g''$ will provide output voltages proportional to HCP and HCC, respectively, since $HCP=HCL \cos \theta_g''-HCT \sin \theta_g''$ and $HCC=HCL \sin \theta_g''+HCL \cos \theta_g''$. HCP may be defined as a voltage proportional to the amount of movement of the joy stick parallel to the aircraft longitudinal axis and HCC may be defined as a voltage proportional to the amount of movement of the joy stick cross or perpendicular to the aircraft longitudinal axis. These output voltages, HCP and HCC, are fed through lines 417 and 418, respectively, to search mode switches S–17 and S–18, respectively. Since all search mode switches are transferred during the search mode of operation HCP and HCC are applied to heading unit (B), illustrated by numeral 420. Electromagnetic resolver 419 is mounted in this heading unit and is connected to receive voltages HCP and HCC from switches S–17 and S–18. The rotor coils of resolver 419 are positioned by the heading angle *h* with respect to the stator coils thereof so that the output voltages from resolver 419 are $HCP \cos h-HCC \sin h$ and $HCP \sin h+HCC \cos h$, which are equal to HCN and HCE, respectively. It will be remembered that the angle *h* is the angle between the longitudinal axis of the aircraft and north. Therefore, the voltages from the hand control unit have been resolved from the line of sight axes to north and east components. The means for obtaining the shaft position angle *h* will now be explained. The compass (not shown) supplies three-wire magnetic heading information to one set of windings of a differential generator 330 in the gyro control unit 729, FIG. *5b*. The other set of windings is placed at an angle to the first set of windings proportional to magnetic variation by means of the knob 331 and gear boxes 332 and 333. Counters 334 and 335 are connected to receive the shaft position from gear box 332 to display the variation. The output voltage from said other set of windings is the heading angle *h*. This information is supplied over lines 336 to the stator of a control transformer CT–8 in heading unit (A), FIG. *5a*. The rotor output from the control transformer is supplied to a servo unit 338 which positions a shaft at the angle *h*. This shaft position is connected through gear boxes 339 and 340 to the rotor of a synchro-generator 341. The stator of the synchro-generator is connected through lines 342 to the stator of a control transformer CT–9. The voltage on the rotor of CT–9 is connected to a servo unit 337, the output of which is a shaft position. This shaft position is connected through gear boxes 343 and 344 to the rotor of CT–9. Thus, the heading angle *h*, as a shaft position, is obtained in heading unit (A) and heading unit (B).

Voltages representing HCN and HCE are fed through lines 421 and 422, respectively, to memory point clutch switches MPC–6 and MPC–7, respectively, in FIGS. *5e* and *5f*, respectively. Since the relays which operate these latter switches are unenergized, the switches pass the signal voltage on to servo amplifiers AS–8 and AS–7, respectively.

Figure 10A:
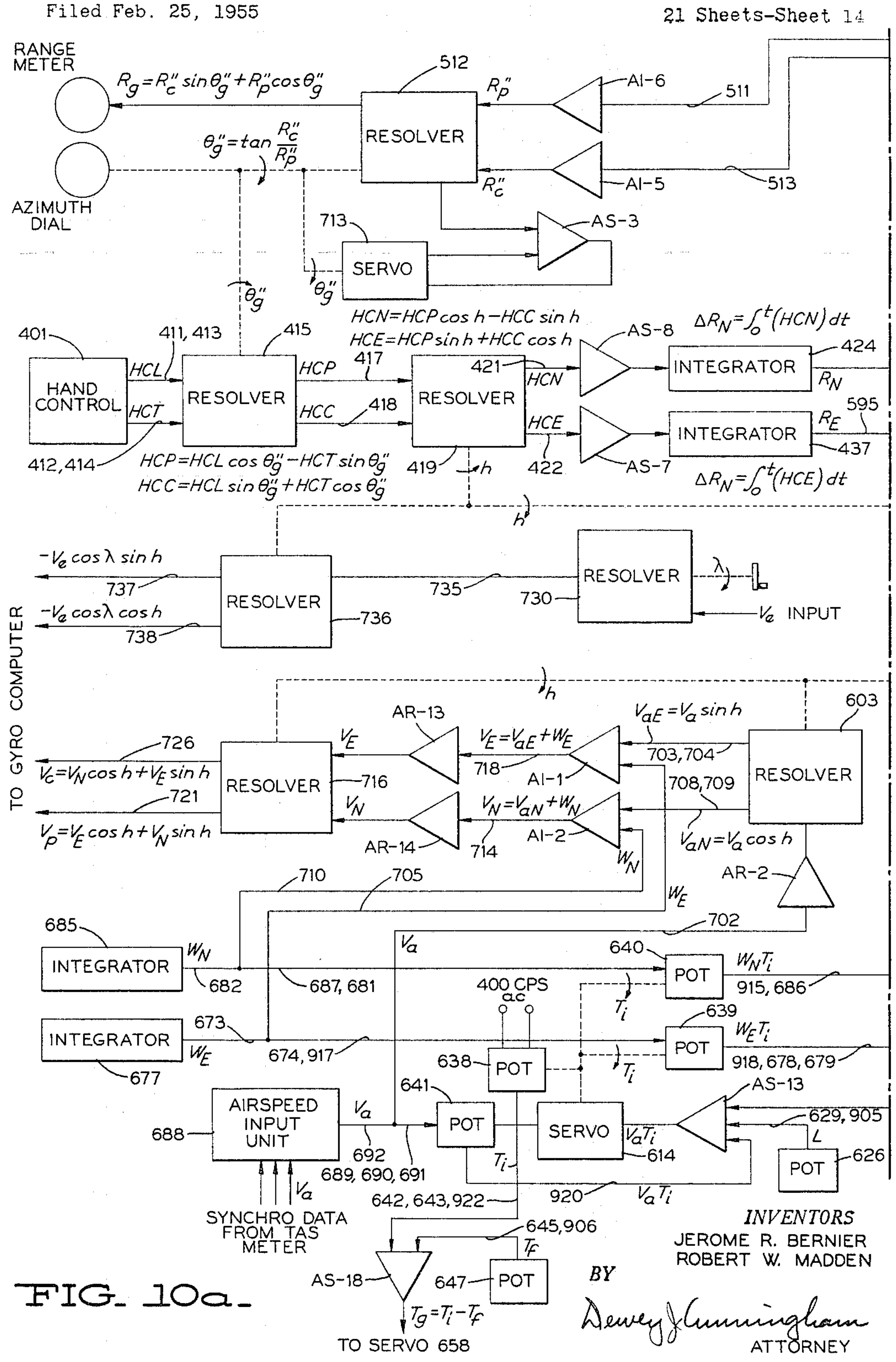
Figure 10B:
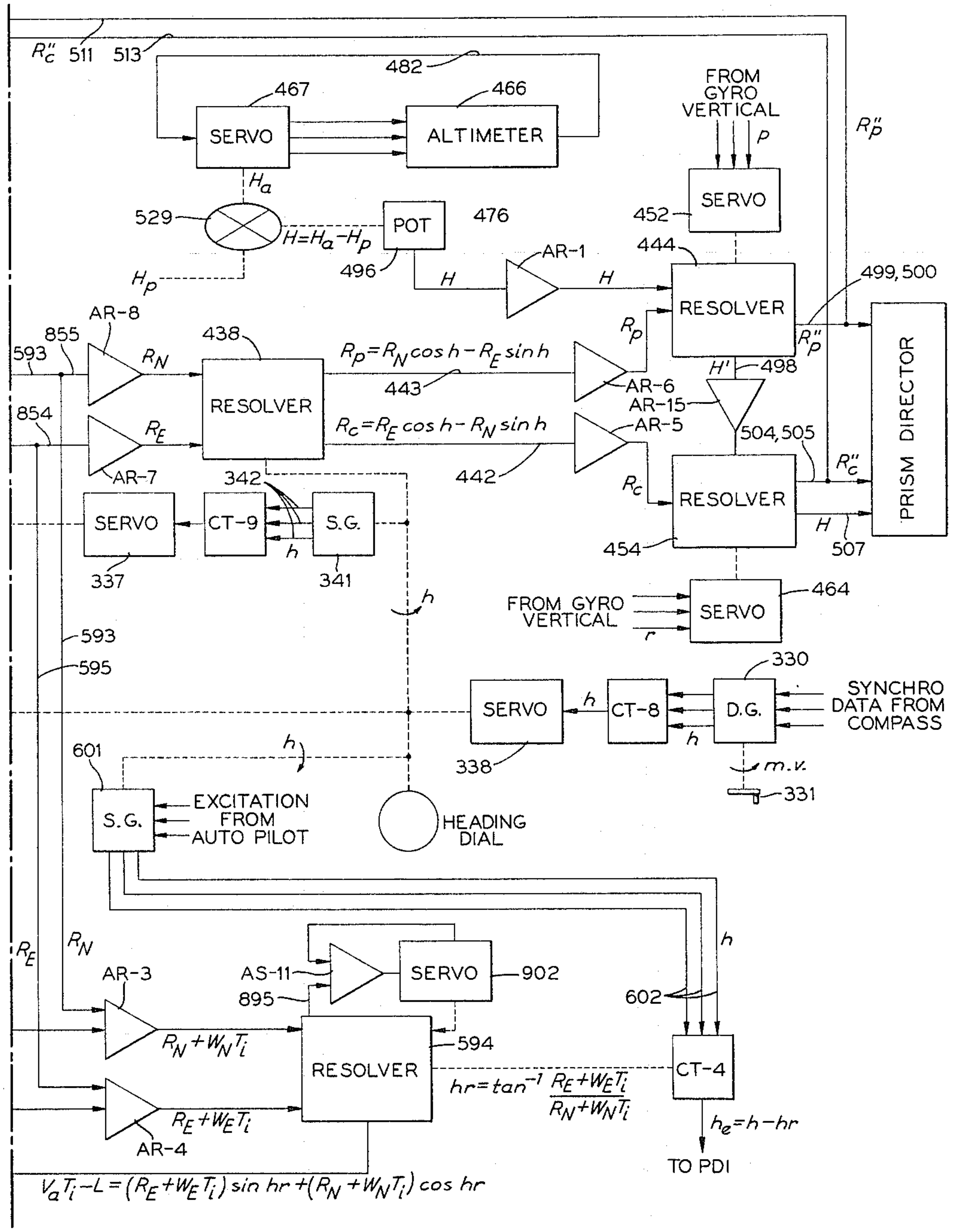

From amplifier AS–8 the output voltage is fed to the north wind unit 425 through line 427. Inside the north wind unit the voltage is applied to motor 423 of integrator 424. The integrator also includes a generator 426 which is shaft-connected to and driven by motor 423. The motor and generator set are both two-phase in character. It will be understood that the motor and generator are supplied with reference voltages. Generator 426 is shaft-connected to drive slider 428 of potentiometer 431 through reduction gear boxes 429 and 430. The center tap of potentiometer 431 is grounded in the search mode and a 400 c.p.s. A.C. voltage is applied in phase opposition to the end terminals thereof. The outptu voltage from integrator 424, as seen in FIG. 10, is proportional to the north component of range, $R_N$, from the aircraft to the position of the crosshairs, measured on the ground. That is, the potentiometer slider will be moved by an amount $\Delta R_N$ which is equal to the integral of HCN with respect to time between time $t_0$ and $t_1$, so that a new value of $R_N$ exists on slider 428. The feed-back loop for amplifier AS–8 is from generator 426 through line 432. Magnetic clutch 434 forms a part of the integrator and is connected to by-pass gear box 430 when energized. The integrator clutch switch IC–1, when in its open position, connects the magnetic clutch to ground. However, when the switch is closed, a voltage is applied to the clutch winding and gear box 430 is by-passed. In so doing, a voltage from the hand control unit will cause slider 428 to move much faster along the potentiometer so that the crosshairs of the periscope will move faster to a desired position.

From amplifier AS–7 the voltage is fed to the east wind unit 435 through line 436. Inside the east wind unit the voltage is applied to integrator 437 which is identical to integrator 424 in the north wind unit. It is believed unnecessary to discuss the details of integrator 437 other than to state that the output from the potentiometer thereof is a voltage proportional to the east component of range, $R_E$. Integrator clutch switch IC–2 controls the magnetic clutch of integrator 437.

$R_N$ from integrator 424 is fed through search mode switch S–1 to resolver amplifier AR–8, the output of which is fed through line 440 to resolver 438 in heading unit (A), illustrated by reference numeral 439. $R_E$ from integrator 437 is fed through search mode switch S–2 to resolver amplifier AR–7, the output of which is fed through line 441 to resolver 438. The rotor coils of resolver 438 are positioned by the heading angle $h$ with respect to the stator coils thereof. One of the stator coils in resolver 438 has the end terminals thereof connected to search mode switches S–11 and S–13 while the other stator coil has the end terminals thereof connected to search mode switches S–12 and S–14. These switches are shown in the positions they occupy when their operating coils are de-energized so that switches S–13 and S–14 connect to ground while switches S–11 and S–12 connect to lines 442 and 443, respectively. When switches S–11, S–12, S–13 and S–14 are transferred, the output of resolver 438 feeds through switches S–13 and S–14 to lines 442 and 443. The effect of these switches is to invert the phase of the output voltages from the resolver.

The output voltages on lines 442 and 443, as seen in FIG. 10, are proportional to $R_p$ and $R_c$, respectively, since $R_p = R_N \cos h + R_E \sin h$ and $R_c = R_N \sin h - R_E \cos h$.

Line 442 supplies the voltage representing $R_p$ to resolver amplifier AR–6 the output of which is fed to resolver 444 in pitch unit 445. The rotor coils of resolver 444 are rotated through the pitch angle $p$ from the stator coils thereof. The pitch angle $p$ is obtained from the gyro vertical unit 456, which includes a conventional gyroscope mounted in a vertical plane along the longitudinal axis of the aircraft for providing three-wire pitch information through line 453 to control transformer CT–1. The pitch information is connected to the three stator coils of CT–1, the rotor coil of CT–1 being connected to shaft 446. As long as the rotor coil is perpendicular to the resultant field set up in the stator coils, no output voltage is fed from the rotor coil through line 447 to servo amplifier AS–9. However, should the aircraft pitch, an output voltage is fed to amplifier AS–9. This voltage is amplified and fed to one winding of two-phase motor 448 which drives generator 449. A feed-back voltage is applied from generator 449 to amplifier AS–9. Also, generator 449 is shaft-connected through reduction gear boxes 450 and 451 to the rotor of resolver 444. The last-mentioned rotor is connected through shaft 446 to the rotor of control transformer CT–1. Therefore, as long as there is an output voltage from the rotor of CT–1 to amplifier AS–9, the motor and generator unit drives the rotor of CT–1. Thus, the shaft input to the rotor of resolver 444 is proportional to the pitch angle $p$. Control transformer CT–1, motor 448 and generator 449 make up a servo which is illustrated by block 452 in FIG. 10.

Line 443 supplies the voltage representing $R_c$ to resolver amplifier AR–6, the output of which is fed to resolver 454 in roll unit 455. The rotor coils of resolver 454 are rotated through the roll angle $r$ from the stator coils thereof. The roll angle is obtained from the gyro vertical unit 456, which includes a conventional gyroscope mounted in a vertical plane along the transverse axis of the aircraft for providing three-wire roll information through line 457 to control transformer CT–3, also in the roll unit. The roll information is connected to the three stator coils of CT–3, the rotor coil of CT–3 being connected to shaft 458. As long as the rotor coil is perpendicular to the resultant field set up in the stator coils, no output voltage is fed from the rotor coil through line 459 to servo amplifier AS–12. However, should the aircraft roll, an output voltage is fed to amplifier AS–12. This voltage is amplified and fed to one winding of two-phase motor 460 which drives generator 461. A feed-back voltage is applied from generator 461 to amplifier AS–12. Also generator 461 is shaft-connected through reduction gear boxes 462 and 463 to the rotor of resolver 454. The last-mentioned rotor is connected through shaft 458 to the rotor of control transformer CT–3. Therefore, as long as there is an output voltage from the rotor of CT–3 to amplifier AS–12, the motor and generator unit drives the rotor of CT–3. Thus, the shaft input to the rotor of resolver 454 is proportional to the angle $r$. Control transformer CT–3, motor 460 and generator 461 make up a servo which is illustrated by block 464 in FIG. 10.

The altitude of the aircraft above the target, H, is also fed as an input voltage to resolver 444. The altitude input unit 465 cooperates with altimeter unit 466 to furnish a voltage proportional to H.

The altitude input unit includes a servo 467 comprising a motor 468 which is shaft connected to a generator 469, said generator having a feed-back loop through servo amplifier AS–2 to motor 468. The generator is shaft-connected to the rotor of control transformer CT–5 through reduction gear boxes 471, 472 and 473, and magnetic clutch 470. The generator is also connected through reduction gear boxes 471 and 474 to counter 475. The altimeter unit is shown schematically in FIG. 12. The stator windings of control transformer CT–5 are connected through lines 476 to the stator windings of control transformer CT–6 which is a part of altimeter 466. The rotor 477 of the control transformer is stationarily mounted with respect to the stator coils thereof and a cylindrical hollow section 478 is rotatably mounted therebetween on a shaft 479. One end of section 478 presents an oblique surface. The last-mentioned shaft is connected through appropriate gearing to a shaft 480, the rotation of which is controlled by a pressure variation device in the form of a diaphragm 481. In operation, the rotor winding of CT–5 is excited by a 400 c.p.s. A.C. input voltage. The position of this rotor with respect to the stator coils induces a voltage therein to produce a resultant radial flux which is fed to the stator coils of CT–6 in the altimeter. Any of this flux which links the rotor winding 477 produces an output voltage whose amplitude is a sinusoidal function of relative positions of the rotor and the resultant stator flux. This output voltage is fed through line 482 and switch AC–2 to amplifier AS–2, the output of which operates motor 468 which drives the rotor of CT–5 to a position which will change the resultant radial flux in the stator winding of CT–5. This change in resultant radial flux is fed to CT–6 until no part of it cuts rotor winding 477 associated therewith. Therefore a shaft position H*a* is set in servo 467. This shaft position is picked from gear box 472 and fed to mechanical differential 483. The shaft output from gear box 471 is fed through gear box 474 so that counter 475 indicates numerically the altitude above sea level H*a*. It will be seen that as the altitude of the aircraft varies, the oblique cylindrical section 478 is rotated. This rotation causes a change in the axial field component linking the rotor and stator windings so that a voltage is induced in rotor winding 477 which is fed to servo 467 to change the rotor position of CT–5. This, of course, puts a new value of H*a* on differential 483 and counter 475. The rotor of CT–5 induces a new resultant radial flux in the stator coils thereof which is fed to the stator coils of CT–6. When the flux in the stator coils of CT–6 has changed to a position such that no voltage is induced in rotor winding 477, motor 468 reaches a null.

The initial setting of H*a* on the the counter may be made when the aircraft is at a known altitude, such as the landing field. This is accomplished by closing altitude calibration switches AC–2 and AC–3. The latter switch energizes magnetic clutch 470 so as to disconnect motor 468 from its driving relationship with the rotor in CT–5. The closing of switch AC–2 connects amplifier AS–2 to lead 484 which is connected to slider 404 of potentiometer 406 in the hand control unit. Thus, if the operator presses button 407 to close the dead man switch 408 a voltage is applied to potentiometer 406. During the calibration operation, of course, the search mode switches are open, i.e., in the position shown. Therefore, movement of the joy stick along the longitudinal axis of the aircraft moves slider 404 so that an output voltage is applied to amplifier AS–2 in the altitude input unit so that motor 468 is started. When the motor places the proper value of H*a* in counter 475, dead man button 407 is released. When the aircraft takes off on a mission, the altimeter changes the value of H*a* by an amount ΔH*a*.

It will be seen that H*p*, the altitude of the target, is equal to *Ha—H*. Since H*a* and H*p* are known, the altitude of the aircraft above the target, H, is equal to *Ha—Hp*. Therefore, the operator may move switch SW–1, on the altitude input unit, to any of contacts 485, 486, 487 or 488. Contacts 485 and 486 are connected through micro-switch 489 to one side of a center-grounded control winding of two-phase motor 490. Contacts 487 and 488 are connected through micro-switch 491 to the other side of the control winding in motor 490. Contacts 485 and 487 are connected to their respective switches through resistors so that the motor can be driven at a slower speed than when switch SW–1 is connected to contacts 486 or 488. Therefore, the motor may be driven in either direction at two different speeds, since the control winding is center-grounded. Motor 490 is shaft-connected through gear box 492 to counter 493. Thus, the operator can drive the counter to any desired value of H*p*. Motor 490 is also shaft-connected to differential 483 through reduction gear boxes 492 and 494. The shaft output from differential 483 is connected to move slider 495 along potentiometer 496. The voltage on slider 495 is fed to resolver amplifier AR–1, FIG. 5*c*, through line 380, the output of said amplifier being fed to the other stator winding of resolver 444. Thus, voltages representing H and R*p* are applied to the two stator windings of said resolver.

The shaft output from differential 483 in the altitude input unit connects through reduction gear box 497 to operate micro-switches 489 and 491 as limit switches. Since potentiometer 496 is usually of the helical type containing in the order of ten turns, slider 495 will traverse the entire potentiometer in ten revolutions. Reduction gear box 497 provides one revolution output for ten and one-half revolutions of the shaft output from differential 483. Any conventional means may be used for opening micro-switches 489 or 491 when slider 495 reaches the limits of movement at each end of the potentiometer. For example, a cam could be connected to the shaft from gear box 497 so that a projection thereon could operate switches 489 and 491 when said cam has traversed slightly less than 360° in either direction. Thus, if switch SW–1 should be connected to operate motor 490 to place an input into differential 483 such that the output from said differential drives slider 495 to one end of potentiometer 496, the proper micro-switch 489 or 491 will be opened to stop motor 490.

The rotor coils of resolver 444 are positioned by the pitch angle *p*, which is obtained in the manner previously disclosed, from the stator coils thereof. Therefore, the output voltages from the resolver, as seen in FIG. 10, will be proportional to $R_p''$, which is range parallel $R_p$ corrected for pitch, and H′, which is altitude H corrected for pitch. These outputs are obtained since $$R_p''=R_p \cos p-H \sin p \text{ and } H'=H \cos p+R_p \sin p$$

The output voltage proportional to H′ is fed through line 498 to resolver amplifier AR–15, the output of which is fed to one winding of the stator of resolver 454, the other winding of said stator being connected to receive $R_c$ from amplifier AR–6. As previously mentioned, the rotor coils are displaced from the stator coils by the roll angle *r*. Therefore, the output voltages from the rotor coils will be $R_c \cos r+H' \sin r$, which is equal to $R_c''$, and $H' \cos r-R_c \sin r$, which is equal to H″. The voltage $R_c''$ is $R_c$ corrected for roll and the voltage H″ is H corrected for both roll and pitch.

Figure 5D:
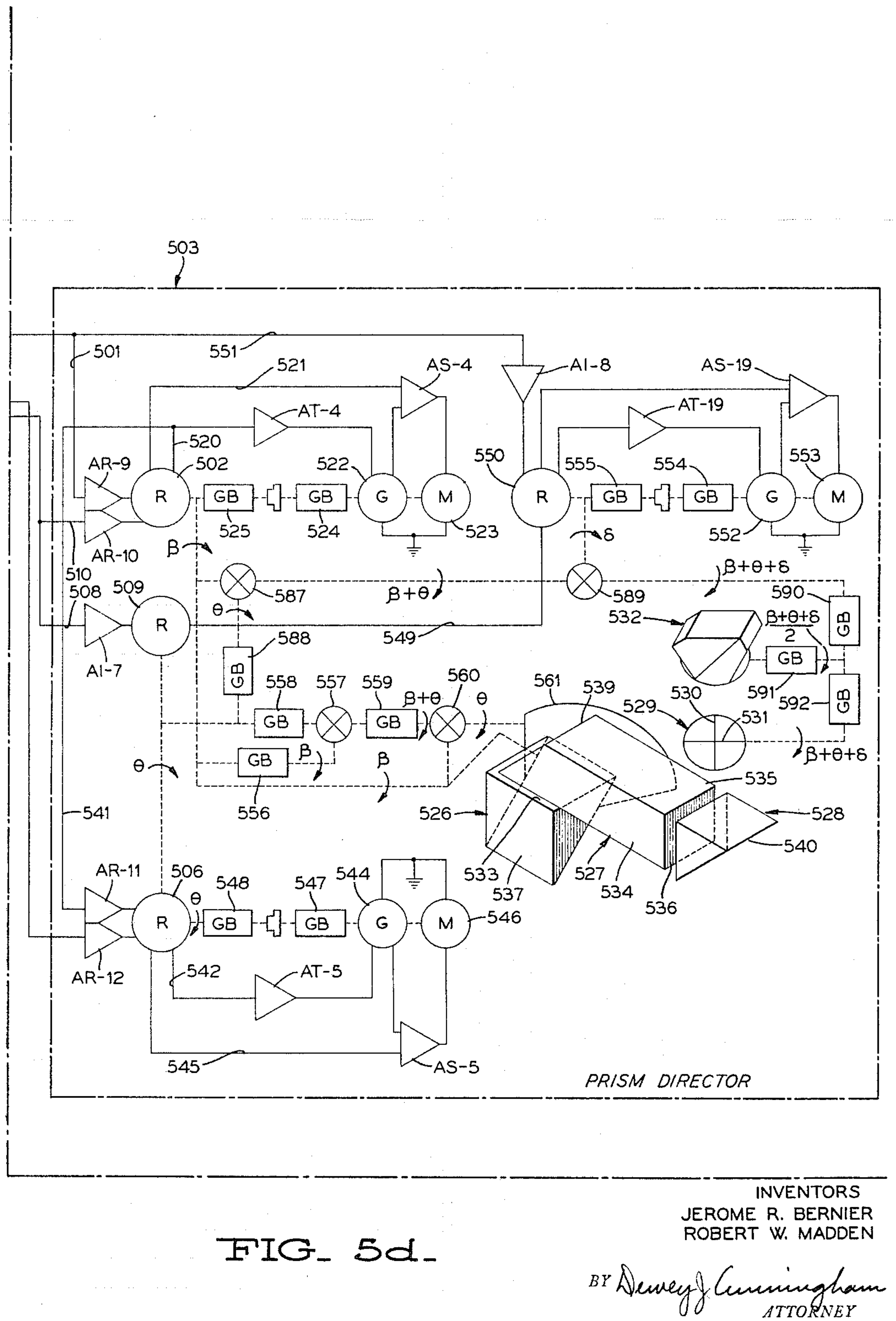
Figure 6:
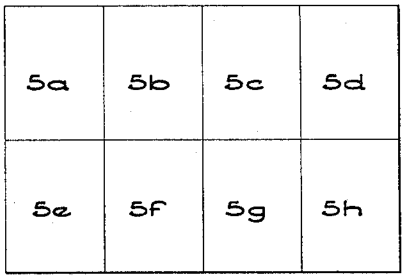

The voltage representing $R_p''$ is fed from resolver 444 through lines 499, 500 and 501 to resolver amplifier AR–9, the output of which is applied to one of the stator coils of resolver 502 in the prism director unit 503, FIG. 5*d*. The voltage representing $R_c''$ is fed from resolver 454 through lines 504 and 505 to resolver amplifier AR–12, the output of which is applied to one of the stator coils of resolver 506 in prism director unit 503. The voltage representing H″ is fed from resolver 454 through lines 507 and 508 to isolation amplifier AI–7, the output of which is fed to one of the stator coils of resolver 509 in the prism director unit. Line 510 connects to line 508 to connect H″ to resolver amplifier AR–10, the output of which is connected to the other stator winding of resolver 502.

$R_p''$ is also fed through lines 499 and 511 to isolation amplifier AI–6 in azimuth unit 416, FIG. 5*a*, the output from said amplifier being fed to one of the stator coils of resolver 512. $R_c''$ is also fed through lines 504 and 513 to isolation amplifier AI–5 in azimuth unit 416, the output from said amplifier being fed to the other of the stator coils of resolver 512. The angle between the rotor and stator coils of resolver 12 is $\theta_g''$ and is obtained in the following manner. The output voltage from one rotor coil is $R_c'' \sin \theta_g''+R_p'' \cos \theta_g''$ which is equal to the ground range to the target, $R_g''$, this voltage being fed through line 514 to tachometer amplifier AT–3, the output of which is fed to the reference or excitation winding of generator 515. The output voltage from the other rotor coil of resolver 512 is $R_c'' \cos \theta_g''-R_p'' \sin \theta_g''$ which is equal to zero when the angle between the rotor and stator coils are angularly displaced by the correct value of $\theta_g''$. This last-mentioned voltage is fed through line 517 and servo amplifier AS–3 to the control winding of motor 516, said motor being shaft-connected to generator 515, the output winding of said generator being connected in feed-back relation to amplifier AS–3, thus bucking out the input voltage to the motor from resolver 512, motor 516 and generator 515 from a servo unit 713. The shaft of generator 515 is connected through reduction gear boxes 518 and 519 to the rotors of resolvers 415 and 512. Assuming that $R_c'' \cos \theta_g''-R_p'' \sin \theta_g''$ is equal to zero, no voltage is fed to motor 516 to drive the resolver rotors. Therefore, the angle between the rotor and stator coils of resolvers 415 and 512 is the correct value of $\theta_g''$. Should $R_c'' \cos \theta_g''-R_p'' \sin \theta_g''$ not be equal to zero, a voltage is applied to motor 516 which is driven until the angular position between said rotor and stator coils is such that $R_c'' \cos \theta_g''-R_p'' \sin \theta_g''$ is equal to zero. It will now be apparent how the angle $\theta_g''$ is derived.

The prism director unit, illustrated by numeral 503, is controlled by the afore-mentioned inputs thereto, $R_p''$, $R_c''$ and H''. Resolver 502 receives $R_p''$ and H'' on the two stator windings thereof. The rotor windings thereof are displaced by the angle $\beta$ from said stator windings. The means for obtaining the angle $\beta$ will now be explained in detail. Assuming that an angle exists between the rotor and stator windings which is $\beta$, the output from the rotor windings will be $R_p'' \cos \beta+H'' \sin \beta$, which is equal to $D \cos \theta$, and $R_p'' \sin \beta-H'' \cos \beta$, which is equal to zero when the correct angle of $\beta$ is in the resolver. The voltage proportional to $D \cos \theta$ is supplied through line 520 to tachometer amplifier AT-4, the output of which is fed to the excitation winding of generator 522. The voltage proportional to $R_p'' \sin \beta-H'' \cos \beta$ is fed through servo amplifier AS-4 to the control winding of motor 523 which is shaft connected to generator 522. The voltage from the generator output winding is fed back to motor 523 through amplifier AS-4. Gear boxes 524 and 525 serve to connect generator 522 with the rotor of resolver 502. As long as $R_p'' \sin \beta-H'' \cos \beta$ is equal to zero the rotor of resolver 502 is maintained in one location. However, when $R_p'' \sin \beta-H'' \cos \beta$ is not equal to zero, a voltage is applied to the control winding of motor 523 which drives generator 522. The output voltage from the generator is fed back to the motor degeneratively. The motor rotates the rotor windings of resolver 502 until the output to the motor is zero. At this time the correct angle of $\beta$ is in the resolver. Also, by supplying the voltage from resolver 502 which is proportional to $D \cos \theta$ to generator 522 as the excitation therefor, the sensitivity of the motor generator set is increased. The excitation supplied to the generator is a maximum when the input to the control winding of the motor is zero. Therefore as soon as a small voltage is applied to the motor, the generator feeds back a bucking out voltage very quickly.

To obtain the angle $\theta$, voltages representing $R_c''$, from amplifier AR-12, and $D \cos \theta$, from resolver 502 through lines 520 and 541 and resolver amplifier AR-11, are applied to stator windings of resolver 506. Before any input voltage is applied to resolver 506 the rotor windings are displaced through an assumed angle $\theta$ from the stator windings thereof. Therefore the output voltages from the rotor windings are voltages representing $R_c'' \sin \theta+D \cos^2 \theta$, which is equal to the slant range D, and $R_c'' \cos \theta-D \cos \theta \sin \theta$, which is equal to zero when the rotor is properly positioned by the angle $\theta$. The voltage representing D is supplied from resolver 506 through line 542 to a tachometer amplifier AT-5, the output of which is fed to the excitation winding of generator 544. The voltage representing $R_c'' \cos \theta-D \cos \theta \sin \theta$ is supplied through line 545 to servo amplifier AS-5, the output of which is fed to the control winding of motor 546 which is shaft-connected to generator 544. When $R_c'' \cos \theta-D \cos \theta \sin \theta$ does not equal zero, a voltage proportional thereto is supplied to motor 546 which drives the rotor of resolver 506 through gear boxes 547 and 548. Thus, as soon as the rotor angle is changed so that $R_c'' \cos \theta-D \cos \theta \sin \theta$ is equal to zero, the correct angle of $\theta$ is in the resolver. The output of generator 544 feeds back a bucking out voltage to motor 546 through amplifier AS-5.

The rotor of resolver 506 is shaft-connected to the rotor of resolver 509 so as to feed the angle $\theta$ thereto. The voltage proportional to H'' is supplied to the stator winding of resolver 509 so that the output voltage from the rotor is proportional to $H'' \sin \theta$, which is fed through line 549 to one of the stator windings of resolver 550. The other stator winding of resovler 550 is connected through lines 499, 500 and 551 and isolation amplifier AI-3 to receive the voltage proportional to $R_p''$ from resolver 444 in FIG. 5c. The rotor windings of resolver 550 are displaced from the stator windings thereof by the de-rotation angle $\delta$, the need and derivation of which will be described at a later point in the specification. The output voltage from one of the rotor windings is $R_p'' \cos \delta+H'' \sin \theta \sin \delta$, which is supplied through tachometer amplifier AT-19 to the excitation winding of generator 552. The output voltage from the other of said rotor windings is $R_p'' \sin \delta-H'' \sin \theta \cos \delta$ and is supplied to the control winding of motor 553 through servo amplifier AS-19, said motor being shaft-connected to generator 552. The control winding of the motor thus receives the error signal, which is zero as long as $R_p'' \sin \delta-H'' \sin \theta \cos \delta=0$. When the error signal is zero, the rotor windings are properly displaced from the stator windings. A damping feed-back voltage is supplied from generator 552 through amplifier AS-19 to motor 553. The generator is shaft-connected through reduction gear boxes 554 and 555 to the resolver rotor. Now that the angles $\beta$, $\theta$ and $\delta$ have been developed, the periscope and the method by which it is driven through these angles will be described in detail.

The periscope is shown schematically in the prism director and includes a 45° declination prism 526, which is the $\theta$ prism, a polar prism 527, which is the $\beta$ prism, a fixed 45° prism 528, a reticle 529 which includes cross-hairs 530 and 531, and a de-rotation prism 532. It will be understood that the periscope includes other lens for focusing and power refinements. However, the prisms described are sufficient for an understanding as to how the bombing computer controls what the operator sees.

The $\theta$ prism 526 is adapted to rotate on a vertical axis centrally of and perpendicular to side 533 and is positioned beneath one end of the $\beta$ prism. The $\beta$ prism 527 rotates on a central axis extending longitudinally thereof parallel to the mutually perpendicular sides 534 and 535 and parallel to the wing axis of the aircraft. The $\theta$ prism is moved with the $\beta$ prism when the $\beta$ prism is rotated. However, the $\theta$ prism rotates about its axis independent of the $\beta$ prism. Fixed prism 528 is mounted adjacent the other end of the $\beta$ prism adjacent surface 536 thereof. Reticle 529 and the de-rotation prism 532 are mounted above the fixed prism and are aligned therewith.

Figure 7:
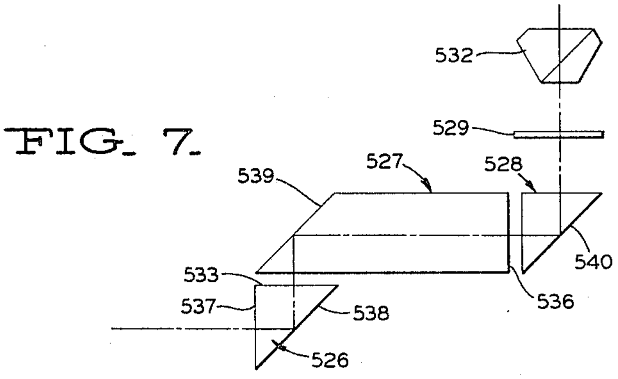
FIG. 7 is a schematic diagram of the periscope prisms.

As seen in the side elevation view, FIG. 7, the image of the landscape being viewed enters side 537 of prism 526 and is transmitted to the hypotenuse reflector surface 538. The image is then transmitted to the reflector surface 539 of prism 527 and then to the hypotenuse reflector surface 540 on prism 528. From said last-named surface the image passes through the reticle and de-rotation prism. De-rotation prism 532 may be that commonly referred to as a Schmidt de-rotation prism and is used to take out the image rotation between prisms 526 and 527 and prisms 527 and 528 and to correct for the image rotation caused by the arrangement of prism axes.

The drive for the prisms is schematically shown in FIG. 5*d*, said figure also including the data flow information from the resolvers to the prisms. The $\beta$ prism 527 is rotated about its longitudinal axis by a direct shaft connection from the rotor of resolver 502 which is driven by motor 523. When the angle $\beta=0$, surface 535 of the $\beta$ prism is horizontal. Therefore, as the angle $\beta$ leaves zero, surface 535 is inclined to the horizontal by an amount equal to $\beta$. At the same time, face 537 of $\theta$ prism 526 will be inclined to the vertical by the same amount. The angle $\beta$, as a shaft rotation is supplied through gear box 556 to mechanical differential 557. The angle $\theta$, as a shaft rotation is supplied from the rotor of resolver 506 through gear box 558 to differential 557. The output from said differential will be a shaft rotation proportional to $\beta+\theta$, which is supplied through gear box 599 to a planetary gear differential 560. Also supplied to differential 560 is the shaft rotation representing $\beta$. Therefore, the shaft output represents the angle $\theta$ and is used to drive a $\theta$-sector 561 which is secured to the $\theta$ prism, said $\theta$-sector being parallel to face 533 on the $\theta$ prism. Therefore, as the $\theta$-sector is driven the $\theta$ prism moves about its axis, which is perpendicular to surface 533, proportional to the angle $\theta$.

Figure 9:
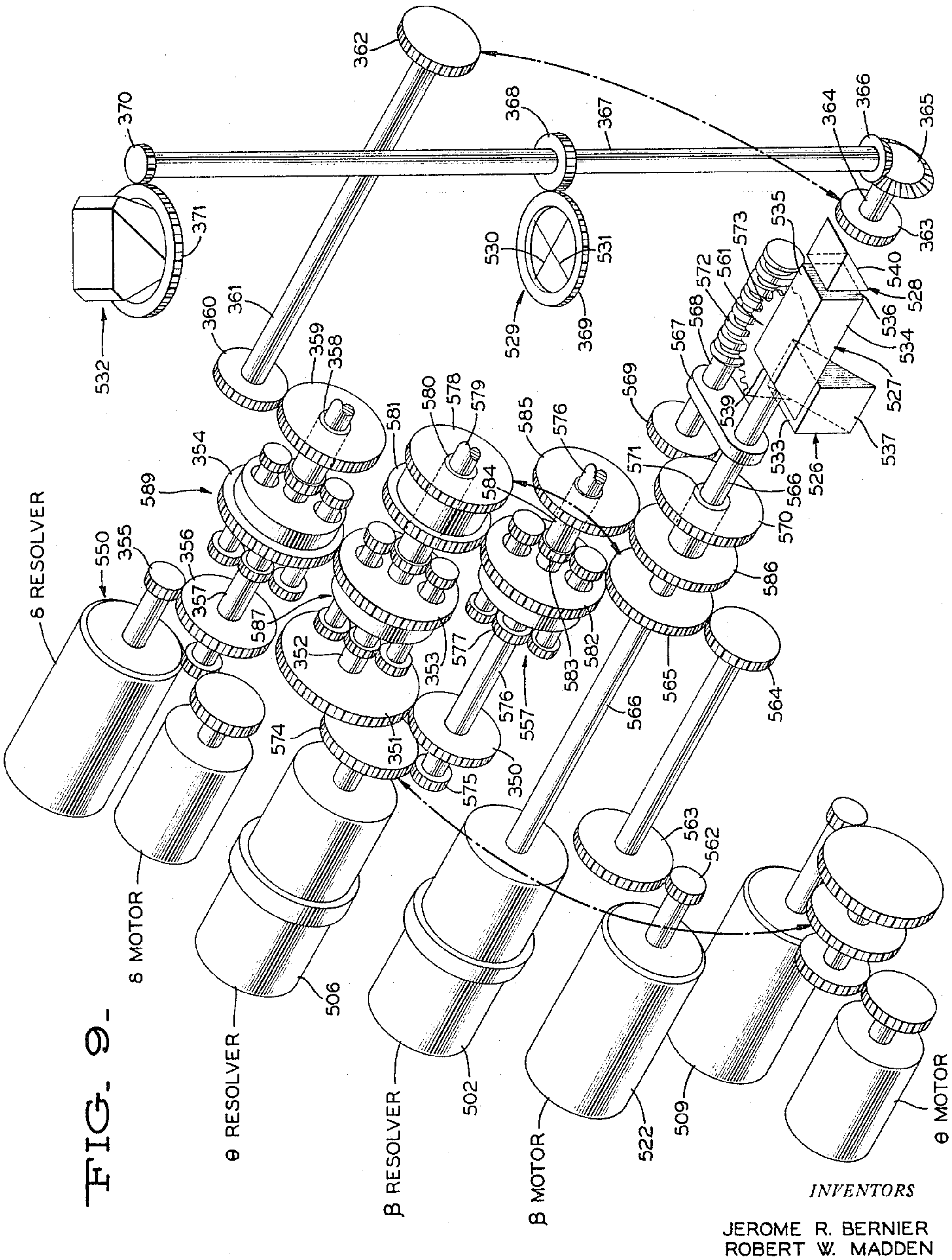
FIG. 9 is a schematic diagram of the prism drive mechanism.

The mechanical means by which the prisms may be driven is clearly illustrated in FIG. 9, which is a mechanical schematic showing of a portion of the drive mechanism. The $\beta$ motor 522 is connected to drive the rotor of the $\beta$ resolver 502 through gears 562, 563, 564 and 565, the last-named gear being secured to the rotor shaft 566 which is secured to the hypotenuse surface 539 of the $\beta$ prism. A yoke 567 is keyed to shaft 566 at one end thereof. A shaft 568 is journaled in the other end of said yoke. On one end of shaft 568 is secured a gear 569 which meshes with gear 570 secured to a sleeve bearing 571 journaled on shaft 566. The other end of shaft 568 has a worm gear 572 secured thereto which is in mesh with teeth 573 on sector 561. Thus, it will be obvious how the $\theta$ prism is maintained in its correct position with respect to the $\beta$ prism without actually being secured thereto. The rotor shaft of $\theta$ resolver 506 is connected through meshing gears 574 and 575 to shaft 576. This shaft is connected to sun gear 577 of differential 557, thus placing $\theta$ into the differential. Gear 578 is mounted on a sleeve 580 shown journaled on a shaft 579. As indicated by the double-ended arrow, gear 578 is adapted to mesh with gear 565 on shaft 566. A gear 581 is also mounted on sleeve 580 for meshing with ring gear 582 of differential 557 so as to place $\beta$ into the differential. Sun gear 583 of differential 557 is secured to one end of sleeve 584 which is journaled on shaft 576, sleeve 584 being rotated at a rate proportional to $\beta+\theta$. A gear 585 is also secured to sleeve 584 and is positioned to mesh with gear 586 secured to sleeve 571. Thus, gear 570 rotates proportional to $\beta+\theta$. When shaft 566 rotates proportional to $\beta$ gear 569 is caused to walk around gear 570 in a manner to subtract $\beta$ from the $\beta+\theta$ rotation on gear 570, thus causing gear 569 to rotate proportional to $\theta$. It will be seen that gears 570 and 569 in conjunction with yoke 567 forms the planetary differential illustrated schematically in FIG. *5d* by numeral 560.

In operation, should $\theta$ be zero and $\beta$ be something other than zero, the $\beta$ prism 527 would rotate about its axis, carrying the $\theta$ prism 526 therewith. However, the $\theta$ prism would not rotate. Since gear 570 is rotating at a speed proportional to $\beta+\theta$, which in this instance is $\beta$, and gear 569 is walking around gear 570 through the angle $\beta$, gear 569 does not rotate, thus keeping $\theta$ at zero. When $\beta$ is zero and $\theta$ is something other than zero, gear 570 rotates an amount proportional to $\beta+\theta$, which in this instance is $\theta$. Gear 569 also rotates proportional to $\theta$ to cause prism 526 to turn about its axis of rotation.

The shaft position $\beta$ is supplied to one side of differential 587 from the $\beta$ resolver through gears 565 and 578 and sleeve 580. The shaft position $\theta$ is supplied to the other side of differential 587 from the $\theta$ resolver through gears 574 and 575, shaft 576, gears 350 and 351, and shaft 352. Thus, the output from differential 587, which is equal to $\beta+\theta$, is supplied from ring gear 353 to ring gear 354 of differential 589. The shaft position $\delta$ is supplied to one side of differential 589 from resolver 550 through gears 355 and 356 and shaft 357. The output from the last-named differential, which is equal to $\beta+\theta+\delta$, is taken from the other side thereof and is supplied through sleeve 358, gears 359 and 360, shaft 361, gears 362 and 363, shaft 364, gears 365 and 366, shaft 367, and gears 368 and 369 to drive reticle 529, said reticle rotating with gear 369. A gear 370 is provided on shaft 367 and meshes with a gear 371. The de-rotation prism 532 is mounted to rotate with gear 371. The gearing is such that the de-rotation prism rotates proportional to $$\frac{\beta+\theta+\delta}{2}$$

The need for driving the reticle through the angle $\beta+\theta+\delta$ will now be explained in detail. It is desired that the crosshairs always be maintained so that the person viewing them through the periscope always sees the vertical crosshair in a vertical position. That is, if the crosshairs are brought to bear on a vertical object, the vertical crosshair would line up therewith. Due to the particular arrangement of prisms which the present system utilizes, rotation of the $\beta$ prism and/or the $\theta$ prism causes the image of an object to rotate. It is then necessary to rotate the reticle so that the vertical crosshair remains aligned with the vertical object. The de-rotation prism is used to return the image to its proper position so that the operator always views objects in their upright position.

When angles $\beta$ and $\theta$ are zero, surface 535 of prism 527 is horizontal and surface 537 of prism 526 is in a vertical plane parallel to side 534 of prism 527. Further, the reflecting surface 539 of prism 527 is parallel to the reflecting surface 540 of fixed prism 528. Thus, the entrance face 537 will view objects straight ahead of the aircraft under these circumstances.

It will be noted that the reflecting surface 538 of prism 526 is not parallel to the reflecting surface 539 when $\beta$ and $\theta$ are zero. Therefore, a vertical object which is straight ahead of the aircraft would be reflected from surface 538 to surface 539 where it would appear horizontal. When this image is reflected to surface 540 where it is again reflected through the crosshairs, the vertical crosshair is chosen to be that one which is aligned with this reflected image.

Should prism 526 now begin to rotate, the angle $\theta$ would no longer be zero. Also, the angular relationship between reflecting surfaces 538 and 539 would be changed. If a vertical object is viewed through face 537, its image would not be horizontal on surface 539 but would be rotated away from the horizontal through the same angle through which prism 526 was moved. Again, there would be no further rotation of the image from surface 539 to surface 540. However, since the image has been rotated by the first-mentioned pair of reflecting surfaces the image of the vertical object would appear at an angle to the vertical crosshair 530, this angle being equal to the angle through which prism 526 is rotated. Since it is desired that the vertical crosshair always be aligned with any vertical object viewed, the reticle must be rotated through the same angle through which prism 526 has rotated. This is the reason the reticle is driven through the angle $\theta$.

The reticle is driven additionally through the angle $\beta$ for a similar reason. If prism 527 is rotated through an angle, reflecting surface 539 will no longer be parallel to reflecting surface 540 so that the image will be rotated through the same angle. Therefore, the image of a vertical object would be rotated through the angle $\beta$, which would mean that the vertical crosshair would no longer be aligned with the image of a vertical object. Thus, the reticle must be rotated through the angle $\beta$.

The rotation of the reticle through $\beta$ is sufficient to align the vertical crosshair with the image of a vertical object as long as $\theta$ is equal to zero. Similarly, the rotation of the reticle through $\theta$ is sufficient to align the vertical crosshair with the image of a vertical object as long as $\beta$ is equal to zero. However, if neither $\beta$ nor $\theta$ are zero, the reticle must be rotated through an angle equal to $\beta+\theta$, plus an additional angle known as the de-rotation angle $\delta$. This angle, too, is caused by the particular arrangement of prisms used in the instant invention.

Perhaps a simple way of understanding why there exists the angle $\delta$ is to project the crosshairs from the reticle through the prisms to the entrance face 537 of prism 526. If the $\beta$ prism 527 is then rotated through 45°, for example, surface 537 will be inclined at an angle of 45° with respect to the vertical. This means that the axis of rotation of prism 526 is on an axis inclined 45° with respect to the vertical. In moving down through the angle $\beta$, i.e., 45°, the crosshairs on the reticle are rotated through 45° so that they still appear on the face 537 in the same position they started out in when $\beta$ was zero. Thus, the image of any vertical object straight ahead of the aircraft is still aligned with the vertical crosshair and no de-rotation angle $\delta$ exists. If the angle $\beta$ is equal to zero and the $\theta$ prism is moved through some angle, there is still no de-rotation angle $\delta$, i.e., $\delta=0$. It is only when both $\beta$ and $\theta$ are not equal to zero that $\delta$ is not equal to zero. For example, assume that the $\beta$ prism is rotated through 45°. Thus, the $\theta$ prism has its axis inclined with respect to the vertical. Assume also that the crosshairs have been rotated through 45° to bring the vertical crosshair into alignment with a vertical object. Should prism 526 now be rotated about its inclined axis through an angle $\theta$ of 45°, for example, the crosshairs are rotated through 45° also to keep them in their original position on face 537. However, should the operator now view a vertical object which the crosshairs intersect, the image of the vertical object will not be aligned with the crosshairs. The angle between the vertical object, projected onto the plane of the entrance face 537, and the vertical crosshair is known as the derotation angle $\delta$. Thus, it is necessary to drive the reticle through an additional angle $\delta$ to assure alignment between the vertical object and the vertical crosshair. Thus, the reticle has been driven through the angle $\beta+\theta+\delta$ to assure such alignment. It will be seen that the angle $\delta$ is created because the entrance surface 537 no longer rotates about a vertical axis. In going from a position of $\theta=0$ to $\theta=45°$, it rotates about an axis which is inclined with respect to the vertical.

Figure 8:
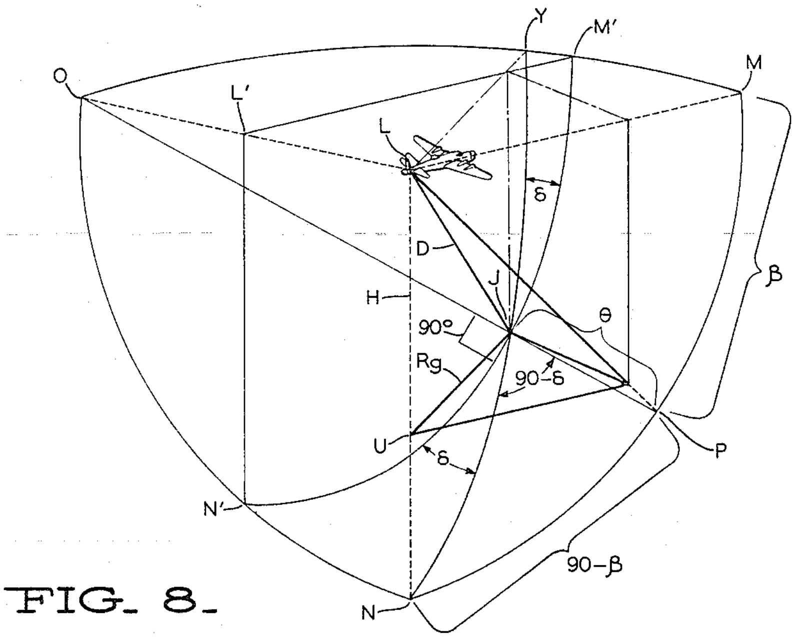
FIG. 8 is a geometrical diagram illustrating the derotation angle $\delta$.

A geometric representation of the angle $\delta$ may be seen in FIG. 8, which shows the octant of a sphere superimposed on the basic diagram shown in FIG. 1. The aircraft is located at the point L which is the center of the sphere of which the octant shown is a part. The aircraft fuselage axis is along the edge of the octant which is the intersection of planes LMN and LMO so that the aircraft is heading directly toward the point M. On the surface of the spherical triangle formed by points OMN the target point J is located. The $\beta$ prism rotates about the axis OL so that the vertical crosshair is in plane LMN and the horizontal crosshair is in plane LMO. When the $\beta$ prism is moved through the angle $\beta$ the crosshairs view a point P on great circle MN. The vertical crosshair still is in plane LMN. If a great circle is drawn from point P, at right angles to great circle MN, through the target J, it would intersect point O. Therefore, the horizontal crosshair would lie in the same plane as that through points OLPJ. As the crosshairs are moved through the angle $\theta$ by rotation of the $\theta$ prism, the horizontal crosshair continues in plane OLPJ. Since the vertical crosshair is perpendicular to the horizontal crosshair it would lie in a plane perpendicular to plane OLPJ and parallel to plane LMN. Such a plane is described by points L'M'N'. Thus, arc M'N' is perpendicular to great circle PJO and describes a portion of a lesser circle. A vertical object at the target lies in a vertical plane described by points LJU which includes the triangle sides H, D and $R_g$. This will be obvious from a reference to FIG. 1. To determine the intersection of the last-mentioned vertical plane on the spherical surface of triangle OMN, line H is extended to intersect point N. It is, of course, known that the plane intersects said spherical surface at point J. Next, $R_g$ is projected to the surface of plane OLM and extended until it intersects great circle OM at point Y. Thus, a great circle through points YJN forms an angle $\delta$ with respect to arc M'JN'. This angle $\delta$ is the angle between the vertical crosshair and a vertical object at the target both in the spherical surface of triangle OMN.

It will be seen that the great circle arc between points PN is equal to $90-\beta$ while the great circle arc between points PJ is equal to $\theta$. Referring to great circle YJN, the portion JN thereof makes a spherical angle $90-\delta$ with respect to great circle arc PJ. Therefore, arcs $\theta$, $90-\beta$, and the portion JN of great circle YJN form a right spherical triangle. The right spherical angle, of course, is between arcs PJ and PN. From the law of right spherical triangle it is known that $\sin\theta=\cot(90-\delta)\tan(90-\beta)$ which reduces to $\sin\theta=\tan\delta\cot\beta$. This expression in turn reduces to tan $$\delta=\frac{\sin\theta}{\cot\beta}$$

and further to $\tan\delta=\sin\theta\tan\beta$. Since $\tan\beta$ is equal to $H''/R_p''$, the substitution of this in the last equation shows that tan $$\delta=\frac{H''\sin\theta}{R_p''}$$

It will be remembered that voltages proportional to $H''\sin\theta$ and $R_p''$ were fed to resolver 550 as inputs thereto. Resolver 550 is in reality a tangent solver so that the angle through which the resolver rotor windings move with respect to the stator windings thereof is equal to the angle $\delta$. Therefore, in order that the vertical crosshair be aligned with the image of a vertical object, it must be rotated additionally through the angle $\delta$.

From the above, it will be seen that if the recticle was viewed directly without going through the de-rotation prism 532, both the image and reticle crosshairs would rotate according to the angles $\beta+\theta+\delta$. It is desirable for the operator to always view the objects as though they were directly ahead of the aircraft. In order to do so, the image on the reticle, as well as the reticle crosshairs, must be rotated through the angle $$\frac{\beta+\theta+\delta}{2}$$

To accomplish this, the de-rotation prism is provided. This prism brings the image and crosshairs to a position such that, no matter where the target is with respect to the aircraft, the operator always views them as being straight ahead and right side up. It will be remembered that the image is rotated through $\beta+\theta+\delta$. However, the de-rotation prism is driven through $$\frac{\beta+\theta+\delta}{2}$$

The reason for driving the de-rotation prism through one-half the angle through which the reticle and image rotate will be obvious from the following simple example. If a mirror is held in a horizontal plane, a ray of light inclined to the vertical by 30° striking the mirror has an angle of incidence of 30°. The angle of reflection will also be 30° since the angle of incidence is equal to the angle of reflection. The angle between the entering ray of light and the reflected ray of light is therefore 60°. If the mirror is then inclined to the horizontal by an angle of 30°, the ray of light will now have an angle of incidence of 60° and an angle of reflection of 60°. The total angle is therefore 120°. Thus, if a mirror is moved through an angle of 30° there is an angular shift of 60° in the ray of light. Conversely, should the mirror be retained horizontal and the ray of light shifted so that the angle between the entering ray of light and the reflected ray of light is changed by a total of 60°, it is only necessary to rotate the mirror through 30° to bring the angular relationship between the entering and reflected ray of light back to their original relationship. The same is true of the de-rotation prism. To bring the image and crosshairs which have been rotated through $\beta+\theta+\delta$ back to their original position, the de-rotation prism must be rotated through $$\frac{\beta+\theta+\delta}{2}$$

To briefly summarize the search mode of operation, particular reference is made to the data flow diagram illustrated in FIG. 10. Assuming that the operator desires to search a particular area for a target, the joy stick in the hand control unit is operated to provide output voltages proportional to HCL and HCT. These voltages are resolved through the angle $\theta_g''$ to obtain voltages proportional to HCP and HCC. These voltages are resolved through the angle $h$ to obtain voltages proportional to HCN and HCE. To obtain voltages proportional to $R_R$ and $R_E$, the voltages HCN and HCE are integrated in the north wind and east wind units. The $R_N$ and $R_E$ voltages are again resolved through the angle $h$ to obtain $R_p$ and $R_c$, respectively. The altitude of the aircraft above the target is resolved through the pitch and roll angles to obtain an output voltage proportional to H''. Voltages proportional to $R_p''$ and $R_c''$ are obtained by resolving through the pitch angle $p$ and roll angle $r$, respectively. The prism director, as shown in FIG. 5*d*, takes the voltages proportional to $R_p''$, $R_c''$ and H'' and provides shaft rotations proportional to the angles $\beta$, $\theta$ and $\delta$ which are used to drive the periscope prisms. Thus, in the search mode, the periscope prisms are moved only as directed by the joy stick so as to bring the crosshairs on a desired target.

Additional functions are performed in the computer during the search mode of operation. The heading error $h_e$ and the time-to-go $T_g$ are computed.

Figure 5E:
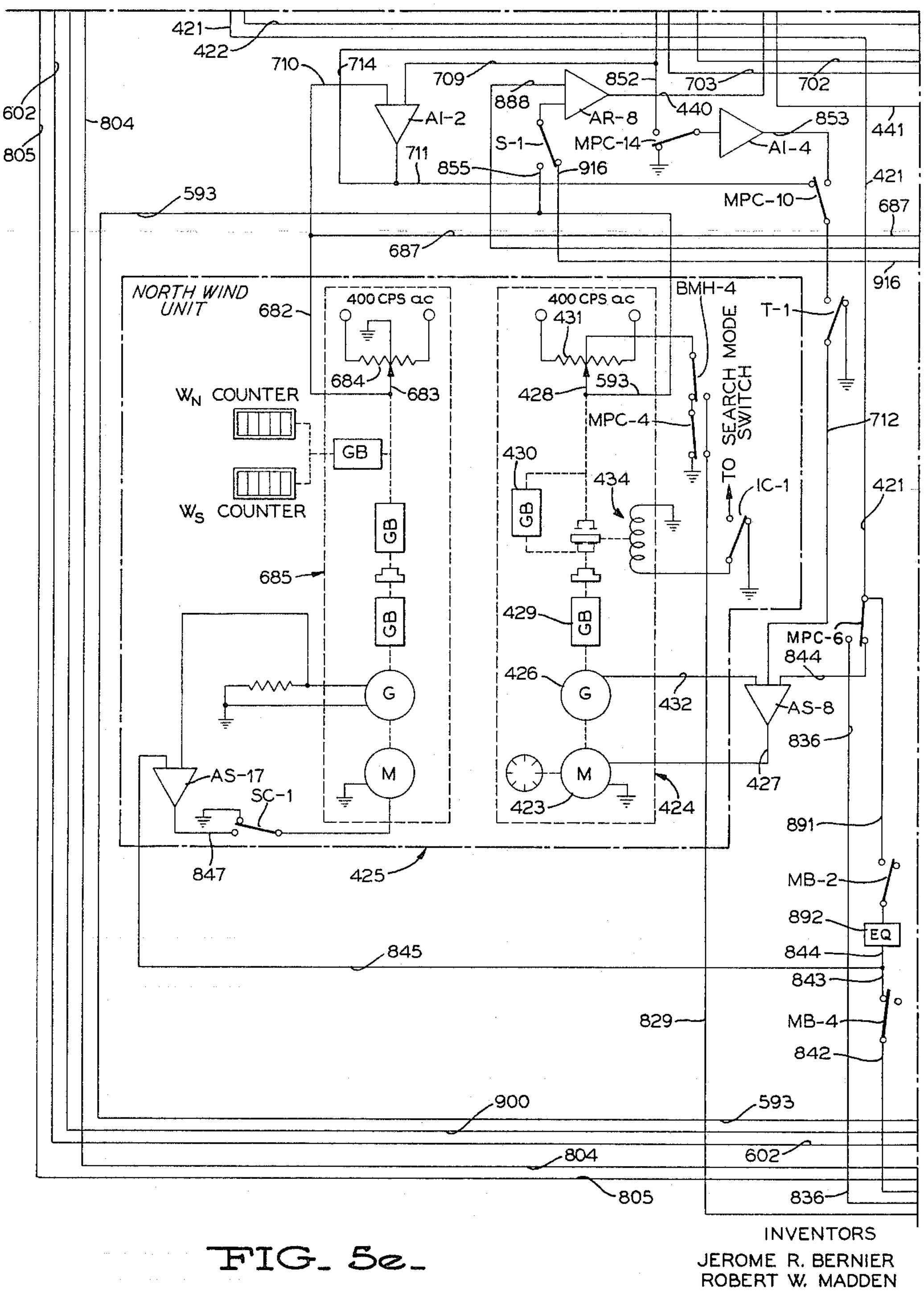

Referring to FIG. 5*e*, from the north wind unit 425, a voltage proportional to the north component of range $R_N$ is provided on slider 428 of potentiometer 431. This voltage is supplied from said slider to line 593 which connects to search mode switch S–16 and resolver amplifier AR–3. It will be remembered that all switches are shown in their untransferred position. However, during the search mode, all search mode switches are transferred so that the voltage $R_N$ is fed to amplifier AR–3 in the release heading unit 680. An additional voltage proportional to $W_NT_i$ is fed in a subtracting manner to amplifier AR–3 from line 686 through switch S–9 so that the output voltage therefrom is proportional to $R_N-W_NT_i$. The means for providing $W_NT_i$ will be explained as the description proceeds. The voltage $R_N-W_NT_i$ is fed to one stator winding of resolver 594 through search mode switch S–8.

Figure 5F:
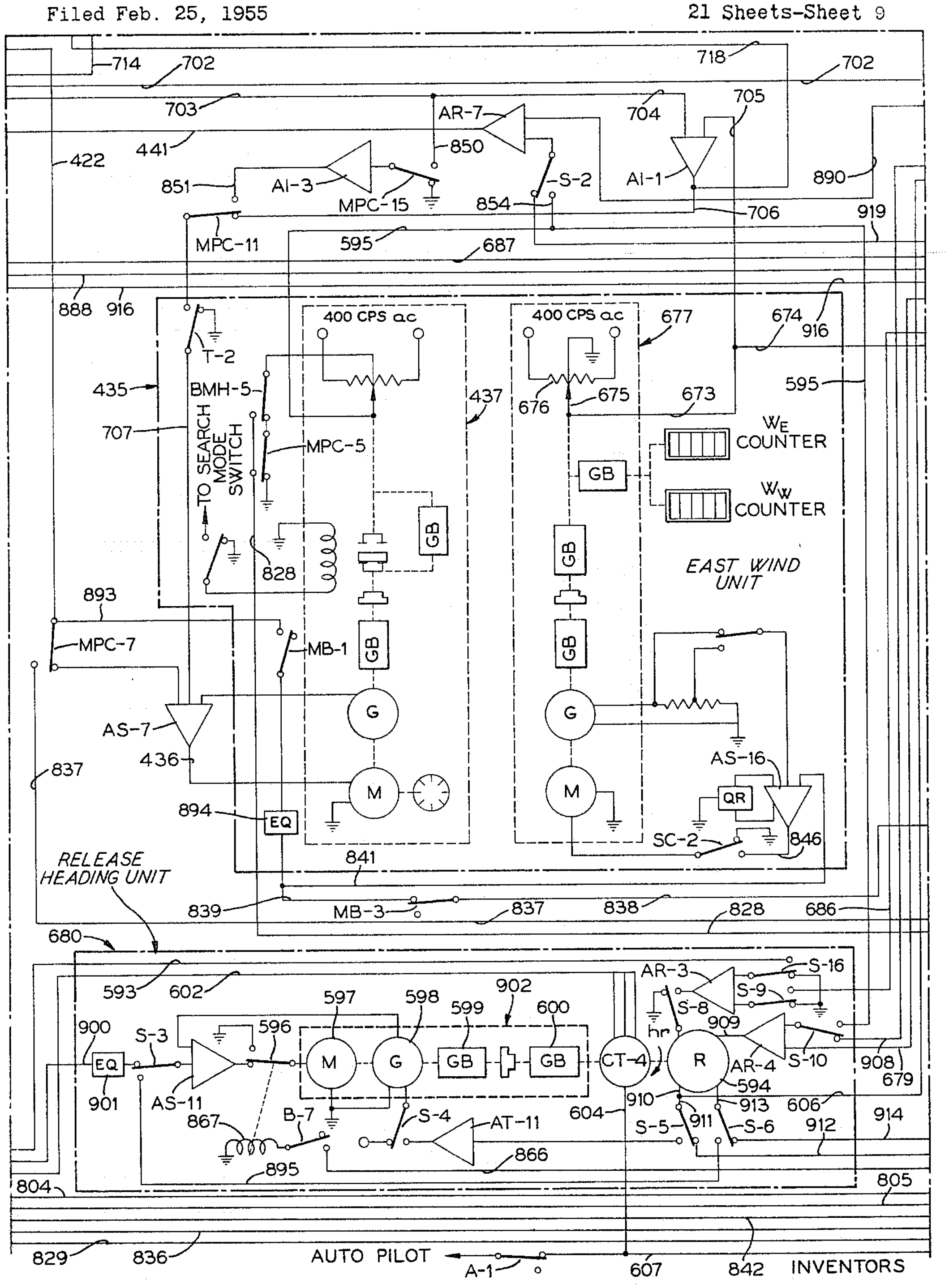

From the east wind unit 435, FIG. 5*f*, a voltage proportional to $R_E$ is provided from integrator 437 to amplifier AR–7. This voltage is picked off before said amplifier and fed through line 595 and search mode switch S–10 to resolver amplifier AR–4 in release heading unit 680. An additional voltage proportional to $W_ET_i$ is fed in a subtracting manner to amplifier AR–4 from line 679 so that the output voltage therefrom is proportional to $R_E-W_ET_i$. The means for providing $W_ET_i$ will be explained as the description proceeds. The output from said amplifier is fed through line 909 to the other stator winding of resolver 594.

The rotor windings of resolver 594 are positioned through the release heading angle $h_r$. This angular position is provided by taking the output from one of said rotor windings and supplying it through search mode switch S–6, line 895 and switch S–3 and to servo amplifier AS–11. The amplifier output voltage is fed through switch 596 to motor 597, said motor being shaft-connected to a generator 598. This motor and generator set forms servo 902. The output from the other rotor winding is fed through search mode switch S–5, tachometer amplifier AT–11, and search mode switch S–4 to said generator as the excitation voltage therefor. The generator output is degeneratively fed back to motor 597 through amplifier AS–11. Generator 598 is shaft connected to the rotor winding of control transformer CT–4 through reduction gear boxes 599 and 600, the last-mentioned winding being shaft-connected to the rotor of resolver 594.

The voltage fed from resolver 594 to motor 597 is the error signal $(R_E-W_ET_i)\cos h_r-(R_E-W_NT_i)\sin h_r$ which is equal to zero when $h_r$ is correct. The voltage fed from resolver 594 to generator 598 is $$(R_E-W_ET_i)\sin h_r+(R_N-W_NT_i)\cos h_r$$

which is equal to $V_aT_i-L$. This will be obvious when it is seen that $R_E-W_ET_i$ and $R_N-W_NT_i$ are sides of a right triangle, the hypotenuse being equal to $V_aT_i-L$. The release heading angle $h_r$ is equal to $$\tan^{-1}\frac{R_E-W_ET_i}{R_N-W_NT_i}$$

Therefore resolver 594 and servo 902 solve for $h_r$ and $V_aT_i-L$.

The heading angle $h$ is supplied as a three-wire signal to the stator of CT–4 from the stator of synchro-generator 601 in heading unit (A), FIG. 5*a*, through line 602. The rotor winding of said synchro-generator is positioned through the angle $h$ from the rotor of resolver 438 through the rotor of resolver 603. It will be noted that the two-wire excitation for the synchro-generator rotor winding may be fed from the autopilot (not shown). The voltage output from CT–4 will be $h_r-h$ which is equal to the heading error $h_e$. This voltage is fed through line 604 to switch A–1 which connects to the autopilot. However, the autopilot relay is energized so that switch A–1 is transferred from the position shown. Thus, no voltage is fed to the autopilot. During the search mode it is not desired to have the autopilot controlling the aircraft heading.

When $h_e$ is equal to zero, $h_r=h$, and therefore the aircraft is on the correct heading. When $h_e$ is a voltage other than zero, it is supplied through lines 604 and 607 to the pilot's data indicator (PDI) 608, FIG. 5*h*, to move needle 609 thereof along the heading error scale. This is accomplished in the following manner. A coil 611 is wound around needle 609 and is positioned between the opposite poles of a permanent magnet. A resistor 612 is connected at one end to receive the voltage $h_e$ and at the other end to ground. Said one resistor end is connected to one contact of a vibrator 613 while said other resistor end is connected to the other contact of said vibrator. The vibrator is excited by the autopilot power supply. The vibrator causes movable arm 615 to be alternately connected to opposite sides of resistor 612 at the frequency of the excitation voltage. Coil 611 has one end thereof connected to a tap on resistor 612 while the other end is connected to movable arm 615. The heading error scale 616 has a zero position at the middle thereof with left and right error indicia on opposite sides thereof.

The operation of the pilot's data indicator is such that the heading error signal $h_e$ feeds through line 607 to one side of resistor 612. If the signal is in phase with the excitation supplied to vibrator 613, arm 615 will make contact with the same end of the resistance at the time the signal swings positive. Therefore, this positive portion of the cycle is transmitted through coil 611 back to resistor 612 and then to ground. As $h_e$ swings negative arm 615 moves into contact with the grounded end of the resistor 612. Since the grounded end of the resistor is positive with respect to the tap thereof, a positive potential is supplied from arm 615 to coil 611 and back to the tap of resistor 612. Therefore, it will be seen that a fluctuating D.C. positive voltage is obtained in coil 611. This sets up a magnetic field therearound which reacts with the permanent magnetic field to cause needle 609 to be deflected in a particular direction away from zero. The magnitude of the deflection will be proportional to the magnitude of the error signal $h_e$. Should the error signal $h_e$ be 180° out of phase with the vibrator excitation voltage a fluctuating D.C. negative voltage is obtained in coil 611. Therefore, the needle will be deflected in the opposite direction. Thus, the pilot can correct the heading of the aircraft until $h_r=h$.

Referring again to FIG. 5*f*, the voltage from resolver 594 representing $V_aT_i-L$ is fed through line 606 and search mode switch S–21 to servo amplifier AS–13 in the time-to-impact unit 610. When the bombardier determines what air speed and altitude will be used in the bomb run he can refer to appropriate ballistics tables for the type bomb which is to be used and obtain values of trail, L, and time-of-fall, $T_f$. In the trail unit 617, a manual reversing switch 618 is provided for feeding an A.C. voltage to preset motor 619 which is shaft-connected to differential 620 through gear box 621. The output from said differential is also a shaft rotation proportional to the shaft input and is connected through gear box 622 to counter 623 and through gear box 624 to slider 625 of potentiometer 626. The same shaft rotation moving slider 625 is connected through gear box 628 to limit switch 627. In this manner the approach of slider 625 to either end of the potentiometer disengages the power supply from the preset motor. The operator, therefore, energizes motor 619 until counter 623 registers the correct value of trail, L, as determined from said ballistics tables.

Figure 5G:
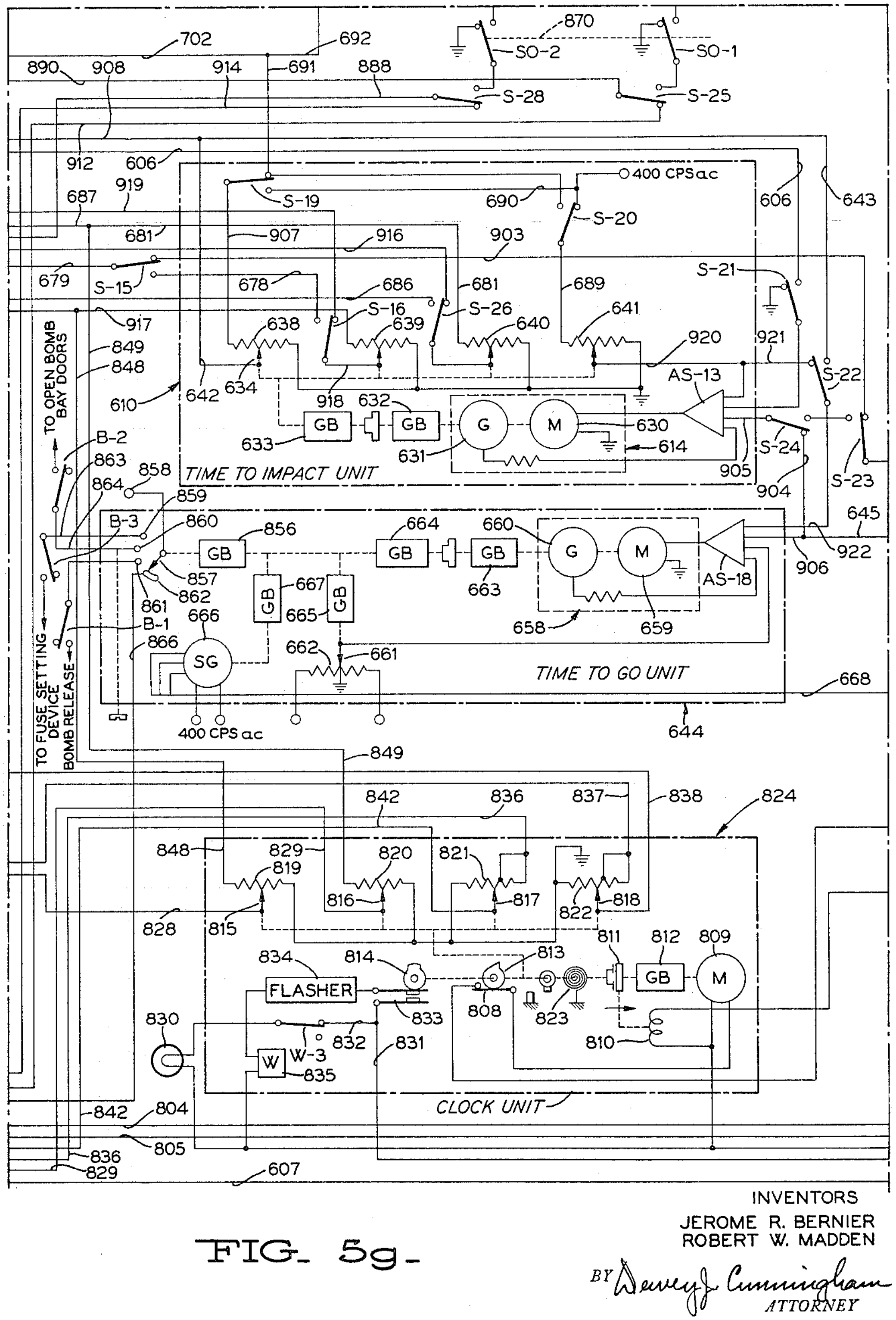

At the same time a voltage proportional to L may be picked off slider 625 and supplied through line 629 and search mode switches S–23 and S–24 to amplifier AS–13 in the time-to-impact unit, FIG. 5*g*. Voltages proportional to $V_aT_i-L$, obtained from the release heading unit, and L are fed to this amplifier, the output voltage being proportional to $V_aT_i$. The voltage $V_aT_i$ is fed to servo 614, said servo including a motor 630 shaft-connected to a generator 631. The usual feed-back voltage is supplied from generator 631 to amplifier AS–13. The generator is shaft-connected through gear boxes 632 and 633 to drive sliders 634, 635, 636 and 637 of potentiometers 638, 639, 640 and 641, respectively.

The excitation for potentiometer 641 is proportional to true air speed $V_a$, and is supplied from the air speed input unit 688 through line 689, search mode switch S–20, and lines 690, 691 and 692, the last-mentioned line being connected to slider 693 of potentiometer 694 in said air speed input unit. To obtain a voltage $V_a$, a conventional true air speed meter (not shown) supplies a three-wire voltage to the stator of control transformer CT–7. The rotor of said control transformer will have a voltage induced therein which is dependent upon the angular relationship between the resultant magnetic field in the stator windings and the axis of the rotor coil. This voltage is supplied to servo amplifier AS–1, the output voltage of which is connected to drive motor 695. A generator 696 is shaft-connected to said motor and supplies the usual feedback damping voltage to amplifier AS–1. The rotor of CT–7 is driven from said generator through gear boxes 697, 698 and 699. It will be seen that said rotor will be driven until its axis is perpendicular to the stator resultant magnetic field. A counter 700 is driven by said generator through gear boxes 697 and 701 so that the operator has a visual indication of $V_a$. The output voltage on slider 693 is proportional to $V_a$, and, as stated above, excites potentiometer 641.

It is known that potentiometer 641 is excited with a potential proportional to $V_a$ and that the slider 637 thereof is driven through some shaft position input. Let this shaft position input be X. Therefore, a voltage $V_aX$ will be picked off slider 637 and supplied to amplifier AS–13. Therefore, the voltage output fed to servo 614 is proportional to $V_aT_i-L+L-V_aX$ which is equal to $V_aT_i-V_aX$ which is the error signal driving the servo. When the error signal is zero, $V_aT_i=V_aX$. Therefore, the shaft output of servo 614 is equal to $T_i$ when the error signal is zero and is substantially $T_i$ when the error signal is not zero, the variance being due to lag in the servo system. It is therefore safe to assume that for practical purposes the shaft output from said servo is proportional to $T_i$. In mathematics this is known as the implicit method for solving equations. The above is a mechanization of this method.

The excitation voltage for potentiometer 638 in unit 610, FIG. 5*g*, is fed from a 400 c.p.s. power source through search mode switch S–19. Since slider 634 is positioned proportional to $T_i$, the voltage thereon is proportional to $T_i$ and is supplied through lines 642 and 643 and search mode switch S–22 to servo amplifier AS–18 in the time-to-go unit 644. Also supplied to amplifier AS–18 in a subtracting manner in a voltage proportional to time-of-fall, $T_f$, which is obtained through line 645 from slider 646 of potentiometer 647 in the time-of-fall unit 648. The voltage $T_f$ is placed into the unit by the operator. Since the operator has found the correct value of $T_f$ from the ballistics tables, he can operate reversing switch 649 so as to connect a 400 c.p.s. power source to preset motor 650 until counter 651 reads the correct value. Motor 650 is shaft-connected to counter 651 through gear box 652, differential 653 and gear box 654. At the same time the motor drives slider 646 through gear box 652, differential 653 and gear box 655. Thus, when the correct value of $T_f$ is placed in counter 651, a voltage proportional to $T_f$ is on slider 646. The usual limit switch 656 is provided and is shaft-connected gear box 657 to gear box 655 to de-energize motor 650 whenever slider 646 approaches either end of potentiometer 647.

The output voltage from amplifier AS–18, FIG. 5*g*, is proportional to $T_i-T_f$ which is equal to time-to-go $T_g$. This voltage is fed to servo 658 which includes a motor 659 shaft-connected to a generator 660, said generator having the usual feed-back loop to amplifier AS–18 for damping purposes. Generator 660 is shaft-connected to slider 661 of potentiometer 662 through gear boxes 663, 664 and 665. The voltage on slider 661 is fed back to amplifier AS–18 in a degenerative manner to buck out the input voltage. It will be seen that at the time servo 658 reaches a null position the voltage on slider 661 will be proportional to $T_g$. The rotor of synchro-generator 666 is shaft-connected to gear box 664 through gear box 667 and is excited by a 400 c.p.s. A.C. power source. As the rotor of the synchro-generator is rotated by servo 658 the resultant field in the Y-connected stator windings rotates therewith.

Figure 5H:
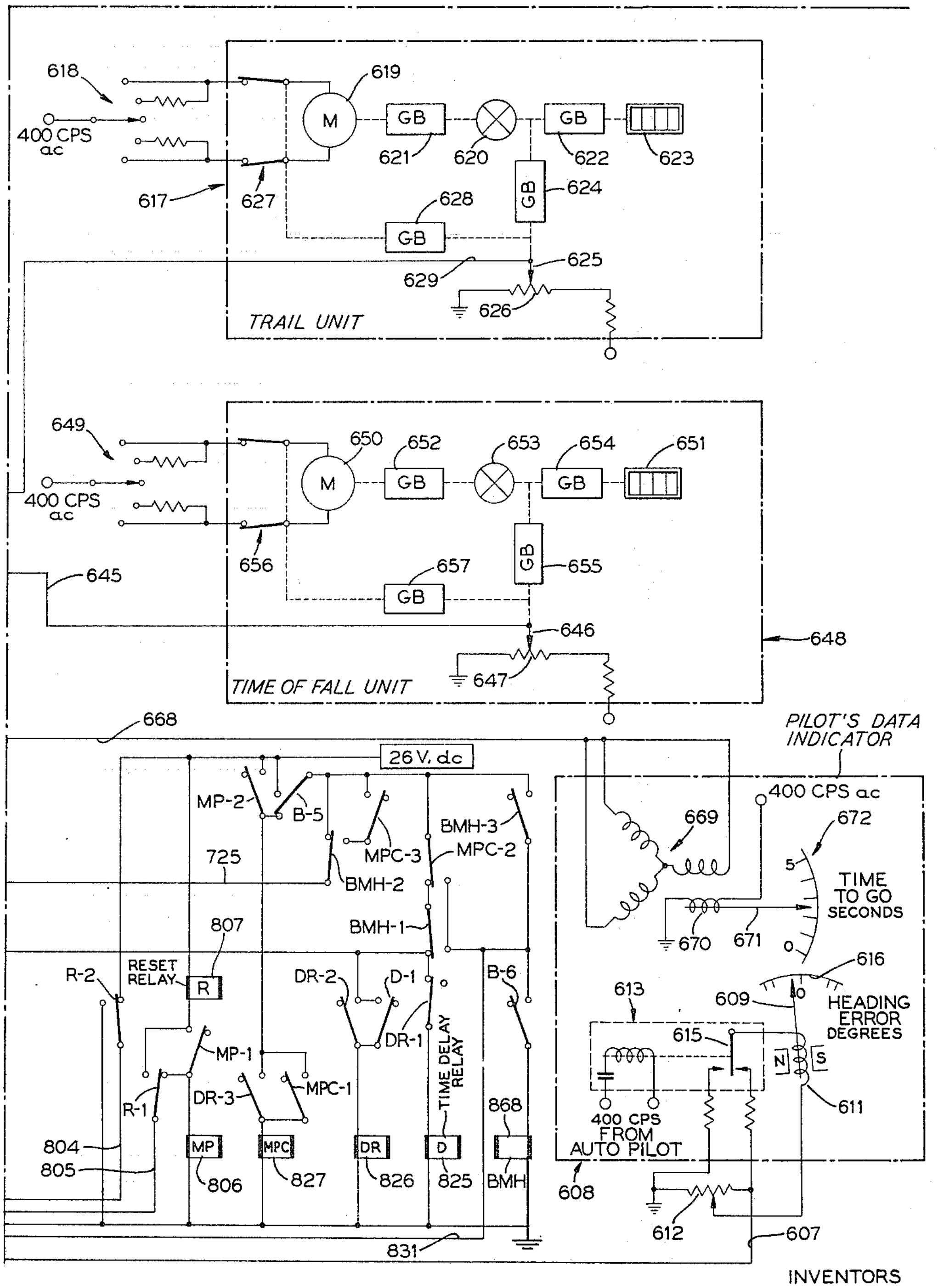

To display $T_g$ to the pilot the three-wire stator output is fed through line 668 to a Y-connected stator 669 in the pilot's data indicator, FIG. 5*h*. A rotor winding 670 is associated with stator 669 and is excited by the computer 400 c.p.s. A.C. power source. Rotor 670 is shaft-connected to needle 671 which indicates time-to-go on scale 672.

Referring again to FIG. 5*g*, the excitation for potentiometer 639 in time-to-impact unit 610 is obtained through lines 673, 674 and 917 from slider 675 of potentiometer 676 in integrator 677 which is mounted in the east wind unit 435, FIG. 5*f*. This voltage may be referred to as a stored value of wind east, $W_E$, and may or may not be the correct value. It will be seen that during the search mode of operation it is not necessary to have the correct value since no tracking is being carried out other than by hand control. The means for obtaining the correct value of $W_E$ will be explained under the memory point mode description. Since potentiometer 639 is excited by a voltage proportional to $W_E$ and slider 635 thereof is moved at a rate proportional to $T_i$, the output voltage on slider 635 is proportional to $W_ET_i$. The voltage $W_ET_i$ is fed through switch S–26, line 678, switch S–15 and line 679 to amplifier AR–4 in the release heading unit 680. It will be remembered that reference was made previously to $W_ET_i$ being an input voltage to amplifier AR–4. It will now be seen how the voltage $W_ET_i$ is developed.

The excitation for potentiometer 640 in time-to impact unit 610, FIG. 5g, is obtained through lines 681, 687 and 682 from slider 683 of potentiometer 684 in integrator 685 mounted in the north wind unit 425, FIG. 5e. Integrator 685 merely provides a stored value of wind north, $W_N$, and may or may not be the correct value. As mentioned above, it is not necessary to have the correct wind values during the search mode of operation since these values are determined during the memory point mode. Since potentiometer 640 is excited by a voltage proportional to $W_N$ and slider 636 thereof is moved at a rate proportional to $T_i$, the output voltage on slider 636 is proportional to $W_NT_i$ and is fed through switch S–26 and line 686 to amplifier AR–3 in release heading unit 680, FIG. 5f. It will be remembered that reference was made previously to $W_NT_i$ being an input voltage to ampilfier AR–3. It will now be seen how the voltage $W_NT_i$ is developed.

Thus, it will be seen that at the same time the periscope is driven so that the crosshairs will be aligned with the target during the search mode of operation, the heading error $h_e$, and the time-to-go, $T_g$, are computed and displayed on the pilot's date indicator. While there is seldom need for these values in the search mode of operation, it is of value in telling the operator whether or not there is time for a bombing run.

*Track mode*

When the bombardier operates the periscope through the hand control means and places the crosshairs on the target, he now desires to track the target. This will be refered to as the track mode of operation. In this mode of operation all search mode switches and track mode switches are transferred. This will be obvious from a reference to FIG. 11. When the track mode switches 371 are closed, the autopilot control relays A, the search relays S and the track relays T are energized. It will be seen that the integrator clutch relays IC are not energized. Reference is made to FIGS. 5a, 5b, 5c, 5d, 5e, 5f, 5g and 5h as well as FIGS. 4a and 4b.

In order for the computer to drive the periscope prism to track the target it is necessary to feed in continuously changing values of range north, $R_N$, and range east, $R_E$. It will be obvious that these values are a function of true air speed, $V_a$, which may be furher broken down into its components $V_{aN}$ and $V_{aE}$. If these last-mentioned values of velocity are algebraically added to wind velocities $W_N$ and $W_E$, integrated and fed into the system after the crosshairs are once on the target, the crosshairs should stay on the target.

To accomplish this, the voltage representing $V_a$ is taken from slider 693 in the air speed input unit 688, FIG. 5c, and is fed through lines 692 and 702 to resolver amplifier AR–2, FIG. 5a. The output voltage from said amplifier is supplied to one stator winding of resolver 603 in heading unit 439. One rotor winding of said resolver is displaced from said one stator winding by the angle $h$. The other rotor winding is displaced from said one stator winding by angle $90°-h$. Therefore, the output voltages from said resolver are proportional to $V_a \sin h$ and $V_a \cos h$ which are equal to $V_{aE}$ and $V_{aN}$, respectively.

The voltage $V_{aE}$ is fed through lines 703 and 704 to isolation amplifier AI–1, FIG. 5f. Also supplied to this amplifier is a voltage proportional to $W_E$, this voltage obtained from slider 675 in integrator 677 through lines 673 and 705. In amplifier AI–1, $V_{aE}$ is subtracted from $W_E$ so that the output voltage therefrom is $V_E$. Line 706, switches MPC–11 and T–2, and line 707 supply the amplifier output voltage $V_E$ to amplifier AS–7.

Referring again to FIG. 5a, the voltage $V_{aN}$ is fed from resolver 603 through lines 708 and 709 to isolation amplifier AI–2, FIG. 5e. Also supplied to this amplifier is a voltage proportional to $W_N$, this voltage being obtained from slider 683 in integrator 685 through lines 682 and 710. In amplifier AI–2, $V_{aN}$ is subtracted from $W_N$ so that the output voltage therefrom is $V_N$. Line 711, switches MPC–10 and T–1, and line 712 supply the amplifier output voltage $V_N$ to amplifier AS–8.

In amplifiers AS–7 and AS–8 the voltages $V_E$ and $V_N$ are subtracted from HCE and HCN, respectively, so that the output voltage fed to integrator 437 in the east wind unit is $HCE-V_E$ and the output voltage fed to integrator 424 in the north wind unit is $HCN-V_N$. When $HCE-V_E$ and $HCN-V_N$ are integrated with respect to time, the output voltages are proportional to $R_E$ and $R_N$, respectively. Thus, by supplying the voltages $R_E$ and $R_N$ through the remaining instrumentation to the prism director in a manner explained previously under the search mode, the voltages $R_c$ and $R_p$ change accordingly and drive the $\beta$ and $\theta$ prisms in a manner to track the target.

At the same time a voltage proportional to $V_N$ is fed from amplifier AI–2, FIG. 5e, through line 714 to resolver amplifier AR–14, FIG. 5a, the output of which is supplied to one stator winding of resolver 716 in heading unit (A), illustrated by numeral 439. A voltage proportional to $V_E$ is fed from amplifier AI–1, FIG. 5f, through line 718 to resolver amplifier AR–13, FIG. 5a, the output of which is supplied to the other stator winding of resolver 716 in heading unit (A). The rotor of the last-named resolver is shaft-connected to rotor of resolver 438 so that the rotor of resolver 716 is angularly displaced from the stator coils thereof by the heading angle $h$. The last-named rotor has as output voltages, therefore, $V_p$ and $V_c$, the voltage $V_p$ being supplied through line 721 to a conventional demodulation amplifier 723 in gyro computer 724, FIG. 5b. The voltage $V_c$ is supplied through line 726 to a conventional demodulation amplifier 728 in gyro computer 724. The demodulation amplifiers are constructed to take alternating current voltages and change them to direct current voltages.

The gyro control unit, illustrated by numeral 729, is also shown in FIG. 5b. A resolver 730 is located in said gyro control unit, the stator winding of said resolver being supplied with a voltage $V_e$, which is a voltage proporational to the earth's rate of rotation. When the pilot changes from one latitude to another it is necessary for the bombardier to correct the latitude input into the bombing computer. This is accomplished through a hand crank 731 which is shaft-connected through gear boxes 732 and 733 to the rotor winding of resolver 730. A counter 734 is shaft-connected to gear box 732 so that the bombardier may crank any desired latitude into the counter, thereby knowing that the resolver rotor will be positioned accordingly. Therefore, if the rotor winding is angularly displaced from the stator winding through the angle $\lambda$, the output voltage from the resolver on line 735 will be proporational to $V_e \cos \lambda$, which is supplied to one stator winding of resolver 736 in heading unit (B), illustrated by numeral 420 in FIG. 5a. It will be noted that the rotor windings of resolver 736 are positioned through the angle $h$ from the stator windings thereof. The output voltage on one of the stator windings will be proportional to $V_e \cos \lambda \cos h$ and $V_e \cos \lambda \sin h$. The voltage $V_e \cos \lambda \cos h$ is fed through line 737 to the demodulation amplifier 728 in the gyro computer, FIG. 5b. The voltage $V_e \cos \lambda \sin h$ is supplied through line 738 to demodulation amplifier 723 in said gyro computer. Demodulation amplifier 728 combines the voltages $V_e \cos \lambda$ and $V_c$ to provide an output voltage $V_e \cos \lambda \cos h + V_c$, this output voltage being supplied through line 739 to the gyro vertical unit, illustrated by numeral 456. The demodulation amplifier 723 receives voltages $V_e \cos \lambda \sin h$ and $V_p$ so as to provide an output voltage proportional to $V_e \cos \lambda \sin h + V_p$ through line 740 to the gyro vertical unit.

Particular reference is now made to FIGS. 13, 14 and 15 which show various mechanical schematic representations of portions of the byro vertical unit. FIG. 13 shows a stabilized platform 741 which is pivotally mounted in gimbal ring 742, said gimbal ring also being pivotally mounted with respect to the aircraft. Platform 741 is pivotally mounted on gimbal ring 742 along the transverse axis of the aircraft, while the gimbal ring 742 is pivotally mounted along the longitudinal axis of the aircraft. Therefore, the pitch information is taken from a unit mounted between platform 741 and gimbal ring 742, said unit being illustrated by the numeral 743. The roll information is obtained from a pick-off unit 744 mounted between gimbal ring 742 and the aircraft. Units 743 and 744 are conventional synchro elements, the stator thereof being of the type containing three coils which are Y-connected and angularly displaced from each other through 120°. The rotor thereof is a single coil which is energized from the bombing computer power supply and is fixed to platform 741 for movement therewith. That is, the rotor of the pitch pick-off unit 743 is connected to platform 741. The rotor of unit 744 is mounted to move with gimbal ring 742. Also mounted on platform 741 is a roll gyro 745, a pitch gyro 746, and a blower gyro 747. An example of the roll and pitch gyros is shown in detail in FIG. 14. It will be seen that these gyros have a single freedom of movement, this freedom of movement being a rotational movement along an axis perpendicular to the platform 741. The gyro includes a gimbal ring 748 which is secured to a vertical shaft 749, said shaft being rotatably mounted through bearings 750 in platform 741. The gyro rotor is rotatably mounted in gimbal ring 748 and is illustrated by the numeral 751. The winding of a direct current torque motor 752 is also mounted on shaft 749, the permanent magnets of said motor being mounted in platform 741. The use for motor 752 will be obvious as the description proceeds. A pendulum arm 753 is mounted adjacent the top portion of gimbal ring 748, there being provided an erecting weight 754 on said pendulum. Referring now to FIG. 15 there is shown a schematic air reaction torque motor which tends to hold platform 741 in a horizontal position. This air reaction torque motor is mounted centrally on platform 741 and is shown to comprise a pair of air pick-off devices 755 and 756, these devices being mounted on either side of the pendulum arm on the roll or pitch gyro. That is, one pair is provided for the roll gyro and one pair is provided for the pitch gyro. The air pressure for this pneumatic system is supplied from blower gyro 747 through inlet 757 of the torque motor. The air pressure flows through inlet 757 and conduit 758 to the space between a semi-spherical dome and a flat surface, said dome being represented by numerals 759 and said flat surface being represented by numeral 760. The periphery of dome 759 and surface 760 is circular and it will be seen that the peripheries are mounted in spaced relation. Therefore, under normal circumstances the air pressure enters from the blower gyro through inlet 757 and conduit 758 and is exhausted through outlet 761 which extends around the periphery of dome 759 and surface 760. A pair of cylinders, illustrated by numerals 762 and 763 is shown mounted on opposite sides of air conduit 758. Pistons 764 and 765 are mounted on rods 766 and 767 in cylinders 762 and 763, respectively. One end of rods 766 and 767 is connected to dome 759, while the other end of said rods is connected to bellows 768 and 769, respectively. A conduit 770 connects inlet 757 with cylinder 762, there being a restriction 771 inside inlet 770 which controls the rate of flow of air pressure through inlet 770. Conduit 772 is mounted between inlet 757 and cylinder 763, there being provided a restriction 773 in conduit 772. Conduit 774 connects cylinder 762 with the differential air pick-off 755 while conduit 755 connects cylinder 763 with differential air pick-off 756. The operation of the air reaction torque motor will now be described in detail. Should platform 741 begin to move out of a horizontal plane, pendulum element 753 will move closer to one of the differential air pick-off elements than the other. For example, should pendulum 753 move closer to differential air pick-off 755 than differential air pick-off 756, the pressure in cylinder 762 will become higher than the pressure in cylinder 763, this being caused by the fact that air is still discharging through conduit 775 while it is not discharging through conduit 774. When this occurs pressure builds up in cylinder 762 causing bellows 768 to collapse. At the same time bellows 769 will remain in its normal position. When bellows 768 collapses rod 766 moves therewith so that dome 759 is now tilted to one side. Thus, more air will be blown from one side of the dome than from the other. This creates a reaction force which tends to erect the platform 741 to its original position.

From FIG. 13 it will be seen that a similar pair of pistons and rods are positioned on the air reaction torque motor so that they are angularly displaced from rods 766 and 767 by 90°. Thus, one set of rods is used whenever the platform tends to move along the longitudinal axis of the aircraft and another set of pistons is used whenever the platform tends to move about the other axis of the aircraft.

From the foregoing explanation of the devices mounted in the gyro vertical unit 456, gyros 745, 746 and 747 all operate to maintain the platform horizontal. However, a device such as this is mounted in an aircraft which is traveling at a particular altitude above the surface of the earth and at a particular velocity. It is necessary to take into consideration the earth's rate of rotation and the plane's rate of movement. Both the earth's rate of rotation and the aircraft's rate of movement will have an effect on the gyros 745 and 746. It is therefore necessary to supply a torque to said gyros to compensate for the aforementioned earth's rate of rotation and plane's rate of movement. Therefore, the voltage $V_e \cos \lambda \cos h + V_c$ is fed through line 739 to roll gyro 745 and the voltage proportional to $V_e \cos \lambda \sin h + V_p$ is fed through line 740 to the pitch gyro 746. It will be understood that these aforementioned voltages are supplied to the torque motor 752 of each gyro. The voltage supplied to said torque motor is applied to the coil thereof so that a magnetic field is set up which reacts with the north and south poles of said motor to apply a torque to the gyro. This applied torque $t$ will tend to offset the aforementioned torque applied by the earth's rate of rotation and the plane's rate of movement. Blower gyro 747, in addition to supplying the air pressure for the air reaction torque motor, also acts to compensate for the angular momentum vectors of gyros 745 and 746.

Should the platform be perfectly horizontal in one position in space it will be seen that the same spacial relation will be kept when the aircraft moves from one point to another in space. However, when the aircraft gets to the new location the platform would no longer be horizontal but instead would be inclined to the horizontal. To maintain the platform substantially horizontal throughout the travel of the aircraft the weights on the pendulum are provided. Whenever the aircraft moves from one position to another the weights tend to aright the platform so that it is maintained horizontal.

*Memory point mode*

Once the bombadier determines that he has found the target, and begins to track the target, the usual occurrence is that the crosshairs begin to leave the target over a period of time, thus requiring additional hand control corrections to again position the crosshairs on the target. The cause for this usually can be found in the method of determining the wind velocity. It will be remembered that wind north and wind east were combined with the true air speed north and the true air speed east to obtain velocity north and velocity east, respectively. The method of finding the wind was to take a stored value of wind. Since the stored value almost never is the same as the actual value, an error results and therefore the computer does not track the target. In order to find the correct values of wind north and wind east it is therefore necessary to go through an additional mode known as the memory point mode.

Since the memory point mode is entered from the track mode, all switches which were transferred during the track mode are still transferred. To initiate the memory point mode of operation from the track mode, the operator presses button 800 on joy stick 402 in the hand control unit, FIG. *5a,* at a time when the crosshairs are positioned on the target, the pressing of said button closing switch 801 operatively associated therewith and completing the circuit between lines 802 and 803. Line 802 connects through track mode switch T–3 to line 804 which connects through reset relay switch R–2 to a 26 v. D.C. power supply, FIG. *5h*. Line 803 connects through track mode switch T–4 to line 805 which connects through reset relay switch R–1 to one side of memory point relay 806, FIG. *5h,* the other side of said relay being grounded. Therefore, whenever memory point switch 801 is transferred, memory point relay 806 is energized to transfer memory point switches MP–1 and MP–2 in FIG. *5h*. When switch MP–1 is closed, one side of reset relay 807 is connected to the power side of memory point relay 806. The other side of reset relay 807 is connected to the aforementioned power supply.

It will be noted, however, that relay 807 is not energized at this time since the potential on line 805 at switch R–1 is the same as that on the side of relay 807 which is connected directly to the power supply. Thus, there is no voltage potential developed across relay 807. When switch MP–2 is closed, a voltage is fed through switches MP–2, B–5, BMH–2, line 725 and switch 808 to clock motor 809 in clock unit 824, FIG. *5g*. At the same time a voltage is fed through switches MP–2, B–5, MPC–2 and BMH–1 to coil 810 of magnetic clutch 811 in said clock unit, said clutch being shaft-connected to motor 809 through gear box 812. When coil 810 is energized the clutch disconnects motor 809 from its driving relationship with cams 813 and 814, as well as sliders 815, 816, 817 and 818 of potentiometers 819, 820, 821 and 822, respectively. This allows spiral spring 823 to reset the cams and potentiometer sliders to a zero time position. It will be noted that cam 813 may be rotated to such a position from its last operation that it opens switch 808 so that power is not supplied to motor 809. However, the arrangement is such that as soon as spiral spring 823 returns the cam to its starting position, the motor is energized.

At the same time switch MP–2 transfers, a voltage is fed through switches MP–2, B–5, MPC–2, BMH–1 and DR–1 to one side of time delay relay 825, the other side of which is grounded. This last-mentioned relay has a three second time delay, after which switch D–1 is transferred. When switch D–1 is transferred a voltage is supplied through switches MP–2, B–5, MPC–2, BMH–1 and D–1 to delay release relay 826, which, when energized, transfers switches DR–1, DR–2 and DR–3 from their position as shown.

Switch DR–1, when transferred, takes the power supply from time delay relay 825 while switch DR–2 holds relay 826 energized. At the same time switch DR–3 permits a voltage to be supplied through switch MP–2 to memory point clutch relay 827 which transfers all memory point clutch switches. The last-named switches are provided with a number having the prefix MPC. Switch MPC–1 holds relay 827 energized while switch MPC–2 opens the circuit to clutch coil 810 in the clock unit, FIG. *5g*, thus permitting clock motor 809 to begin driving the cams and potentiometer sliders in the clock unit. In addition, when switch MPC–2 is transferred a voltage is supplied through switches MP–2, B–5 and MPC–2, lines 831 and 832 and switch W–3 to a warning light 830, FIG. *5g,* which informs the bombardier that the memory point run has begun. It will be noted that clutch coil 810 and warning light 830 are operated through the same switch. That is, when switch MPC–2 transfers, coil 810 is de-energized to permit the clock motor 809 to begin driving the potentiometer sliders, and warning light 830 is energized.

The operator may now release button 800 on the hand control joy stick thereby opening memory point switch 801. This action takes the 26 v. D.C. from switch R–1 so that reset relay 807 is no longer shorted out and is therefore energized, said relay being connected to ground through switch MP–1 and relay 806. The energizing of relay 807 transfers switches R–1 and R–2 from their positions shown.

The clock unit is such that after 180 seconds from the time the warning light is energized, cam 814 has rotated to a position to move switch 833 so that a voltage is supplied to flasher 834 which intermittently energizes warning relay 835. When relay 835 is energized, warning switch W–3 is opened, thereby interrupting the voltage supply to warning light 830. Thus, said light is intermittently flashed, warning the pilot that he has twenty seconds to bring the crosshairs back on the target.

By additional reference to FIG. 16 it will be more apparent what occurs in the bombing computer during the memory point run. When the bombardier applies hand control voltages to bring the crosshairs back on the target, these voltages are fed through resolvers 415 and 419 to potentiometers 821 and 822 in clock unit 824, FIG. *5g*. That is a voltage HCN is supplied through line 421 from resolver 419, FIG. *5a,* to switch MPC–6, FIG. *5e,* said switch being closed and supplying said voltage to line 836 which connects to potentiometer 821 as an input voltage thereto. A voltage proportional to HCE is supplied from resolver 419, FIG. *5a,* through line 422, switch MPC–7, in FIG. *5f,* and line 837 to the input voltage side of potentiometer 822. Sliders 818 and 817 of potentiometers 822 and 821, respectively, begin their movement at the end of the potentiometers connected to lines 837 and 836, respectively, and move to the grounded end of said potentiometers. The amount of time required for the sliders to move from the beginning to the end of their movement is set to be 200 seconds, this being the same length of time for which clock motor 809 will operate in its driving relationship with cams 813 and 814. The hand control voltages, HCN and HCE, are applied to potentiometers 821 and 822 for the length of time which is required to return the crosshairs to the target.

In the present system it is desirable that the hand control have substantially the same sensitivity during the course of the 200 second period during which the memory point run takes place. That is, the rate of movement of the periscope, in returning the crosshairs to the target, should be substantially the same whether the return is made early in the 200 second period or late in said period. To obtain this uniform sensitivity, a portion of potentiometers 821 and 822 is tapped and connected directly to the supply lines having HCN and HCE, respectively, thereon. The tap is taken at the point where the slider of the potentiometer will be after ten seconds. The output voltage from the potentiometer sliders, therefore, will be proportional to the input voltage applied to the potentiometer multiplied by the quantity $(200-T)$ divided by the quantity 190. This equation may easily be derived from the slope intercept equation for a straight line. The slider voltage will be identical with the input voltage down to the tapped portion of the potentiometer, and from there on the output voltage decreases linearly as time increases, said last-named output voltage following said afore-mentioned slope intercept equation for a straight line.

Therefore, the output voltage from potentiometer slider 818 is proportional to $$\frac{HCE\ (200-T)}{190}$$

and is fed through line 838, switch MB-3, lines 839 and 841 to servo amplifier AS-16 in the east wind unit 435, FIG. 5*f*. The output voltage from potentiometer slider 817 is proportional to $$\frac{HCN\ (200-T)}{190}$$

and is fed through line 842, switch MB-4, lines 843 and 845 to servo amplifier AS-17 in the north wind unit 425, FIG. 5*e*.

The output voltage from the afore-mentioned amplifier AS-16 is fed through line 846 and servo-clamp switch SC-2 to integrator 677. The last-named switch is closed during the memory point mode as will be seen in FIG. 11. The change in output voltage from integrator 677 is proportional to $$\int_0^t \frac{HCE(200-T)dt}{190}$$

which is equal to the change in wind east, $\Delta W_E$, during the memory point mode.

The output voltage from the afore-mentioned amplifier AS-17 is fed through line 847 and servo-clamp switch SC-1 to integrator 685, the change in output voltage therefrom being proportional to $$\int_0^t \frac{HCN(200-T)dt}{190}$$

which is equal to the change in wind north, $\Delta W_N$, during the memory point mode.

The output voltage from slider 675 of potentiometer 676, FIG. 5*f*, is fed through lines 673, 674 and 848 to potentiometer 819, FIG. 5*g*, as the input voltage thereto. The output voltage on slider 683 of integrator 685, FIG. 5*e*, is fed through lines 682, 687 and 849 to potentiometer 820 in clock unit 824, FIG. 5*g*. The voltages supplied to potentiometers 819 and 820 are proportional to $W_E$ and $W_N$, respectively. Since sliders 815 and 816 of said potentiometers are driven through clock motor 809 at a rate proportional to time, T, the output voltages on lines 828 and 829 are proportional to $W_ET$ and $W_NT$, respectively.

The voltage $W_ET$ is fed through line 828, and switches MPC-5 and BMH-5 to the center tap of the output potentiometer of integrator 437 in the east wind unit 435, FIG. 5*f*.

The voltage $W_NT$ is fed through line 829 and switches MPC-4 and BMH-4 to the center tap of potentiometer 431 in integrator 424 of the north wind unit 425, FIG. 5*e*. It will be seen that in this manner the wind potentiometers are raised in potential by the component of wind in each direction multiplied by the time of the memory point run. In view of the fact that wind is multiplied by the time of the memory point run it will be seen that as the time increases the voltage output increases. It is for this reason that the potentiometers 821 and 822 in the clock unit, FIG. 5*g*, are provided with gradually decreasing linear outputs. It will be noted also that during the memory point run the output voltage from isolation amplifier AI-1, FIG. 5*f*, cannot pass from line 706 through the switch MPC-11 since this switch is now transferred. This means that the voltage proportional to $V_E$ cannot now be supplied to amplifier AS-7 from which it was formerly supplied to integrator 437.

When switch MPC-11 transfers, switch MPC-15 also transfers so that the voltage $V_{aE}$ on line 703 can now pass through switch MPC-15 via line 850 into isolation amplifier AI-3. The output from the last-named amplifier is supplied through line 851, switches MPC-11 and T-2, and line 707 to servo amplifier A-7 in the east wind unit. Similarly the voltage $V_N$ from isolation amplifier AI-2, FIG. 5*e*, cannot pass through line 711 to switch MPC-10 since the last-named switch has now transferred. Therefore, the voltage $V_N$ is not supplied to amplifier AS-7 in the north wind unit 425. However, since switch MPC-10 and MPC-14 have transferred during the memory point run, the voltage $V_{aN}$ on line 708 from resolver 603 in heading unit (A), FIG. 5*a*, can now pass through line 852, switch MPC-14 to isolation amplifier AI-4. The output voltage from the last-named amplifier is then supplied through line 853, switches MPC-10 and T-1, and line 712 to amplifier AS-8 in said north wind unit.

From the above it will be seen that the output voltage from amplifier AS-7 which is fed to integrator 437 is proportional to $V_{aE}$ so that the shaft rotation to the potentiometer slider is proportional to $R_{aE}$. Since the integrator potentiometer is center tapped and supplied with a voltage proportional to $W_ET$ it will be seen that the output voltage on the potentiometer slider would be proportional to $R_{aE}+W_ET$, which is equal to $R_E$, and is fed through line 595 to line 854 which connects through search relay S-2 to resolver amplifier AR-7. The output voltage from said last-named amplifier is supplied through line 441 to resolver 438 in heading unit (A), FIG. 5*a*. Similarly, the output voltage from potentiometer slider 428 and integrator 424 of the north wind unit, FIG. 5*e*, is supplied through line 593 to line 855 which connects through switch S-1 to resolver amplifier AR-8. The output voltage from said last-named amplifier is supplied through line 440 to resolver 438, FIG. 5*a*. The output voltages from resolver 438 are supplied through lines 442 and 443 to resolver amplifiers AR-5 and AR-6, respectively, and to the remainder of the system as in the search and track modes.

During the course of the memory point run before the crosshairs are brought back on the target, the crosshairs will drift in the same manner as they did before the beginning of this mode. While the voltages $V_N$ and $V_E$ are no longer fed to amplifiers AS-8 and AS-7, respectively, $V_{aN}$ and $V_{aE}$ are fed thereto, and the center taps of the potentiometers in integrators 424 and 437, respectively, are raised by a voltage proportional to $W_NT$ and $W_ET$, respectively. Thus, the output voltages from said integrators are still $R_N$ and $R_E$, respectively, since $$R_N=R_{aN}+W_NT$$

and $R_E=R_{aE}+W_ET$. When the bombardier begins to operate the hand control to return the crosshairs to the target the changes in wind, $\Delta W_N$ and $\Delta W_E$ are each added to the stored values of wind and the sums are then multiplied by the time, T, during which the crosshairs have drifted.

When the crosshairs have returned to the target it is time to discontinue the memory point run since the correct values of wind have now been stored and the crosshairs will track correctly. The bombardier pushes button 800 on joy stick 402, FIG. 5*a*, and again closes switch 801. This immediately discontinues the memory point mode of operation as explained hereinafter. The closing of switch 801 shorts out memory point relay 806, FIG. 5*h*, since the 26 v. D.C. power supply is fed through reset relay 807, switch R-1, lines 805 and 804, switch R-2 to ground. When relay 806 is shorted all memory point switches are opened, which means that MP-1 and MP-2 are opened. When MP-2 is opened no power can flow to motor 809 in the clock unit thus stopping the clock. When the memory point button 800 is released, switch 801 opens, which disconnects reset relay 807 from ground so that the reset relay switches R-1 and R-2 return to their untransferred positions as shown. At the same time switch MP-2 opens, the memory point clutch relay 827 is de-energized thus transferring all MPC switches to their original position. At this time switches MPC-6 and MPC-7, FIGS. 5*e* and 5*f*, respectively, are returned to their original position as shown so that the hand control voltages on lines 421 and 422, respectively, are fed directly to amplifiers AS–8 and AS–7, respectively, in FIGS. 5e and 5f, respectively. Therefore potentiometers 821 and 822 in clock unit 824, FIG. 5g, are no longer excited. Thus, the output voltage from said potentiometers is zero so that amplifiers AS–17 and AS–16 in the north and east wind units, respectively, are no longer receiving an input voltage. However, the output voltage on potentiometer sliders 683 and 675 in the north and east wind units, respectively, now correctly represents the true values of $W_N$ and $W_E$, respectively, which is, of course, the reason for making the memory point run.

When switches MPC–4 and MPC–5 in the north and east wind units, respectively, are transferred back to their original position as shown, the output voltage on sliders 815 and 816 in clock unit 824, FIG. 5g, are no longer connected to the center taps of the potentiometers in integrators 424 and 437, respectively, in said north and east wind units, respectively. Therefore, the center taps are returned to ground potential. Also switches MPC–10 and MPC–14, FIG. 5e, and MPC–11 and MPC–15, FIG. 5f, return to their original position as shown so that $V_N$ and $V_E$ are now fed to amplifiers AS–8 and AS–7, respectively, in the north and east wind units, respectively.

When the voltage potential is removed from the potentiometer center taps of integrators 424 and 437, a different voltage exists on the sliders of said potentiometers. The new voltage is fed through the remainder of the system and causes the crosshairs to jump from the target. The correct values of wind is in the system, however, and are unaffected by the crosshair jump. While the crosshairs will now track that position on the ground to which they have jumped, it is desirable for the bombardier to see them tracking the target. Also, it is the target upon which it is desired to drop the bombs. Therefore, the bombardier merely uses the hand control to return the crosshairs to the target and the computer will keep the crosshairs thereon.

In the above explanation it has been assumed that the bombardier has acted to return the crosshairs to the target before the end of the 200 second period during which the memory point run may occur. As was stated above, the correction may be made at any time during the 200 second period but it is desirably made near the end of the period since a more accurate adjustment may be made. It should be noted that the bombardier can discontinue the run as soon as he has brought the crosshairs back on the target, even though the 200 second period has not elapsed.

It is possible, however, for the bombardier to continue tracking the target after he brings the crosshairs thereon and let the mode automatically discontinue at the end of the 200 second period. At the end of 200 seconds, cam 813 in clock unit 824, FIG. 5g, has been rotated to a position whereby the projection on said cam moves switch 808 out of its engagement with the power supply voltage to motor 809, thus stopping said motor. Since warning light 830 is still flashing the pilot is notified that he must press button 800 on joy stick 402, FIG. 52, and then release said button to return the system to normal.

*Synchronous bomb mode*

If the target is a stationary object and time remains to make a bombing run, the bombardier now goes into the synchronous bomb mode of operation. All switches having the prefix B followed by a number are synchronous bomb mode switches. Referring to FIG. 11, it will be seen that a plurality of interconnected bomb mode switches 372 are furnished. These switches connect to a plurality of selector switches 373, there being one selector switch for each of switches 372. Each selector switch may be connected to one of three contacts. For the synchronous bomb mode, which is the mode about to be explained, power is supplied to all search mode, track mode and synchronous bomb mode relays, causing the switches associated therewith to all be transferred. The autopilot relay is no longer energized which permits the autopilot to now automatically correct for heading error.

It will be remembered that in the track mode the crosshairs tracked the target, and in addition, heading error, $h_e$, and time-to-go, $T_g$, were computed and sent to the pilot's data indicator, FIG. 5h. This permitted the pilot to maintain the heading error at substantially zero. Since the autopilot relay is now de-energized, the autopilot switch A–1 is in the condition shown, thereby permitting the heading error signal, $h_e$, from the release heading unit 680, FIG. 5f, to be supplied therethrough to the autopilot (not shown).

In the time-to-go unit 644, FIG. 5g, motor 659 rotates at a speed substantially proportional to $T_g$. Thus, the output from gear box 664 which is fed to gear box 856 rotates switch 857 at a rate proportional to $T_g$. A voltage supply through line 858 is fed to said switch which is adapted to sequentially engage contacts 859, 860, 861 and 862. When $T_g$ is equal to a predetermined number of seconds switch 857 engages contact 859 which supplies a voltage through line 863 to switch B–3 which supplies the voltage to the fuse setting device (not shown) for the bombs. After an additional number of seconds switch 857 engages contact 860 thus supplying a voltage through line 864 and switch B–2 to the device for opening the bomb bay doors (not shown). After an additional number of seconds switch 857 engages contact 861 which sends a voltage through line 865 and switch B–1 to the bomb release mechanism (not shown). Contact 861 is set so that the bombs will be released approximately sixty milliseconds before $T_g=0$ to permit the bomb to leave the aircraft at $T_g=0$. Switch 857 continues to turn until it engages contact 862, thus supplying a voltage through line 866 and switch B–7 to relay coil 867. The energizing of said coil transfers switch 596 in release heading unit 680. When this occurs motor 597 is grounded and no further signals are sent from the release heading unit. Therefore, no more heading error signals are sent to the autopilot. It will be seen that if the release heading motor is not disconnected from the input thereto the heading error will jump to a large angle after the aircraft passes over the target. Therefore the autopilot would tend to turn the aircraft around to make another bombing run on the target. Naturally, this is undesirable and for this reason the release heading unit motor is disconnected from the input thereto.

Should the bombardier observe that the crosshairs are drifting off the target during the synchronous bomb mode of operation it is a likely indication that the wind has changed since the last memory point run was made. If there is sufficient time before $T_g=0$ it is desirable to make a memory point run during the bombing mode.

When the bombardier went into the synchronous bomb mode, switches B–5 and B–6, FIG. 5h, transferred. When switch B–5 transferred, a voltage was supplied through switches B–5, MPC–2 and BMH–1 to magnetic clutch coil 810, thus disengaging motor 809, FIG. 5g, from its driving relation with cams 813 and 814, thereby permitting spiral spring 823 to return the cams to a starting position. In the starting position cam 813 transfers switch 808 so that motor 809 is energized by the power supply through switches B–5, BMH–2 and 808.

The transfer of switch B–5 also supplies power through switches B–5, MPC–2, BMH–1 and DR–1 to energize time delay relay 825, FIG. 5h. After three seconds relay 825 operates and transfers switch D–1. When switch D–1 transfers power is supplied through switches B–5, MPC–2, BMH–1 and D–1 to energize the delay release relay 826, thus transferring switches DR–1, DR–2 and DR–3. When switch DR–1 transfers relay 825 is de-energized, transferring switch D–1. At the same time, DR–2 transfers and holds relay 826 energized. When switch DR–3 transfers the memory point circuitry is made ready for operation.

While the bombardier may make a memory point run at any time before $T_g=0$ it is preferable to have an amount of time remaining which will permit a worthwhile correction. The bombardier may go into memory point during the synchronous bomb mode of operation, let the crosshairs drift off the target for approximately 180 seconds, return the crosshairs to the target and then go back to the synchronous bomb mode. An alternative is to bring the crosshairs back to the target before 200 seconds have elapsed and then let the clock run out with the crosshairs on the target. At this time the bombardier may discontinue the memory point run or he may stay in the memory point mode until the bombs have been dropped. In the last-mentioned operation the pilot must continuously keep the crosshairs on the target until the bombs are dropped.

Should the bombardier decide to take an ordinary memory point run, as mentioned first in the paragraph immediately above, he presses button 800 on joy stick 402 in the hand control unit 401, FIG. *5a*. As was explained during the regular memory point mode of operation, this closes switch 801 which energizes relay 806, FIG. *5h*, thus transferring all memory point switches including MP–1 and MP–2. When switch MP–2 closes, power is supplied through switches MP–2 and DR–3 to energize memory point clutch relay 827, it being remembered that switch DR–3 was transferred when the synchronous bomb mode was initiated. The energizing of relay 827 transfers all MPC switches. When switch MPC–1 transfers, relay 827 is held energized, so that when the transfer of switch MPC–2 de-energizes relay 826, relay 827 remains energized. When switch MPC–2 transfers, power is supplied through switches B–5, MPC–2 and B–6 to energize bomb mode hold relay 868, thus transferring all BMH switches. When switch BMH–3 transfers, power is supplied through switches B–5, BMH–3 and B–6 to relay 868, thus holding relay 868. When switch BMH–2 transfers, power is supplied through switches B–5, MPC–3, BMH–2 and 808 to motor 809 so that the motor continues to run as it did when power was supplied through switches B–5, BMH–2 and 808. When switch BMH–1 transfers, coil 810 is de-energized so that motor 809 can now drive the cams and potentiometer sliders in the clock unit, FIG. *5g*. While the energizing of relays and closing of switches has been described sequentially, it will be understood that the operation is almost instantaneous and the clock unit starts upon the pressing of the memory point button on the hand control.

The memory point run occurs in the same manner during the synchronous bomb mode as during the memory point run with the exception that the crosshairs do not jump from the target when the memory point run is over. It will be remembered that during the memory point run the north and east components of the aircraft ground speed were disconnected from their input relation to the north and east wind units, respectively. At the same time the potentiometers of integrators 424 and 437 in the north and east wind units, respectively, were center tapped and supplied with $W_NT$ and $W_ET$, respectively, so that the potentiometer outputs were still $R_N$ and $R_E$, respectively. When $W_NT$ and $W_ET$ were removed from said potentiometer center taps after the memory point run, and $V_aN$ and $V_aE$ were replaced by $V_N$ and $V_E$ as inputs to the aforementioned integrators, the crosshairs jumped from the target. Since it would be very undesirable to be making a bombing run and have the crosshairs suddenly jump from the target at the end of the memory point run, circuitry has been provided which will prevent such a jump. This is accomplished through the bomb mode hold switches. That is, BMH-4, FIG. *5e*, in its transferred position, now supplies $W_NT$ to the center tap of the potentiometer in integrator 424 located in the north wind unit, the voltage $W_NT$ being supplied from potentiometer slider 816 in clock unit 824, FIG. *5g*. Similarly, BMH–5, FIG. *5f*, in its transferred position, now supplies $W_ET$ to the center tap of the potentiometer in integrator 437, located in the east wind unit, the voltage $W_NT$ being supplied from potentiometer slider 815 in said clock unit. When the memory point run is over, all BMH switches remain transferred even though the MPC switches return to their position as shown, this being due to the fact that power is still supplied through switches B–5, BMH–3 and B–6 to the bomb mode hold relay 868, FIG. *5h*. Thus, the range potentiometer in the wind units remain connected to the clock potentiometers so that the crosshairs do not jump from the target.

At the conclusion of the memory point run the correct values of wind have been stored and the crosshairs will continue to track the target. The same condition exists whether the bombardier makes the correction and goes out of memory point before the 200 seconds expire or makes the correction and lets the clock run out before going out of memory point. The bombardier should, however, press the memory point button on the hand control to go out of memory point as soon as the 200 seconds elapse.

After the bombs are dropped the bombardier can go out of the synchronous bomb mode. When this occurs switch B–6, FIG. *5h*, transfers to de-energize relay 868. Therefore, all BMH switches transfer to their original positions as shown in the drawings. When switches BMH–4 and BMH–5 return, the aforementioned integrator potentiometers in the wind units are again center tapped to ground potential, thus causing the crosshairs to jump. However, after the bombs have been dropped the crosshair jump is of no consequence.

*Synchronous offset bomb mode*

In the present bombing computer another mode of operation is available to the bombardier. It may be that the target is one which does not lend itself to being tracked. For example, the target may be behind a mountain and not visible until a short time before it is necessary to drop the bombs. Another instance may be where the target is obscured by adverse weather conditions and presents a poor target for tracking. The bombardier may then pick a prominent point offset from the target and use this offset point as the aim point. This means that the differences in north and east components of range and altitude between the target and aim point must be known. These differences can be obtained from maps while in flight or in the briefing session before take-off.

The north and east components of offset range, $X_N$ and $X_E$, respectively, may be placed in the offset unit 869, FIG. *5c*, through preset motors 871 and 872 which are energized through switches 873 and 874, respectively. These preset motors and their related switches are similar in construction and operation to that shown in trail unit 617, FIG. *5h*. Motor 871, through gear box 875, drives north and south offset counters 876 and 877, respectively. The direction of rotation of motor 871 determines whether counters 876 and 877 run backward or forward. Since counter 876 indicates north offset, if it is desired to enter a north offset range it is necessary to move switch 873 in a direction which will cause motor 871 to drive counter 876 in a forward direction. At the same time south counter 877 will go in a backward direction. That is, it will start at its highest numerical value and start counting down. Since the bombardier knows which direction the offset is in, it is possible to look at the correct counter to avoid an ambiguity. Similarly, motor 872 drives east and west counters 878 and 879, respectively, through gear box 880.

Motor 871 also drives slider 881 of center-grounded potentiometer 882 through gear boxes 875 and 883.

Therefore, when counters 876 and 877 both read zero, slider 881 is at ground potential. The slider is moved in one direction or the other from the center tap depending on whether the offset is north or south. Motor 872 drives slider 884 of center-grounded potentiometer 885 through gear boxes 880 and 886. The offset unit may be set up at any time a particular offset aim point from the target becomes known.

To go into the synchronous offset bomb mode the bombardier goes into the synchronous bomb mode and then closes toggle switches SO–1 and SO–2 which are connected by a common member 870. The afore-mentioned toggle switches are located at the top of FIG. *5g*.

When the bombardier closes the aforementioned toggle switches, a voltage proportional to $X_N$ is picked off slider 881 in the offset unit and fed through line 887, switches SO–2 and S–28, and line 888 to amplifier AR–8 in FIG. *5e*. At the same time a voltage proportional to $X_E$ is picked off slider 884 in the offset unit and fed through line 889, switches SO–1 and S–25, and line 890 to amplifier AR–7 in FIG. *5f*. Values of $R_N$ and $R_E$ are obtained from the integrators in the wind units and fed to amplifiers AR–8 and AR–7, respectively. The outputs from amplifiers AR–8 and AR–7 are $R_N+X_N$ and $R_E+X_E$, respectively. When these values are fed to resolver 438 in heading unit (A), FIG. *5a*, and from said resolver to the remainder of the system, the crosshairs will now track the offset aim point but will drop the bombs on the target. The reason that the crosshairs track the offset aim point and still drop the bombs on the target is due to the fact that $X_N$ and $X_E$ are entered into the system at a point where they affect only the prism director. These values are not used in the computation of $T_g$ and $h_r$, since $R_N$ and $R_E$ are used for this purpose. That the values of $R_N$ and $R_E$ are correct ranges to the target will be apparent from the following explanation. $R_N+X_N$ and $R_E+X_E$ position the crosshairs on the offset aim point. If $X_N$ and $X_E$ are subtracted from $R_N+X_N$ and $R_E+X_E$, respectively, $R_N$ and $R_E$, respectively, remain. These are the range values to the target. By using these values to compute $T_g$ and $h_r$, the bombs will be dropped on the target.

An additional correction must be made if the aim point is not at the same altitude as the target. Reference to altitude input unit 465, FIG. *5b*, will recall that differential 483 had as inputs thereto $H_a$, the altitude of the aircraft above sea level, and $H_p$, the altitude of the aim said differential providing the difference between these two inputs which is equal to H, the altitude of the aircraft above the aim point. Thus, it is necesasry to change the value of $H_p$ from the altitude of the aircraft above the target, the ordinary aim point, to the altitude of the aircraft above the offset aim point. This further enables the crosshairs to track the offset aim point since new $H_p$ is subtracted from $H_a$ in differential 483 to provide the system with a new value of H, this new value being the altitude of the aircraft above the offset aim point.

*Moving target bomb mode*

Up to this point the bombing system has been described as one for computing the bombing solution for stationary targets. There are circumstances, however, when it may be desired to drop bombs on a moving target, such as surface ships or motor vehicles. The present system is designed to track a moving target and drop the bomb load to hit the target should said target continue on the same course and speed after the instant the bombs are dropped. This mode of operation will hereinafter be referred to as the moving target bomb mode. Reference is made to FIG. 11. To initiate this mode of operation it is necessary to transfer the bomb mode switches 372 and then move the selector switches 373 to the moving target position. This energizes the search, track, synchronous bomb, moving target, and servo-clamp switches, said moving target switches being given a number having the prefix MB.

The range voltages still are supplied to amplifiers AS–8 and AS–7 in FIGS. *5e* and *5f*, respectively. A voltage proportional to HCN is picked off line 421 just before it connects to switch MPC–6, FIG. *5e*, and is supplied through line 891 and switch MB–2 to equalizer 892, which has an output voltage of less magnitude but proportional to HCN, said equalizer being a simple attenuator device. The output voltage from said equalizer is supplied through lines 844 and 845 to amplifier AS–17 in the north wind unit, FIG. *5e*. The amplifier output drives integrator 685 to provide an output voltage proportional to $W_N+V_{TN}$, the voltage $V_{TN}$, representing the north component of the velocity of the moving target. The voltage $W_N+V_{TN}$ is fed through lines 682 and 710 to amplifier AI–2. $V_{aN}$ is supplied to the last-named amplifier from resolver 603 in heading unit (A), FIG. *5a*. The amplifier output is proportional to $W_N+V_{TN}-V_{aN}$ and is supplied through line 711, switches MPC–10 and T–1, and line 712 to amplifier AS–8. Similarly, a voltage proportional to HCE is picked off line 422 just before it connects to switch MPC–7, FIG. *5f*, and is supplied through line 893 and switch MB–1 to equalizer 894 which has an output voltage of less magnitude but proportional to HCE. The output voltage from said equalizer is supplied through lines 840 and 841 to amplifier AS–16 in the east wind unit. The amplifier output drives integrator 677 to provide an output voltage therefrom proportional to $W_E+V_{TE}$, the voltage $V_{TE}$ representing the east component of the velocity of the moving target. $W_E+V_{TE}$ is fed through lines 673 and 705 to amplifier AI–1. $V_{aE}$ is fed from resolver 603 in heading unit (A), FIG. *5a*, to the last-named amplifier. The output voltage from the amplifier is proportional to $W_E+V_{TE}-V_{aE}$ and is fed through line 706, switches MPC–11 and T–2, and line 707 to amplifier AS–7.

It will be seen from the above that proportional amounts of the hand control voltages are integrated and added to the wind values. When these voltages have the aircraft velocity in the air subtracted therefrom, they are supplied to the range integrators in the wind units. Therefore the output voltages from the range integrators provides $R_N$ and $R_E$ which are ranges representing the instananeous relative ranges between the aircraft and the moving target. Therefore, in effect the moving target velocity is stored in the wind units.

Referring to FIGS. *17a* and *17b*, which form a data flow diagram of the moving target bomb mode of operation, a better understanding may be had of the flow of information. The hand control voltages are supplied through resolvers 415 and 419, the output voltages from the last-named resolver being proportional to HCN and HCE. The voltage HCN is supplied through lines 421 and 891 to equalizer 892 which produces an output voltage proportional to HCN, this output voltage being supplied through amplifier AS–17 to driven integrator 685. This integrator already has a voltage on its potentiometer of stored wind, $W_N$. The voltage HCN is that voltage which is required to place the periscope crosshairs on the target and is supplied to the integrator. Therefore, the integral of (HCN) dt between the limits of zero and *t* provides a change on the integrator potentiometer of $\Delta V_{TN}+\Delta W_N$, the voltage on the potentiometer slider being proportional to $V_{TN}+W_N$. This voltage is fed through lines 682 and 710 to amplifier AI–2. An additional voltage of $V_{aN}$ is supplied to said amplifier in a subtracting manner so that the amplifier output is proportional to $V_{TN}+W_N-V_{aN}$ which is fed through lines 713, 714 and 715 to amplifier AR–14 which feeds to resolver 716. Since the voltage $W_N-V_{aN}$ is equal to $V_N$, the velocity of the aircraft relative to the target, the voltage fed to resolver 716 is proportional to $V_{TN}-V_N$.

At the same time, the voltage HCE is supplied through lines 422 and 893 to equalizer 894 which produces an output voltage proportional to HCE, this output voltage being supplied through amplifier AS–16 to drive integrator 677. This integrator integrates (HCE) dt between the limits of zero and $t$ and provides a change on the integrator potentiometer of $\Delta V_{TE}+\Delta W_E$, the voltage on the potentiometer slider being proportional to $V_{TE}+W_E$. This voltage is fed through lines 673 and 705 to amplifier AI–1. An additional voltage of $V_{aE}$ is supplied to said amplifier in a subtracting manner so that the amplifier output is proportional to $V_{TE}+W_E-V_{aN}$. This voltage is fed through lines 717, 718 and 719 to amplifier AR–13 which feeds to resolver 716. Since the voltage $W_E-V_{aE}$ is equal to $V_E$, the velocity of the aircraft relative to the target, the voltage fed to resolver 716 is proportional to $V_{TE}-V_E$.

Resolver 716 resolves $V_{TE}-V_E$ and $V_{TN}-V_N$ through the heading angle $h$ to provide $$(V_{TN}-V_N)\cos h+(V_{TE}-V_E)\sin h$$

and $(V_{TE}-V_E)\cos h-(V_{TN}-V_N)\sin h$, which are equal to $V_{Tc}-V_c$ and $V_{Tp}-V_p$, respectively. $V_{Tc}$ and $V_{Tp}$ represent the aircraft's velocity relative to the moving target in cross and parallel directions, respectively, with respect to the aircraft heading. These voltages are fed in the usual manner to the gyro computer.

The voltage HCN is fed through lines 421 and 844 to amplifier AS–8 which also has fed thereto the voltage $V_{TN}-V_N$ through lines 711 and 712. The amplifier output voltage $HCN+V_{TN}-V_N$, is fed to integrator 424 which integrates between the limits of zero and $t$ to provide an output voltage proportional to $R_N$. This voltage is fed through the remainder of the computer to drive the periscope crosshairs.

The voltage HCE is fed through lines 422 and 840 to amplifier AS–7 which also has fed thereto the voltage $V_{TE}-V_E$ fed through lines 706 and 707. The amplifier output voltage, $HCE+V_{TE}-V_E$, is fed to integrator 437 which integrates between the limits of zero and $t$ to provide an output voltage proportional to $R_E$. This voltage is fed through the remainder of the computer to drive the periscope crosshairs.

It will be noted that the voltages $R_N$ and $R_E$ are fed through lines 593 and 595, respectively, to amplifiers AR–3 and AR–4, respectively. The voltages $V_{TN}+W_N$ and $V_{TE}+W_E$ are voltage outputs from integrators 685 and 677, respectively. Lines 682, 687 and 681 supply $V_{TN}+W_N$ to potentiometer 640, the slider of which is turned through $T_i$ by servo 614. Therefore, the slider potential is proportional to $(V_{TN}+W_N)T_i$ and is supplied through lines 915, 686 and 687 to amplifier AR–3. Lines 673, 674 and 917 supply $V_{TE}+W_E$ to potentiometer 639, the slider of which is turned through $T_i$ by servo 614, providing an output voltage proportional to $(V_{TE}+W_E)T_i$. This voltage is supplied through lines 918, 678 and 679 to amplifier AR–4.

The output voltage from amplifier AR–3 is proportional to $R_N-(V_{TN}+W_N)T_i$ and is supplied to resolver 594. The output voltage from amplifier AR–4 is proportional to $R_E-(V_{TE}+W_E)T_i$ and is also supplied to resolver 594. The resolver rotor is turned through the release heading angle $h_r$ to provide an output voltage $R_E+(W_ET_i-V_{TE}T_i)\sin h_r+(R_N+W_NT_i-V_{TN}T_i)\cos h_r$ which is equal to $V_aT_i-L$. This voltage is supplied to amplifier AS–13 through lines 910 and 606. The trail voltage L is supplied through lines 629 and 905 from potentiometer 626 to said amplifier. The amplifier output is fed to servo 614 to provide the shaft position $T_i$. From this point on the computer operates the same as in the synchronous bomb mode and supplies time-to-go, $T_g$, to the bomb release circuits.

Thus, during the tracking of a moving target, the hand control is operated to track the target. A portion of the hand control voltages is used to vary the stored wind which is then added to the velocity in air of the aircraft to provide the ground velocity between the aircraft and the target. This velocity, when integrated, produces the range between the aircraft and the moving target which can drive the crosshairs to track the target. Tracking will continue until the target changes course or velocity at which time it is necessary to bring the crosshairs back on the target where tracking will continue until course or velocity is changed again. When $T_g=0$ the bombs are dropped and should hit the target if the target keeps the same course and velocity after the bombs are dropped.

*Impact bomb mode*

It is possible that the aircraft may be nearing the target and find that some of the relays in the computer are not operating correctly. Should there be time to find the faulty relays and replace them it is of course preferable to do so. However, traveling at high velocities and altitudes may not provide sufficient time for such correction. The present system, therefore, has been designed to permit a bomb run when all relays are de-energized. This is the impact bomb mode. All switches remain in their positions as shown in the drawings. From FIG. 11 it will be seen that when the selector switches are moved to the impact bomb mode positions, no relays are energized. Reference is made to the detailed schematic drawings and in addition to the impact bomb mode data flow diagram, FIG. 18.

A voltage proportional to HCT is picked off line 414 from the hand control unit and supplied through line 900 to equalizer 901 in release heading unit 680, FIG. 5*f*. The output voltage from said equalizer is proportional to HCT and is supplied through switch S–3 to amplifier AS–11. The amplifier output is fed through switch 596 to motor 597 of servo 902 which positions the rotor of control transformer CT–4 and resolver 594. Trail L is supplied from potentiometer slider 625 in trail unit 617, FIG. 5*h*, through line 629, switch S–23, line 903, switch S–15, and line 679 to amplifier AR–4 in the release heading unit, FIG. 5*f*. Time-of-fall, $T_f$, is supplied from potentiometer slider 646 in time-of-fall unit 648, FIG. 5*h*, through lines 645 and 904, switch S–24 and line 905 to amplifier AS–13 in the time-to-impact unit 610, FIG. 5*g*. $T_f$ is also supplied from said time-of-fall unit through lines 645 and 906 to amplifier AS–18 in the time-to-go unit 644.

The output voltage $T_f$ from amplifier AS–13 is fed to servo 614 which drives and positions sliders 634, 635, 636 and 637 at $T_f$. A voltage proportional to $V_a$ is fed from the air speed input unit 688, FIG. 5*c*, the voltage being picked off slider 693 and fed through lines 692 and 691, switch S–19, and line 907 to potentiometer 638 in unit 610, FIG. 5*g*. Since slider 634 of said potentiometer is positioned by $T_f$, the voltage thereon is proportional to $V_aT_f$ and is supplied through lines 642 and 908 and switch S–10 to amplifier AR–4. Therefore, voltage $V_aT_f-L$ is supplied from said amplifier through line 909 to resolver 594. Since the resolver rotor is turned through the release heading angle $h_r$, this already having been determined by the hand control, the output voltages therefrom are $(V_aT_f-L)_N$ and $(V_aT_f-L)_E$. The voltage $$(V_aT_f-L)_E$$

is supplied through lines 910 and 911, switch S–5, line 912, switch S–25 and line 890 to amplifier AR–7, FIG. 5*f*. The voltage $(V_aT_f-L)_N$ is supplied through line 913, switch S–6, line 914, switch S–28 and line 888 to amplifier AR–8, FIG. 5*e*.

From potentiometer slider 683 in integrator 685, FIG. 5*e*, a voltage $W_N$ is supplied through lines 687 and 681 to excite potentiometer 640 in unit 610, FIG. 5*g*. Slider 636 of said last-named potentiometer is positioned at $T_f$ so that the voltage thereon is $W_NT_f$ which is fed through line 915, switch S–26, line 916 and switch S–1 to amplifier AR–8. From potentiometer slider 675 in integrator 677, FIG. 5*f*, a voltage $W_E$ is supplied through line 673, 674 and 917 to excite potentiometer 639 in unit 610, FIG. 5*g*.

Slider 635 of said last-named potentiometer is positioned at $T_f$ so that the voltage thereon is $W_ET_f$ which is fed through line 918, switch S–16, line 919 and switch S–2 to amplifier AR–7, FIG. *5f*.

The output voltage from amplifier AR–8 is proportional to $(V_aT_f-L)_N-W_NT_f$, which is equal to $R_N$, and is fed through line 440 to resolver 438 in heading unit (A), FIG. *5e*. The output voltage from amplifier AR–7 is proportional to $(V_aT_f-L)_E-W_ET_f$, which is equal to $R_E$, and is fed through line 441 to said resolver 438. These range values are fed through the remainder of the computer to cause the periscope crosshairs to be positioned in accordance therewith.

It will be remembered that amplifiers AS–13 and AS–18, FIG. *5g*, receive a voltage $T_f$. The output voltage from amplifier AS–13 is fed to servo 614 which positions slider 637 at $T_f$. A 400 c.p.s. voltage is supplied through switch S–20 and line 689 to excite potentiometer 641. Therefore, a voltage $T_f$ is picked off slider 637 and fed through lines 920 and 921, switch S–22 and line 922 to amplifier AS–18. It will be seen that $T_f$ from the time-to-impact unit 610 will not immediately match $T_f$ as supplied directly to amplifier AS–18 from the time-of-fall unit. An error signal exists to drive the rotor of synchro-generator 666, the output of said generator being used to drive the time-to-go needle in the pilot's data indicator 608, FIG. *5h*. When $T_f$ from the time-to-impact unit is equal to $T_f$ as supplied from the time-of-fall unit, the time-to-go needle in the pilot's data indicator will read zero. Therefore, the bombs may be dropped any time thereafter and will hit whatever object the crosshairs are aligned with at the time the bombs are dropped. The bombs may be dropped by pressing button 800 on joy stick 402, FIG. *5a*, closing memory point switch 801. A voltage is supplied through switch T–3, line 802, switch 801, line 803 and switch T–4 to the bomb release circuits (not shown).

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for determining the true values of the vectorial components of wind in a prescribed system of coordinates which affect an aircraft in flight, first integrator means storage means having output potentials proportional to preset values of said vectorial components of wind, velocity obtaining means for providing output potentials proportional to the true values of the vectorial components of the velocity of the aircraft in air, summing means, said summing means being connected to receive the outputs from said storage means and said velocity obtaining means and supplying output potentials proportional to the sums thereof to said first integrator means, manual control means including a potential source capable of being varied as a function of the degree of manual control exercised, said potential source being connected to said summing means, observing means for scanning an area beneath said aircraft and providing a manifestation thereof on a display device which includes a reference, said observing means being connected to receive the outputs from said first integrator means and to be directed thereby, said manual control means being adapted to be manipulated to establish a condition wherein said reference is related to some point in said manifestation in a prescribed manner, said condition being upset and changed thereafter at a rate which is a function of the error of said preset values of the components of wind with respect to the true values thereof, second integrator means which includes said storage means as a part thereof, multiplying means, controlled switching means for initiating a wind correction operation, said switching means switching said manually controlled potential source and the potentials from said storage means from said summing means to said second integrator means and said multiplying means, respectively, said multiplying means multiplying the potentials received by the time duration of said wind correction operation, the output from said multiplying means being supplied to said first integrator means to be summed with the output thereof, said, manual control means being adapted to be manipulated in a manner to return said reference to its original relationship with said point within a prescribed time, the last-mentioned manipulation of said manual control means varying the outputs from said storage means such that upon return of the reference to its prescribed relationship with said point the true proportional values of said vectorial components of wind are stored in said storage means, and means for operating said switching means to return the connections changed to their original state after said condition is reestablished.

2. Apparatus for tracking a target from an aircraft comprising first and second integrator means, first and second potentiometer means controlled by the outputs from said first and second integrator means, respectively, the output potentials from said first potentiometer means being proportional to the vectorial components of range to the target, means controlled by the last-named potentials for providing a manifestation of said target on a display device which includes a reference, the output potentials from said second potentiometer means being initially set to be proportional to preset values of the vectorial components of wind, summing means connected to said first integrator means and adapted to receive potentials proportional to the vectorial components of the velocity of the aircraft in air and the output potentials from said second potentiometer means, and manually controlled means for feeding output potentials proportional to the degree of manual control exercised to said first and second integrator means, said manual control means being adapted to be manipulated in a manner to maintain a prescribed relationship between said manifestation and said reference.

3. Director apparatus for tracking a target from an aircraft and provinding a signal representing the correct time to drop an object from said aircraft to hit said target, said apparatus comprising first and second integrator means, first and second potentiometer means controlled by the outputs from said first and second integrator means, respectively, the output potentials from said first potentiometer means being proportional to the vectorial components of range to the target, means controlled by the last-named potentials for providing a manifestation of said target on a display device which includes a reference, the output potentials from said second potentiometer means being initially set to be proportional to preset values of the vectorial components of wind, summing means connected to said first integrator means and adapted to receive potentials proportional to the vectorial components of the velocity of the aircraft in air and the output potentials from said second potentiometer means, manually controlled means for feeding output potentials proportional to the degree of manual control exercised to said first and second integrator means, said manual control means being adapted to be manipulated in a manner to maintain a prescribed relationship between said manifestation and said reference, and circuit means responsive to the output potentials from said first and second potentiometer means and potentials proportional to the velocity of the aircraft in air for providing said signal to drop said object.

4. Apparatus for tracking a moving target from an aircraft and providing potentials representing the instantaneous values of the vectorial components of ground range from said aircraft to said target, said apparatus comprising first and second integrator means, first and second potentiometer means controlled by the output potentials from said first and second integrator means, respectively, means controlled by the output potentials from said first potentiometer means for providing a manifestation of said target on a display device which includes a reference, the output potentials from said second potentiometer means being initially set to be proportional to preset values of the vectorial components of wind, summing means connected to said first integrator means and adapted to receive potentials proportional to the vectorial components of the velocity of the aircraft in air and the output potentials from said second potentiometer means, manually controlled means for feeding output potentials proportional to the degree of manual control exercised to said first and second integrator means, said manual control means being adapted to be manipulated in a manner to maintain a prescribed relationship between said manifestation and said reference, the potentials from said first potentiometer means being proportional to the components of ground range to the moving target at any instant while said relationship is maintained.

5. Computer apparatus for tracking a target from an aircraft comprising means for observing a target and providing a manifestation thereof on a display device which includes a reference, first potentiometer means, range determining means for controlling the movement of the slider of said first potentiometer means, second potentiometer means having an output potential proportional to a preset value of wind which may be in error from the true value thereof, the output from said range determining means being based on said preset value of wind, the output potential from said first potentiometer means being connected to control the relationship of said manifestation and reference, manual control means in circuit with said observing means for exercising auxiliary control over the relationship of said manifestation and reference, said manual control means being adapted to be manipulated until a prescribed relationship exists between said manifestation and said reference, said manifestation moving relative to said reference thereafter at a rate proportional to the error in the preset value of said wind, switching means for initiating a wind correction operation at a time when said prescribed relationship exists, said switching means disconnecting the output of said second potentiometer means from said range determining means, said manual control means being adapted to be manipulated within a prescribed time to re-establish said prescribed relationship, the output from said manual control means in re-establishing said relationship being arranged to vary the output from said second potentiometer means, means for multiplying the output from said second potentiometer means by a variable which is changing at a constant rate for the duration of the wind correction operation and supplying the product potential to a mid-point on said first potentiometer means, said wind correction operation being terminated through said switching means when said condition is re-established, the true value of wind now being stored on said second potentiometer means.

6. Apparatus for determining the true values of the vectorial components of wind which affect an aircraft in flight, said apparatus comprising storage means having output potentials proportional to preset values of said components which are in error with respect to the true values thereof, velocity measuring means for providing voltages proportional to the velocity of the aircraft in air, manual control means including a potential source which is varied in magnitude as a function of the degree of manual control exercised, first integrator means connected to receive the output from said potential source and the voltages from said velocity measuring means and said storage means, circuit means including potentiometer means whose sliders are controlled by said first integrator means, means under the control of the voltages on the sliders of said potentiometer means for observing an area beneath said aircraft and providing a manifestation of an object therein on a display device which includes a reference, switching means for initiating a wind correction operation, said switching means disconnecting the output from said storage means and said manual control means from said first integrator means, clock means for producing an output which varies with time following the initiation of the wind correction operation, means under the control of said switching means for multiplying the output potentials from said storage means by the output from said clock means and supplying inputs to tapped points on said potentiometer means, second integrator means, means for multiplying the output potentials from said manual control means by the output from said clock means and supplying inputs proportional to the products thereof to said second integrator means, said second integrator means being connected to said storage means for varying the output potentials therefrom, the relationship between the manifestation and reference being upset upon the initiation of said wind correction operation so that said manifestation moves relative to said reference at a rate proportional to the error in said preset wind values, said manual control means being adapted to be manipulated within a prescribed time to re-establish said relationship, the arrangement being such that said wind correction operation is adapted to be terminated when said relationship is re-established, the output potentials from said storage means being proportional to the true values of said vectorial components of wind upon completion of said wind correction operation.

References Cited by the Examiner

UNITED STATES PATENTS

| | | | |
|---|---|---|---|
| 2,438,112 | 3/1948 | Darlington | 235—61.5 |
| 2,616,625 | 11/1952 | Griest et al. | 343—7 |

MALCOLM A. MORRISON, *Primary Examiner.*

C. L. JUSTUS, MAYNARD R. WILBUR, *Examiners.*

N. H. EVANS, F. M. STRADER, R. A. VAN KIRK, R. D. BENNETT, K. DOBYNS, *Assistant Examiners.*